(12) United States Patent
Sparrow et al.

(10) Patent No.: US 9,227,857 B2
(45) Date of Patent: Jan. 5, 2016

(54) METHOD, APPARATUS AND SYSTEM FOR DESALINATING SALTWATER

(75) Inventors: Benjamin Stuart Sparrow, Vancouver (CA); Henry Tsin, Vancouver (CA); Joshua Zoshi, Vancouver (CA); Malcolm Man, Vancouver (CA)

(73) Assignee: SALTWORKS TECHNOLOGIES INC., British Columbia (CA)

( * ) Notice: Subject to any disclaimer, the term of this patent is extended or adjusted under 35 U.S.C. 154(b) by 11 days.

(21) Appl. No.: 14/344,844

(22) PCT Filed: Sep. 14, 2012

(86) PCT No.: PCT/CA2012/000843
§ 371 (c)(1),
(2), (4) Date: May 8, 2014

(87) PCT Pub. No.: WO2013/037047
PCT Pub. Date: Mar. 21, 2013

(65) Prior Publication Data
US 2015/0158746 A1 Jun. 11, 2015

Related U.S. Application Data

(60) Provisional application No. 61/535,259, filed on Sep. 15, 2011, provisional application No. 61/538,738, filed on Sep. 23, 2011, provisional application No. 61/583,310, filed on Jan. 5, 2012, provisional application No. 61/616,864, filed on Mar. 28, 2012, provisional application No. 61/621,737, filed on Apr. 9, 2012.

(51) Int. Cl.
*C02F 1/469* (2006.01)
*B01D 65/02* (2006.01)
(Continued)

(52) U.S. Cl.
CPC ............ *C02F 1/4693* (2013.01); *B01D 61/44* (2013.01); *B01D 61/50* (2013.01); *B01D 61/54* (2013.01);
(Continued)

(58) Field of Classification Search
CPC .......................... C02F 1/4693; C02F 1/4695
See application file for complete search history.

(56) References Cited

U.S. PATENT DOCUMENTS

| | | | |
|---|---|---|---|
| 3,395,087 A | 7/1968 | McElhinney et al. | |
| 5,645,703 A | 7/1997 | Tsai | |

(Continued)

FOREIGN PATENT DOCUMENTS

CA 2699174 A1 10/2010

OTHER PUBLICATIONS

International Search Report dated Jan. 16, 2013.
(Continued)

*Primary Examiner* — Arun S Phasge
*Assistant Examiner* — Steven A. Friday
(74) *Attorney, Agent, or Firm* — Troutman Sanders LLP; Ryan A. Schneider; Benjamin C. Wiles

(57) ABSTRACT

The present disclosure is directed at an apparatus, method and plant for desalinating saltwater and contaminated saltwater. The apparatus comprises a stack and a manifolding assembly. The stack comprises a product chamber, a first and second concentrate chamber, an anion exchange membrane forming a boundary between the first concentrate chamber and the product chamber and a cation exchange membrane forming a boundary between the second concentrate chamber and the product chamber. The manifolding assembly comprises product and concentrate manifolding fluidly coupled to the product and concentrate chambers respectively, to convey a saltwater being desalinated to and away from the product chamber, and a concentrate to and away from the concentrate chambers. The stack may include a diluent chamber and adjacent anion or cation exchange membranes between the product chamber, diluent chamber and concentrate chamber to respectively convey anions or cations across multiple chambers. The stack may also contain a rinse chamber bounded by an anion exchange membrane to guard the stack electrodes from scaling cations. A cleaning system for cleaning the stack is also disclosed.

17 Claims, 20 Drawing Sheets

(51) Int. Cl.
*B01D 61/44* (2006.01)
*B01D 65/08* (2006.01)
*B01D 61/50* (2006.01)
*B01D 61/54* (2006.01)
*C02F 103/08* (2006.01)
*C02F 101/10* (2006.01)
*C02F 103/10* (2006.01)

(52) U.S. Cl.
CPC ............... *B01D 65/02* (2013.01); *B01D 65/08* (2013.01); *B01D 2313/48* (2013.01); *B01D 2321/02* (2013.01); *B01D 2321/16* (2013.01); *B01D 2321/22* (2013.01); *B01D 2321/223* (2013.01); *B01D 2321/40* (2013.01); *C02F 2101/10* (2013.01); *C02F 2103/08* (2013.01); *C02F 2103/10* (2013.01); *C02F 2201/46* (2013.01); *C02F 2201/4613* (2013.01); *C02F 2209/005* (2013.01); *C02F 2209/05* (2013.01); *C02F 2209/42* (2013.01); *C02F 2303/22* (2013.01)

(56) References Cited

U.S. PATENT DOCUMENTS

| | | | |
|---|---|---|---|
| 6,482,304 | B1 * | 11/2002 | Emery et al. ................. 204/524 |
| 7,169,236 | B2 | 1/2007 | Zeiher et al. |
| 8,137,522 | B2 | 3/2012 | Sparrow et al. |
| 8,182,693 | B2 | 5/2012 | Wilkins et al. |
| 8,317,992 | B2 | 11/2012 | Sparrow et al. |
| 2009/0314718 | A1 * | 12/2009 | Sparrow et al. ............... 210/669 |

OTHER PUBLICATIONS

The International Preliminary Report on Patentability dated Dec. 16, 2013.

Extended European Search Report in related European Application No. EU12832028.0, mailed Jul. 1, 2015.

* cited by examiner

METHOD, APPARATUS AND SYSTEM FOR DESALINATING SALTWATER

TECHNICAL FIELD

The present disclosure is directed at a method, apparatus and plant for desalinating saltwater. More specifically, the disclosure is directed at a method, apparatus and plant for desalinating saltwater using electrodyalisis.

BACKGROUND

Certain industrial processes produce a saltwater waste (contaminated saltwater) while also requiring a lower salinity make-up stream. Examples include, but are not limited to:

Mineral extraction: water and chemicals are mixed with mined rock to extract a desired mineral such as copper or gold from the rock. Saline waste water, known as "tailings", is produced as a result. The tailings need to be discharged while make-up water of lower salinity may be required to maintain production. In some cases, it may not be possible to recycle tailings water due to its high salinity. Lower salinity make-up water is required in order to prevent corrosion in the process plant or to ensure effectiveness of mineral extraction. It would be beneficial to desalinate tailings water for re-use while also concentrating and reducing the volume of the final discharge, thereby reducing discharge costs, environmental impacts, and freshwater extraction from other sources.

Oil sands extraction: oil sands may be converted to a vendible product by exemplar mining, separation and cracking, or by exemplar steam assisted gravity drainage processes. Both of these processes are commonly practiced in Canadian oil sands operations and produce a saline waste stream while also requiring lower salinity make-up water. It would be beneficial to desalinate the waste saline stream for re-use. The primary requirement is to remove scaling salts such as calcium and magnesium and corroding salts such as chlorides whereas hydrocarbons present in the water may remain.

Enhanced oil recovery: water is injected into hydrocarbon formations to displace and recover addition hydrocarbons. The injected water may be mixed with caustic, surfactants, and proprietary polymers that further enhance recovery and prevent formation plugging. Practitioners of enhanced oil recovery have found it preferable to inject water with a net salt concentration between 2,000 and 8,000 parts per million (ppm). More concentrated saline water, such as seawater with a salt concentration of 35,000 ppm reduces oil recovery. Many in industry believe the increased salt concentration reduces calcium ion exchange in the formation clays and prevents release of hydrocarbon molecules. Water with too low a salt concentration may also be detrimental, for example reverse osmosis permeates with a concentration of 400 ppm. Freshwater has been found to swell the formation clays and hence impede hydrocarbon movement and reduce recovery. Therefore, industrial experience has shown that water with a salt concentration of 2,000 to 8,000 ppm is preferred. Said water would preferably be rich in monovalent ions such as sodium and chloride but weak in divalent ions such as calcium and sulfates in order to assist in calcium ion exchange in the formation clays.

After being injected, saltier water is often reproduced with the oil. Salinity of the water increases due to the presence of salts in the formation. The salinity of produced water can be highly variable, for example from 500 to 200,000 ppm. At present, produced water is commonly disposed and seawater desalinated for injection. The produced water may be re-used and additional chemicals such as surfactants and polymer added. It is known however, that in order to be effective, more polymer needs to be added for higher salinity waters resulting in increased operational costs. If the produced water is desalinated before polymer is added, then less polymer can be used. Polymers costs an average of $20-30M per year per platform, and savings could be in the $15M per year range by desalting the produced water first.

It would be beneficial to desalinate the produced contaminated saltwater waste, thereby reducing polymer addition requirements, waste water discharge, make-up water requirements, and leaving some of the chemicals added present in the desalinated produced water so as to reduce future input chemical input requirements.

Desalination of seawater and brackish water is commonly practiced. Desalination of industrial wastewater is also practiced, yet presents unique challenges due to the presence of compounds, such as hydrocarbons or chemicals not found in seawater or brackish water. Pre-treatment may be employed to remove said compounds; however, pre-treatment increases the cost of desalination. A brief review of the most commonly practiced desalination processes are as follows:

1. Reverse osmosis ("RO"): water is forced through an osmotic membrane that rejects salts and allows water flux under pressures in excess of the osmotic pressure. RO is presently the most widely practiced seawater desalination process. RO has challenges with industrial waste saltwater due to deleterious compounds, such as hydrocarbons that permanently foul the membrane, which cannot be adequately or economically removed with pre-treatment. Reverse osmosis also reaches osmotic pressure limits with saltwater reject waste stream ("brine") concentrations at 80,000 ppm, therefore making it unsuited for high salinity waters and requiring additional brine treatment for inland operations. Reverse osmosis is currently not a fit for many industrial processes due to extensive pre-treatment requirements to reduce hydrocarbon and organic content to below 10 ppm levels, in addition to its product water being too pure for exemplar enhanced oil recovery processes.

2. Thermal: water is evaporated and condensed, at times in multiple effects in order to recycle the latent heat of condensation. The condensed freshwater is used as a product and the remaining brine discharged. Thermal process may include multiple effect desalination (MED), multi-stage flash (MSF), and vapour compression (VC). Thermal processes are more tolerant to deleterious substances such as hydrocarbons, produce an almost pure distillate, and can achieve very high brine concentrations including the potential for solids formation in exemplar VC crystallizers. However, thermal processes can be expensive and environmentally intensive due to their high energy requirement and costly materials of construction such as alloyed steels and titanium. Thermal process are the most common industrial waste saltwater desalination processes currently practiced but there is a need for less expensive and environmentally intensive processes. In addition, product water from thermal processes is pure distillate requiring blending with saltwater for processes that cannot tolerate pure water, such as enhanced oil recovery.

3. Electrochemical:
   a. ion exchange ("IX") in packed resin beds where the IX resins exchange scaling ions such as calcium for sodium. IX requires frequent chemical inputs such as sodium chloride and hydrochloric acid in order to regenerate the resins—for example: remove the calcium from the resin and replace it with sodium. IX resin regeneration often produces an acid waste stream that must be managed, adding to complexity and cost. IX processes have proven to be more tolerant to hydrocarbons than reverse osmosis, and therefore have found application in oil and gas waste water desalination and softening. That said, the saltwater is not desalinated, it is softened with divalent ions replaced with less problematic monovalent ions, as a result chlorides are not removed and therefore the corrosive potential of the water is not reduced.
   b. electrodialysis transfers salt ions across ion exchange membranes under the application of a galvanic potential. The galvanic potential is supplied as a voltage generated at an anode and cathode. Ion exchange membranes offer the advantage that they do not require regeneration, thereby reducing the need for chemical inputs over IX processes. Membrane inorganic scaling can be managed through polarity reversal (electrodialysis reversal—EDR) and fouling managed through periodic flushes or dilute acid washes. Unlike reverse osmosis, the output product water concentration from electrodialysis can be adjusted by adjusting the voltage applied to the stack.

Traditional electrodialysis stacks consist of two chambers—a diluent and concentrate. Salt ions are transferred from the diluent to the concentrate under the direct current electric field applied at the electrodes. The concentration factor across any single membrane has limits, which is expressed as the ratio of concentrate to diluent salt mass. A practical concentration factor of five to ten is common. For example, transferring ions from a diluent with a concentration of 2000 ppm to a concentrate with a concentration of 10,000 to 20,000 ppm. It is not to transfer ions from a diluent of 2000 ppm to a concentrated of 200,000 ppm.

Concentration polarization at the membrane surface increases with concentration factor, thereby limiting current density. In addition, back diffusion across the membrane increases with concentration factor, thereby reducing current efficiency. Reducing the concentration factor across a single membrane will generally increase the maximum allowable current density and also increase current efficiency. Concentration factors can be limited with two chamber stacks by use of external staging of the stacks. For example, a first stack's diluent and concentrate concentrations being respectively low (2,000 ppm) and moderate (20,000 ppm), and the second stack's diluent and concentrate concentrations being moderate (20,000 ppm) and high (200,000 ppm). By inserting the moderate concentration circuit, the concentration factor across the ion exchange membranes is reduced. However this requires multiple stacks with increased footprint for their multiple frames and process pipework.

It would be beneficial to devise a process that has the advantages of electrodialysis in terms of increased fouling tolerance, descaling through ionic current reversal, and ability to tune the output product water concentration, but also enables a high concentration difference in a single electrodialysis stack allowing more compact desalination and production of a highly concentrated low volume discharge saltwater. At increased concentration, however, the potential for precipitation and crystallization internal to the stack increases. Even with electrodialysis reversal a stack may operate well on highly scaling waters for 2-3 weeks but eventually precipitates form internal to the stack, blocking flow channels. It would therefore be beneficial to devise a control process and scheme that senses the on-set of membrane scaling and internal stack precipitation, and takes action to prevent its propagation.

Certain saltwater sources, such as inland brackish water, can have increased concentrations of "hard" ions such as calcium and magnesium relative to seawater. Said hard ions can present inorganic scaling issues on desalination mass and heat transfer surfaces; respective examples include RO membranes or MED heat exchange surfaces. Scaling is mitigated by limiting recovery thereby reducing the scaling ion concentration present at the mass or heat transfer surface. Recovery is defined as the volumetric flow rate of desalinated water production relative to feed water input. Reducing recovery reduces the concentration of the ions in the brine reject, thereby reducing scaling potential of the mass or heat transfer surfaces exposed to the highest concentration saltwater. However, reducing recovery detrimentally limits the production of desalinated water.

Removing hard scaling ions from the plant feedwater enables desalination plant operation at a higher brine reject concentration and therefore a higher recovery, resulting in increased desalinated water production. Hard ions such as calcium and magnesium may be removed from the desalination plant feed water via conventional methods known to those skilled in the art such as lime softening or cation ion exchange (CIX). Both lime softening and cation ion exchange systems require the input of chemicals: such as sodium carbonate, regeneration acid or base, or sodium chloride. Chemical consumption and waste generation can be quite high for lime softening and cation exchange systems—in the order of many truck loads per day for an exemplar 10,000 $m^3$/day desalination system. The addition of chemicals presents ongoing operational costs along with increased safety and hazard risks. It would therefore be beneficial to devise a system that removes scaling ions from desalination plant feed water without the need for chemical addition.

In EDR scaling ions, such as calcium and magnesium may pass through the electrode membrane and into electrolyte chambers. The scaling ions may precipitate and causes scaling in the electrode chamber which cannot be easily remove without shutting down operation of the EDR. It would therefore be beneficial to devise an EDR system that prevents or reduces scaling ions from passing into the electrolyte chamber.

Waters contaminated with relatively low levels of salt concentration can still be unusable or hazardous to the environment. For example, mines use freshwater and discharge tailings into ponds. Tailings water is commonly 99.8% freshwater by mass, but unusable due to low level salts, for example 0.1 to 0.2% by mass. Commonly encountered salts include calcium, sulfates, chlorides, carbonates, heavy metals, iron, selenium, and arsenic. Run-off from exposed rock can also contain low level, but hazardous salt concentrations. For example, in the case of one form of "acid rock drainage," iron leaching from exposed rock can initiate a reaction where acid is formed, with the acidity increasing the rate of iron leach and propagating acidification, thereby causing run-off water to become hazardous.

Acidic streams near abandoned mines are commonly treated with lime or caustic addition to neutralize the acidity and precipitate out metals. This process requires chemical inputs that may be caustic, which present cost, transport, and handling challenges. Mine operators are starting to practice reverse osmosis to remediate a portion of their tailings. Reverse osmosis produces an almost pure permeate freshwater by pressuring saltwater through a semi-permeable membrane, also resulting in the production of higher salinity brine. Recovery of the reverse osmosis system, defined as produced freshwater relative to input saltwater volume, is often limited by the concentration of the scaling ions in the higher salinity brine. The recovery of the reverse osmosis system must be limited to the 4 to 5% salt mass range, often due to the scaling salts listed above. This leaves a large volume of un-treated brine behind which still consists of 95% freshwater.

Un-treated reverse osmosis brine may by disposed by deep well injection if such geology and regulatory framework exists. Other commonly practiced brine management options include:

Return the brine to the tailings impoundment: this does not remove salts from the water balance and leads to an eventual increase in the salt concentration of the tailings impoundment, which is a problem if the impoundment is also the reverse osmosis plant feed source. With time, the concentration of the tailings will rise and further limit the recovery of the reverse osmosis system.

Zero liquid discharge in a mechanical or thermal vapour compression crystallizer: this removes the salt from the water balance, but is a capital and energy intensive process. Due to the often low recovery of reverse osmosis system a high capacity crystallizer is required, resulting in high total costs.

When a first stage process, such as reverse osmosis, is hybridized with a second stage zero liquid discharge process, such as a crystallizer, it is beneficial to minimize the volume of the saltwater sent to the more costly second stage. This will minimize the capacity of the more costly second stage and can be achieved by maximizing the concentration of the saltwater output from said first stage. For example, doubling the first stage saltwater output concentration from 4% salt to 8% salt will halve the size of the second stage.

Electrochemical processes such as electrodialysis reversal (EDR) move salts across ion exchange membranes into a more concentrated saline solution. EDR is known for its ability to operate at higher reject concentration than reverse osmosis, due to two primary reasons:

1. Ionic de-scaling of membranes through polarity reversal, which periodically "back-flushes" salt flux through the membranes and de-scales them in the process. It is not possible to back-flush reverse osmosis systems.
2. Unlike reverse osmosis, EDR output concentration is not limited by osmotic and hydraulic pressure barriers. Reverse osmosis systems have a peak pressure rating (commonly 1200 psi) and freshwater will not be produced unless the hydraulic pressure exceeds the osmotic pressure (commonly limited to 8% salt mass so as to not exceed 1200 psi).

It would be beneficial to devise an improved two stage process for desalinating low salinity water where the first stage increasing the concentration of the output saltwater and as a result beneficially reduces the capacity of the second stage solution concentrating desalination system.

SUMMARY

According to a first aspect, there is provided an apparatus for desalinating saltwater including a stack configured to receive saltwater being desalinated, a diluent of a first ionic concentration and a concentrate of a second ionic concentration greater than the first ionic concentrate, and a manifolding assembly. The stack includes an electrodialysis cell including a product chamber bounded on one side by a product chamber anion exchange membrane and bounded on another side by a product chamber cation exchange membrane, a concentrate chamber bounded on one side by a concentrate chamber anion exchange membrane and bounded on another side by a concentrate chamber cation exchange membrane, a first diluent chamber between the product chamber and the concentrate chamber, and a second diluent chamber on an opposite side of the product chamber to the first diluent chamber. The electrodialysis cell being configured with either the product chamber anion exchange membrane and the concentrate chamber anion exchange membrane in adjacent alignment either side of the first diluent chamber, or the product chamber cation exchange membrane and the concentrate chamber cation exchange membrane in adjacent alignment either side of the first diluent chamber, whereby under application of a sufficient voltage across the electrodialysis cell cations or anions respectively migrate across the adjacently aligned cation exchange membranes or the adjacently aligned anion exchange membranes from the product chamber through the first diluent chamber to the concentrate chamber. The manifolding assembly includes product, concentrate and diluent manifolding fluidly coupled to the product, concentrate and diluent chambers respectively, to convey the saltwater being desalinated to and away from the product chamber, the concentrate to and away from the concentrate chamber, and the diluent to and away from the diluent chambers.

According to a second aspect, there is provided an apparatus for desalinating saltwater capable of operating in forward polarity and reverse polarity. The apparatus includes a stack configured to receive saltwater being desalinated, a diluent of a first ionic concentration and a concentrate of a second ionic concentration greater than the first ionic concentrate, and a manifolding assembly. The stack including an electrodialysis cell including a first and second product/concentrate chamber, each product/concentrate chamber bounded on one side by a product/concentrate chamber anion exchange membrane and bounded on another side by a product/concentrate chamber cation exchange membrane; a first and second concentrate/product chamber, each concentrate/product chamber bounded on one side by a concentrate/product chamber anion exchange membrane and bounded on another side by a concentrate/product chamber cation exchange membrane; and a first, second and third diluent chamber. The electrodialysis cell being configured with the product/concentrate chamber anion exchange membrane of the first product/concentrate chamber and the concentrate/product chamber anion exchange membrane of the first concentrate/product chamber in adjacent alignment either side of the first diluent chamber, the product/concentrate chamber cation exchange membrane of the first product/concentrate chamber and the concentrate/product chamber cation exchange membrane of the second concentrate/product chamber in adjacent alignment either side of the second diluent chamber, and either the product/concentrate chamber anion exchange membrane of the second product/concentrate chamber and the concentrate/product chamber anion exchange membrane of the second concentrate/product chamber in adjacent alignment either side of the third diluent chamber, or the product/concentrate chamber cation exchange membrane of the second product/concentrate chamber and the concentrate/product chamber cation exchange membrane of the first concentrate/product chamber in adjacent alignment either side of the third diluent chamber, whereby under application of a sufficient voltage across the electrodialysis cell cations and anions respectively migrate across the adjacently aligned cation exchange membranes and the adjacently aligned anion exchange membranes from the product/concentrate chamber through the diluent chamber to the concentrate/product chamber in forward polarity and from the concentrate/product chamber through the diluent chamber to the product/concentrate chamber in reverse polarity. The manifolding assembly includes product/concentrate manifolding fluidly coupled to the product/concentrate chambers and configured to convey the saltwater being desalinated to and away from the product/concentrate chambers when the apparatus is operating in forward polarity and the concentrate to and away from the product/concentrate chambers when the apparatus is operating in reverse polarity, concentrate/product manifolding fluidly coupled to the concentrate/product chambers and configured to convey the concentrate to and away from the concentrate/product chambers when the apparatus is operating in forward polarity and the saltwater being desalinated to and away from the concentrate/product chambers when the apparatus is operating in reverse polarity, and diluent manifolding fluidly coupled to the diluent chambers to convey the diluent to and away from the diluent chambers.

According to a another aspect, there is provided an apparatus for desalinating saltwater including a stack and a manifolding assembly. The stack being configured to receive the saltwater being desalinated and a concentrate and including a product chamber; a first and second concentrate chamber, the first concentrate chamber on one side of and in ionic communication with the product chamber and the second concentrate chamber on another side of and in ionic communication with the product chamber; an anion exchange membrane forming a boundary between the first concentrate chamber and the product chamber; a cation exchange membrane forming a boundary between the second concentrate chamber and the product chamber; first and second electrolyte chambers for containing an electrolyte; first and second stack end cation exchange membranes and first and second stack end anion exchange membranes; first and second electrodes, the first electrolyte chamber bounded on one side by and in ionic communication with the first stack end cation exchange membrane and on another side by and in electrical communication with the first electrode, the second electrolyte chamber bounded on one side by and in ionic communication with the second stack end cation exchange membrane and on another side by and in electrical communication with the second electrode; and first and second rinse chambers for containing rinse solution, the first rinse chamber bounded on one side by and in ionic communication with the first stack end anion exchange membrane and on another side by and in ionic communication with the first stack end cation exchange membrane, the second rinse chamber bounded on one side by and in ionic communication with the second stack end anion exchange membrane and on another side by and in ionic communication with the second stack end cation exchange membrane. The manifolding assembly including product and concentrate manifolding fluidly coupled to the product and concentrate chambers respectively, to convey the saltwater being desalinated to and away from the product chamber, and the concentrate to and away from the concentrate chambers.

According to another aspect, there is provided an apparatus for desalinating saltwater capable of operating in forward polarity and reverse polarity. The apparatus includes a stack configured to receive the saltwater being desalinated and a concentrate, and a manifolding assembly. The stack includes at least two product/concentrate chambers; at least two concentrate/product chambers, each concentrate/product chamber in ionic communication with one of the product/concentrate chambers; anion and cation exchange membranes arranged such that an anion or cation exchange membrane forms a boundary between each product/concentrate chamber and an adjacent concentrate/product chamber, and each product/concentrate chamber has an anion exchange membrane on one side of the product/concentrate chamber and a cation exchange membrane on another side of the product/concentrate chamber and each concentrate/product chamber has an anion exchange membrane on one side of the concentrate/product chamber and a cation exchange membrane on another side of the concentrate/product chamber; first and second electrolyte chambers for containing an electrolyte; first and second stack end cation exchange membranes and first and second stack end anion exchange membranes; first and second electrodes, the first electrolyte chamber bounded on one side by and in ionic communication with the first stack end cation exchange membrane and on another side by and in electrical communication with the first electrode, the second electrolyte chamber bounded on one side by and in ionic communication with the second stack end cation exchange membrane and on another side by and in electrical communication with the second electrode; and first and second rinse chambers for containing rinse solution, the first rinse chamber bounded on one side by and in ionic communication with the first stack end anion exchange membrane and on another side by and in ionic communication with the first stack end cation exchange membrane, the second rinse chamber bounded on one side by and in ionic communication with the second stack end anion exchange membrane and on another side by and in ionic communication with the second stack end cation exchange membrane. The manifolding assembly includes product/concentrate manifolding fluidly coupled to the product/concentrate chambers and configured to convey the saltwater being desalinated to and away from the product/concentrate chambers when the apparatus is operating in forward polarity and the concentrate to and away from the product/concentrate chambers when the apparatus is operating in reverse polarity; and concentrate/product manifolding fluidly coupled to the concentrate/product chambers and configured to convey the concentrate to and away from the concentrate/product chambers when the apparatus is operating in forward polarity and the saltwater being desalinated to and away from the concentrate/product chambers when the apparatus is operating in reverse polarity.

According to another aspect, there is provided a method for producing a desalinated product. The method includes flowing a product feed and a concentrate feed through a stack, and applying a voltage across the stack to force anions and cations respectively across anion and cation exchange membranes in the stack from the product feed to the concentrate feed, thereby producing a product output with a reduced salinity relative to the product feed and a concentrate output with an increased salinity relative to the concentrate feed; and flowing the product output through a desalination system to produce the desalinated product and a desalination system concentrate.

According to another aspect, there is provided a plant for producing a desalinated product including an electrodialysis (ED) system, a desalination system, and a conduit. The ED system includes a stack configured to receive a product feed and a concentrate feed and a manifolding assembly. The stack includes a product chamber; a first and second concentrate chamber, the first concentrate chamber on one side of and in ionic communication with the product chamber and the second concentrate chamber on another side of and in ionic communication with the product chamber; a first anion exchange membrane forming a boundary between the first concentrate chamber and the product chamber; and a first cation exchange membrane forming a boundary between the second concentrate chamber and the product chamber. The manifolding assembly includes product manifolding fluidly coupled to the product chamber to convey the product feed to the product chamber and a product output away from the product chamber, the product output having a reduced salinity relative to the product feed; and concentrate manifolding fluidly coupled to the concentrate chambers to convey the concentrate feed to the concentrate chambers and a concentrate output away from the concentrate chambers, the concentrate output having an increased salinity relative to the concentrate feed. The conduit fluidly coupling the product manifolding with an inlet to the desalination system and configured to convey the product output to the desalination system.

According to another aspect, there is provided a plant for producing a desalinated product including an electrodialysis reversal (EDR) system capable of operating in forward polarity and reverse polarity, a desalination system, and a conduit. The EDR system includes a stack configured to receive a product feed and a concentrate feed, and a manifolding assembly. The stack includes at least two product/concentrate chambers; at least two concentrate/product chambers, each concentrate/product chamber in ionic communication with one of the product/concentrate chambers; and anion and cation exchange membranes arranged such that an anion or cation exchange membrane forms a boundary between each product/concentrate chamber and an adjacent concentrate/product chamber, and each product/concentrate chamber has an anion exchange membrane on one side of the product/concentrate chamber and a cation exchange membrane on another side of the product/concentrate chamber and each concentrate/product chamber has an anion exchange membrane on one side of the concentrate/product chamber and a cation exchange membrane on another side of the concentrate/product chamber. The manifolding assembly including product/concentrate manifolding fluidly coupled to the product/concentrate chambers and configured to convey the product feed to and a product output away from the product/concentrate chambers when the apparatus is operating in forward polarity and the concentrate feed to and a concentrate output away from the product/concentrate chambers when the apparatus is operating in reverse polarity, the product output having a reduced salinity relative to the product feed and the concentrate output having an increased salinity relative to the concentrate feed; and concentrate/product manifolding fluidly coupled to the concentrate/product chambers and configured to convey the concentrate feed to and the concentrate output away from the concentrate/product chambers when the apparatus is operating in forward polarity and the product feed to and the product output away from the concentrate/product chambers when the apparatus is operating in reverse polarity. The conduit fluidly coupling the manifolding assembly with an inlet to the desalination system configured to convey product output from the EDR system to the desalination system.

According to another aspect, there is provided a method of desalinating a contaminated saltwater. The method including flowing the contaminated saltwater being desalinated from a contaminated saltwater source through a first waste water chamber, the first waste water chamber having a first anion exchange membrane on one side of and in ionic communication with the first waste water chamber and a first cation exchange membrane on another side of and in ionic communication with the first waste water chamber; flowing a saline water from a saline water source through a first saline water chamber in ionic communication with the first anion exchange membrane; and flowing the saline water through a second saline water chamber in ionic communication with the first cation exchange membrane, wherein anions migrate from the first waste water chamber through the first anion exchange membrane to the first saline water chamber and cations migrate from the first waste water chamber through the first cation exchange membrane to the second saline water chamber, the first anion and cation exchange membranes configured to allow migration of salts and to reduce migration of contaminants, such that the salt concentration in the saline water increases to produce concentrated saline water and the contaminated saltwater is desalinated.

According to another aspect, there is provided an apparatus for desalinating a contaminated saltwater capable of operating in forward flow direction and reverse flow direction. The apparatus including a stack configured to receive the contaminated saltwater being desalinated from a contaminated saltwater source and a saline water from a saline water source, a manifolding assembly, and a diverter. The stack including at least two waste/saline chambers; at least two saline/waste chambers, each saline/waste chamber in ionic communication with at least one of the waste/saline chambers; and anion and cation exchange membranes arranged such that an anion or cation exchange membrane forms a boundary between each waste/saline chamber and an adjacent saline/waste chamber, and each waste/saline chamber has an anion exchange membrane on one side of the waste/saline chamber and a cation exchange membrane on another side of the waste/saline chamber and each saline/waste chamber has an anion exchange membrane on one side of the saline/waste chamber and a cation exchange membrane on another side of the saline/waste chamber. The manifolding assembly including waste/saline manifolding fluidly coupled to the waste/saline chambers and configured to convey the contaminated saltwater being desalinated to and away from the waste/saline chambers when the apparatus is operating in forward polarity and the saline water to and away from the waste/saline chambers when the apparatus is operating in reverse polarity; saline/waste manifolding fluidly coupled to convey the saline/waste chambers and configured to convey the saline water to and away from the saline/waste chambers when the apparatus is operating in forward polarity and the contaminated saltwater being desalinated to and away from the saline/waste chambers when the apparatus is operating in reverse polarity; and a saline water outlet conduit in fluid communication with the waste/saline and saline/waste manifolding. The diverter configured to divert a saline and contaminated saltwater mixture away from the saline water outlet conduit for a set period of time following a switch between operating in the forward and reverse flow direction, or until a level of contaminated saltwater in the saline and contaminated saltwater mixture is at or below a threshold level.

According to another aspect, there is provided a method for desalinating a saltwater including flowing the saltwater being desalinated through an electrodialysis system including flowing a product feed and a concentrate feed through a stack, the product feed and concentrate feed including the saltwater being desalinated, and applying a voltage across the stack to force anions and cations respectively across anion and cation exchange membranes in the stack from the product feed to the concentrate feed, thereby producing a product output that has a reduced salinity relative to the product feed and a concentrate output that has an increased salinity relative to the concentrate feed; and flowing the concentrate output through a solution concentrating desalination system.

According to another aspect, there is provided a plant for desalinating a saltwater including an electrodialysis system, a solution concentrating desalination system, and a conduit.

The electrodialysis system including a stack configured to receive a product feed and a concentrate feed, the product feed and the concentrate feed including the saltwater being desalinated, and a manifolding assembly. The stack including a product chamber; a first and second concentrate chamber, the first concentrate chamber on one side of and in ionic communication with the product chamber and the second concentrate chamber on another side of and in ionic communication with the product chamber; a first anion exchange membrane forming a boundary between the first concentrate chamber and the product chamber; and a first cation exchange membrane forming a boundary between the second concentrate chamber and the product chamber. The manifolding assembly including product manifolding fluidly coupled to the product chamber to convey the product feed to the product chamber and a product output away from the product chamber, the product output having a reduced salinity relative to the product feed; and concentrate manifolding fluidly coupled to the concentrate chambers to convey the concentrate feed to the concentrate chambers and a concentrate output away from the concentrate chambers, the concentrate output having an increased salinity relative to the concentrate feed. The conduit fluidly coupling the concentrate manifolding with an inlet to the solution concentrating desalination system configured to convey the concentrate output to the solution concentrating desalination system.

According to another aspect, there is provided a plant for desalinating a saltwater including an electrodialysis system capable of operating in forward polarity and reverse polarity, a solution concentrating desalination system, and a conduit. The electrodialysis system including a stack configured to receive a product feed and a concentrate feed, the product feed and the concentrate feed including the saltwater being desalinated, and a manifolding assembly. The stack including at least two product/concentrate chambers; at least two concentrate/product chambers, each concentrate/product chamber in ionic communication with one of the product/concentrate chambers; and anion and cation exchange membranes arranged such that an anion or cation exchange membrane forms a boundary between each product/concentrate chamber and an adjacent concentrate/product chamber, and each product/concentrate chamber has an anion exchange membrane on one side of the product/concentrate chamber and a cation exchange membrane on another side of the product/concentrate chamber and each concentrate/product chamber has an anion exchange membrane on one side of the concentrate/product chamber and a cation exchange membrane on another side of the concentrate/product chamber. The manifolding assembly including product/concentrate manifolding fluidly coupled to the product/concentrate chambers and configured to convey the product feed to and a product output away from the product/concentrate chambers when the apparatus is operating in forward polarity, and the concentrate feed to and a concentrate output away from the product/concentrate chambers when the apparatus is operating in reverse polarity, the product output having a reduced salinity relative to the product feed and the concentrate output having an increased salinity relative to the concentrate feed; and concentrate/product manifolding fluidly coupled to the concentrate/product chambers and configured to convey the concentrate feed to and the concentrate output away from the concentrate/product chambers when the apparatus is operating in forward polarity, and the product feed to and the product output away from the concentrate/product chambers when the apparatus is operating in reverse polarity. The conduit fluidly coupling the manifolding assembly with an inlet to the solution concentrating desalination system configured to convey the concentrate output to the solution concentrating desalination system.

According to another aspect, there is provided a plant for desalinating a saltwater including the apparatus for desalinating a saltwater according to the first aspect, a solution concentrating desalination system, and a conduit. The stack being configured to receive a product feed and a concentrate feed, the product feed and the concentrate feed including the saltwater being desalinated. The product manifolding being configured to convey the product feed to the product chamber and a product output away from the product chamber, and the concentrate manifolding being configured to convey the concentrate feed to the concentrate chambers and a concentrate output away from the concentrate chambers, the product output having a reduced salinity relative to the product feed and the concentrate output having an increased salinity relative to the concentrate feed. The conduit fluidly coupling the concentrate manifolding with an inlet to the solution concentrating desalination system configured to convey the concentrate output to the solution concentrating desalination system.

According to another aspect, there is provided a plant for desalinating a saltwater including the apparatus for desalinating a saltwater according to the second aspect, a solution concentrating desalination system, and a conduit. The stack being configured to receive a product feed and a concentrate feed, the product feed and the concentrate feed including the saltwater being desalinated. The product/concentrate manifolding being configured to convey the product feed to and a product output away from the product/concentrate chambers when the apparatus is operating in forward polarity, and the concentrate feed to and a concentrate output away from the product/concentrate chambers when the apparatus is operating in reverse polarity, the product output having a reduced salinity relative to the product feed and the concentrate output having an increased salinity relative to the concentrate feed. The concentrate/product manifolding being configured to convey the concentrate feed to and the concentrate output away from the concentrate/product chambers when the apparatus is operating in forward polarity, and the product feed to and the product output away from the concentrate/product chambers when the apparatus is operating in reverse polarity. The conduit fluidly coupling the manifolding assembly with an inlet to the solution concentrating desalination system configured to convey the concentrate output to the solution concentrating desalination system.

According to another aspect, there is provided a method of cleaning a stack of an electrodialysis system including flowing a cleaning solution through the stack during a cleaning cycle.

According to another aspect, there is provided an apparatus for desalinating saltwater including a stack configured to receive the saltwater being desalinated and a concentrate, a manifolding assembly, and a cleaning system. The stack including a product chamber, a first and second concentrate chamber, the first concentrate chamber on one side of and in ionic communication with the product chamber and the second concentrate chamber on another side of and in ionic communication with the product chamber, an anion exchange membrane forming a boundary between the first concentrate chamber and the product chamber; and a cation exchange membrane forming a boundary between the second concentrate chamber and the product chamber. The manifolding assembly including product and concentrate manifolding fluidly coupled to the product and concentrate chambers respectively, to convey the saltwater being desalinated to and away from the product chamber, and the concentrate to and away from the concentrate chambers. The cleaning system including a cleaning reservoir for containing a cleaning solution fluidly coupled with the manifolding assembly and configured to convey the cleaning solution through the stack during a cleaning cycle.

According to another aspect, there is provided an apparatus for desalinating saltwater capable of operating in forward polarity and reverse polarity. The apparatus including a stack configured to receive the saltwater being desalinated and a concentrate, a manifolding assembly and a cleaning system. The stack including at least two product/concentrate chambers; at least two concentrate/product chambers, each concentrate/product chamber in ionic communication with one of the product/concentrate chambers; and anion and cation exchange membranes arranged such that an anion or cation exchange membrane forms a boundary between each product/concentrate chamber and an adjacent concentrate/product chamber, and each product/concentrate chamber has an anion exchange membrane on one side of the product/concentrate chamber and a cation exchange membrane on another side of the product/concentrate chamber and each concentrate/product chamber has an anion exchange membrane on one side of the concentrate/product chamber and a cation exchange membrane on another side of the concentrate/product chamber. The manifolding assembly including: product/concentrate manifolding fluidly coupled to the product/concentrate chambers and configured to convey the saltwater being desalinated to and away from the product/concentrate chambers when the apparatus is operating in forward polarity and the concentrate to and away from the product/concentrate chambers when the apparatus is operating in reverse polarity; and concentrate/product manifolding fluidly coupled to the concentrate/product chambers and configured to convey the concentrate to and away from the concentrate/product chambers when the apparatus is operating in forward polarity and the saltwater being desalinated to and away from the concentrate/product chambers when the apparatus is operating in reverse polarity. The cleaning system including a cleaning reservoir for containing a cleaning solution fluidly coupled with the manifolding assembly and configured to convey the cleaning solution through the stack during a cleaning cycle.

BRIEF DESCRIPTION OF THE DRAWINGS

In the accompanying drawings, which illustrate one or more exemplary embodiments.

DETAILED DESCRIPTION

Directional terms such as "top", "bottom", "upwards", "downwards", "vertically" and "laterally" are used in the following description for the purpose of providing relative reference only, and are not intended to suggest any limitations on how any article is to be positioned during use, or to be mounted in an assembly or relative to an environment.

In conventional electrodialysis (ED) processes one water source is input and split into two circuits—diluent and concentrate. Salts are transferred from the diluent to the concentrate. Desalinated diluent is often the product water and the concentrate is eventually discharged. In conventional electrodialysis, any substances present in the input water, such as hydrocarbons, would end up in the concentrate stream and be discharged.

Embodiments described herein are directed at an ED process and plant to desalinate contaminated saltwater such as industrial waste water (primary industrial water (PIW)) from a first contaminated saltwater source using saline water from a second saltwater source such as the ocean or a brackish aquifer. Salts are transferred from the PIW to the saline water through ion exchange membranes in an ED stack. With proper membrane selection, only strongly ionized and low molecular weight species such as sodium, chloride, calcium, magnesium, sulfates and the like are transferred from the PIW through the ion exchange membrane to the saline water. Non-ionic species such as hydrocarbons and larger weekly ionized molecules such as organics present in the PIW do not cross the membrane into the saline water. The saline water is therefore concentrated in salts but not in other environmentally hazardous materials that may be present in the PIW so that the concentrated saline water output may be safely discharged to the environment. The salinity of the PIW is beneficially reduced and the desalinated PIW may be re-used in the industrial process.

The salts present in the PIW may contain scaling species such as calcium carbonate and calcium sulfate. To prevent scale build up on the ion exchange membranes of the stack, an electrodialysis reversal (EDR) stack may be used and the polarity of the EDR stack periodically reversed to change the direction of ion transfer through the membranes, thereby descaling the membranes. During reversal, the PIW and the saline water fed to the EDR stack are swapped and, as a result, the PIW and saline water present in the plant pipework and EDR stack when reversal is initiated are mixed, resulting in a momentary and moderate concentration waste stream. The embodiments described herein include a reversal process that prevents the detrimental discharge of this waste stream to the saline water stream.

Figure 1:
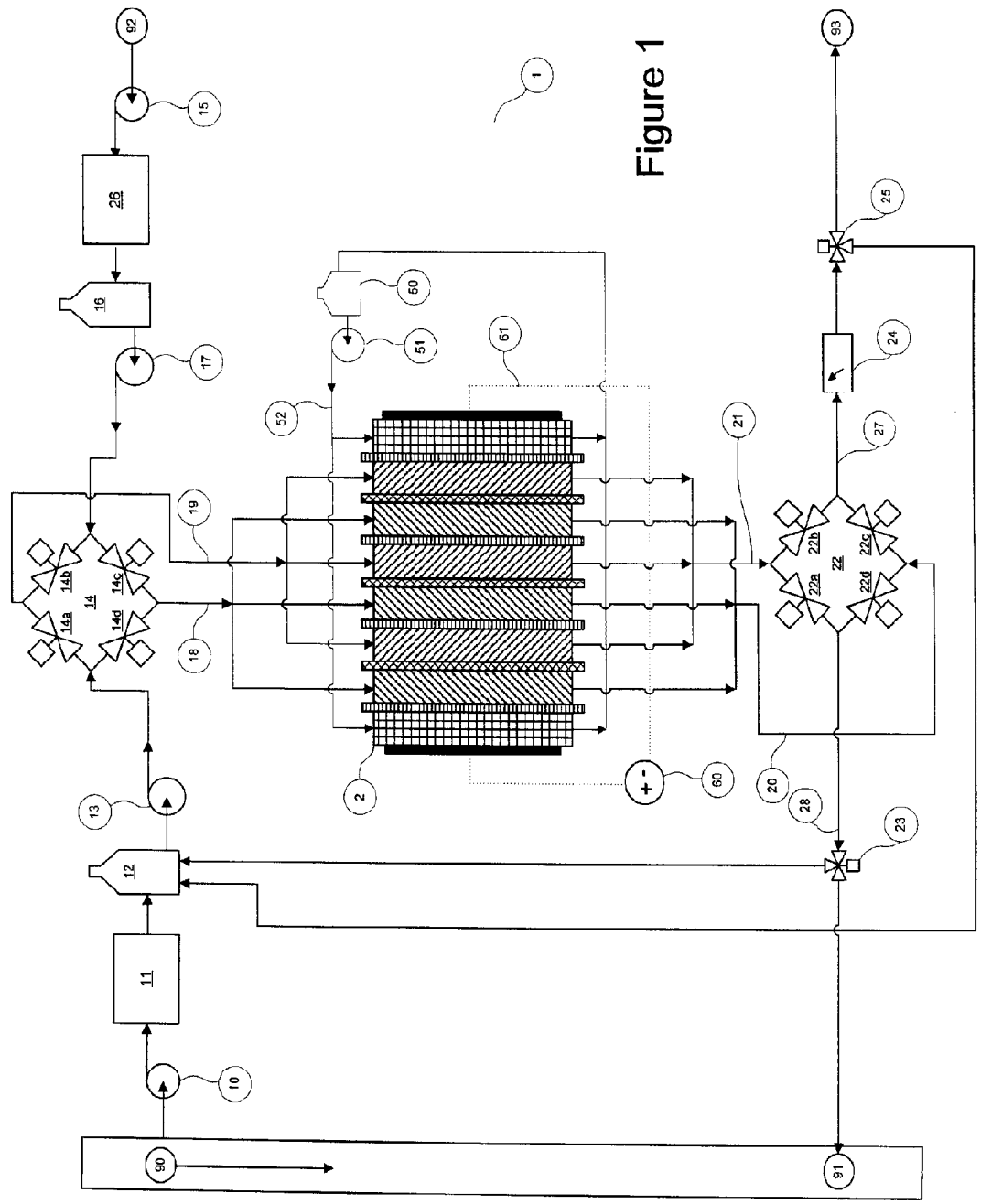
FIG. 1 is a schematic view of a waste saltwater reclamation plant (WSRP) according to an embodiment including an electrodialysis reversal (EDR) stack.

Referring to FIG. 1, there is shown a waste saltwater reclamation plant (WSRP) 1 consisting of EDR stack 2 for desalinating a primary industrial water (PIW) where the total dissolved solids concentrations may range from 500 ppm to 200,000 ppm. An exemplar PIW is produced water from oil and gas operations.

PIW is conveyed through PIW manifolding in a PIW circuit. In the PIW circuit pump 10 which draws PIW from a liquid conduit 90 within the process requiring desalination and into an optional pre-treatment unit 11. Exemplar pre-treatment may include, but is not limited to, physical filters such as microfiltration, or other methods known to those skilled in the art. The effluent from the pre-treatment unit 11 is stored in an optional PIW bulk tank 12, which may include an optional heating element (not shown) to increase the temperature of the PIW, which beneficially increases EDR system efficiency. The PIW is pumped from bulk tank 12 to inlet reversal valve array 14 by pump 13. In an alternative embodiment (not shown) the PIW is pumped directly from pre-treatment 11 into the feed reversal valve array 14, removing the need for tank 12 and pump 13.

In parallel to the PIW circuit is a saline water circuit with saline water manifolding. In the saline water circuit, pump 15 draws saline water from a saline water source 92 through an optional saline water pre-treatment unit 26 and into a saline water bulk tank 16, which may include an optional heating element (not shown) to increase the temperature of the saline water in order to increase system desalination efficiencies. Exemplar saline water sources 92 may include, but are not limited to, seawater or saline brine from an aquifer. Pump 17 pumps the saline water from saline water bulk tank 16 into the inlet reversal valve array 14. In an alternative embodiment (not shown) the saline water is pumped directly from pre-treatment unit 26 into reversal valve array 14, removing the need for tank 16 and pump 17.

P-S inlet conduit 18 and S-P inlet conduit 19 deliver PIW and saline water to EDR stack 2. P-S outlet conduit 20 and S-P outlet conduit 21 convey PIW and saline water away from EDR stack 2 to outlet reversal valve array 22. PIW passes from outlet reversal valve array 22 to PIW exit conduit 28 and saline water passes from outlet reversal valve array 22 to saline water exit conduit 27 and can be discharged from the plat at saline water outlet 93 or recycled to saline water tank 16 for further concentration. The inlet reversal valve array 14 consists of four actuated valves 14a, 14b, 14c, 14d and the outlet reversal valve array 22 consists of four actuated valves 22a, 22b, 22c, 22d.

EDR systems can develop scale on the membrane surface over time. Membrane scale be can reduced by periodically reversing the polarity of EDR stack 2, such that ions travel in opposite directions through the ion exchange membranes under forward or reverse polarity operating modes. In order to reverse polarity, the solutions in their respective circuits need to be swapped, which is achieved by a hydraulic reversal procedure involving reversal valve arrays 14 and 22. The reversal valve position and solution contained in each conduit 18, 19, 20, 21 depends on whether the stack is operating in forward or reverse polarity. The reversal valve positions in forward and reverse polarity mode, as well as the fluid contained in each conduit 18, 19, 20, 21, is given in Table 1 below.

TABLE 1

Hydraulic Reversal Procedure for EDR Plant 1

|  |  | EDR Forward Polarity | EDR Reverse Flush | EDR Reverse Polarity | EDR Forward Flush |
|---|---|---|---|---|---|
| Reversal Valves | 14a | Closed | Open | Open | Closed |
|  | 14b | Open | Closed | Closed | Open |
|  | 14c | Closed | Open | Open | Closed |
|  | 14d | Open | Closed | Closed | Open |
|  | 22a | Closed | Open | Open | Open |
|  | 22b | Open | Closed | Closed | Closed |
|  | 22c | Closed | Closed | Open | Closed |
|  | 22d | Open | Open | Closed | Open |
| Conduit | 18 | PIW | PIW-Saline water | Saline water | PIW-Saline water |
|  | 19 | Saline water | PIW-Saline water | PIW | PIW-Saline water |
|  | 20 | PIW | PIW-Saline water | Saline water | PIW-Saline water |
|  | 21 | Saline water | PIW-Saline water | PIW | PIW-Saline water |

Immediately after the polarity is switched conduits 18, 19, 20, and 21 will have a mixture of both PIW and saline water. This is because the solutions internal to the conduits are swapped—the saline water conduit becomes a PIW conduit and vice-versa. With time, the PIW-saline water mixture will be pushed through the conduit until the solution is either entirely PIW or entirely saline water. It would be detrimental to discharge PIW to the saline water outlet 93. To prevent discharge of PIW at the saline water outlet 93, analyzer 24 and saline water discharge three-way valve 25 may be included upstream of the saline water outlet 93. Analyzer 24 measures the PIW content of the PIW-saline water mixture exiting outlet reversal valve array 22 in the saline water exit conduit 27. If the PIW content is above a pre-set threshold value, the PIW-saline water mixture is diverted by saline water discharge three-way valve 25 away from the saline water outlet 93 and returned to PIW bulk tank 12. The pre-set threshold value for allowable PIW discharge concentration to saline water outlet 93 can be set by permitting conditions. Overtime, after the polarity reversal sequence is initiated, the PIW content in the saline water exit conduit 27 will decrease to below the pre-set threshold value. Once below the pre-set threshold value, the saline water discharge three-way valve 25 is actuated to discharge the solution in the saline water exit conduit 27 to the saline water outlet 93 rather than to PIW bulk tank 12.

In an alternative embodiment, to prevent discharge of the PIW-saline water mixture at saline water outlet 93 following reversal of polarity, the NW-saline water mixture may be diverted to the PIW exit conduit 28 using a reverse or forward flush. With reference to Table 1 for both the reverse and forward flush, outlet reversal valves 22a and 22d are open and outlet reversal valves 22b and 22c are closed for a predetermined period of time (for example one minute) following polarity reversal so that the PIW-saline water mixture is directed to the PIW exit conduit 28 and not into the saline water exit conduit 27. In an alternative embodiment, a conductivity sensor (not shown) in P-S outlet conduit 20 and S-P outlet conduit 21 may be used to detect the conductivity of the solution exiting the EDR stack 2 and the reversal valves of outlet reversal valve array 22 may be switched to operate in either EDR forward polarity or EDR reverse polarity once a threshold PIW concentration is detected indicating that the saline water is sufficiently clear of PIW to be directed to saline water outlet 93.

A PIW discharge three-way valve 23 is included to enable partial batch operation of the PIW circuit. PIW desalination continues until the PIW has reached a desired salt concentration as measured by a conductivity sensor (not shown) installed in PIW bulk tank 12. Once the salt concentration of the PIW reaches the desired level, PIW bulk tank 12 is emptied by pumping the PIW through the EDR stack and actuating valve 23 to direct the PIW into the PIW conduit at a downstream location 91 from the initial extraction point 90. A low level sensor such as a pressure transducer or float switch (not shown) in PIW bulk tank 12 senses a drop in PIW level in PIW bulk tank 12. Pump 10 is actuated to fill PIW bulk tank 12 and valve 23 is actuated to direct the PIW in PIW exit conduit 28 back into PIW bulk tank 12 where the batch cycle desalination starts again.

In an alternative embodiment, PIW discharge three-way valve 23 can also allow for the EDR system to be operated in continuous mode such that the PIW in PIW exit conduit 28 is discharged directly back into the PIW conduit at a downstream location 91 rather than being returned into PIW bulk tank 12. Immediately after a reversal event, the PIW-saline water mixture in the saline water exit conduit 27 would also be directed by saline water discharge three-way valve 25 to PIW conduit downstream location 91 until analyzer 24 determines that PIW content is below the threshold concentration for discharge of the saline water to saline water outlet 93.

Figure 2:
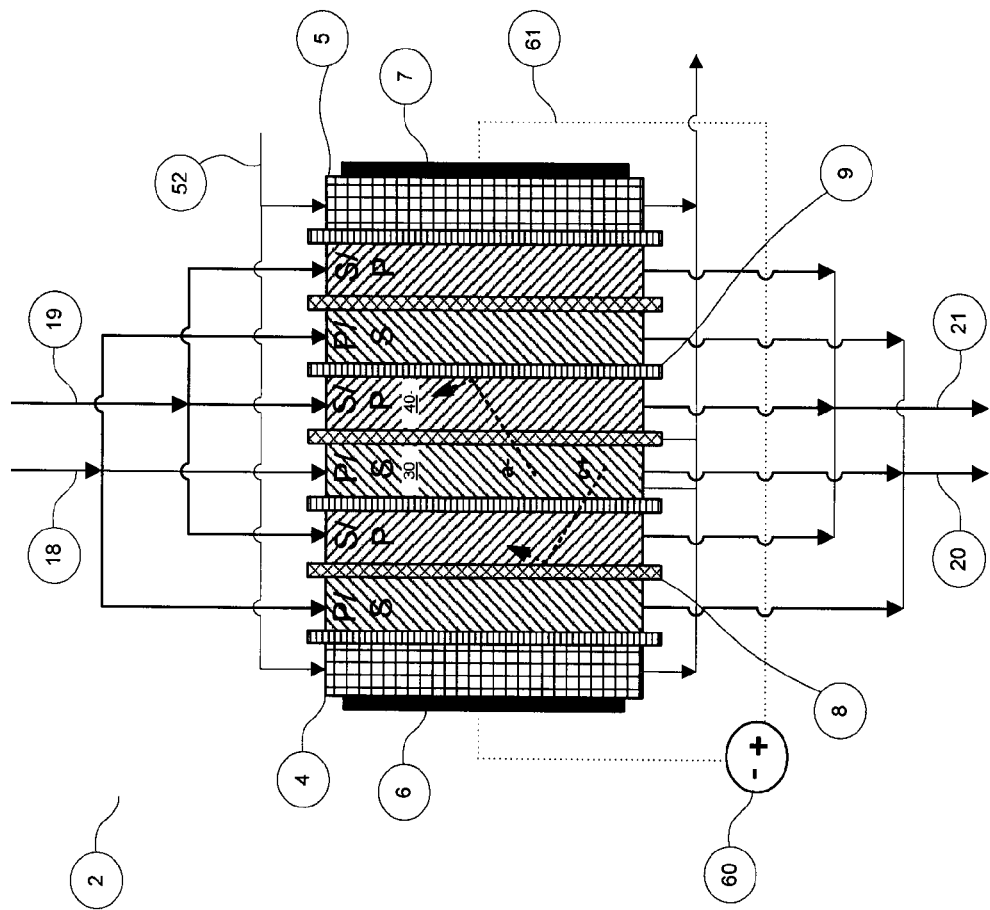
FIG. 2 is a schematic view of the EDR stack of FIG. 1 operating in forward polarity.

FIG. 2 shows the EDR stack 2 operating in forward polarity, where the PIW flows into P-S chambers 30 through P-S inlet conduit 18 and exits via P-S outlet conduit 20; and the saline water flows into S-P chambers 40 through S-P inlet conduit 19 and exits via S-P outlet conduit 21. Chambers 30 and 40 are separated by membranes that are permeable to ions and less permeable to water, hereinafter referred to as ion exchange membranes. There are two types of ion exchange membranes in the EDR stack 2 arranged in alternating sequence. The first ion exchange membrane is an anion exchange membrane 8 which is permeable to ions of negative charge (anions) and less permeable to ions of positive charge (cations). The second ion exchange membrane is a cation exchange membrane 9 which is permeable to cations and less permeable to anions. Exemplary anion exchange membranes include Neosepta AM-1, AFN, AMX; Ralex AMH-PES; Fumasep FAD; and Selemion DVS, APS membranes. Exemplary cation exchange membranes include Neosepta CMX, CM-1; Ralex CMH-PES; Fumasep FKE, FKD; and Selemion CMV membranes.

An electric potential 60 is applied to EDR stack 2 causing an electric current 61 to flow between an anode and cathode at either end of the EDR stack 2. In the forward polarity anode/cathode electrode 7 becomes the positively charged anode which anions flow towards and cathode/anode electrode 6 becomes the negatively charged cathode which cations flow towards The combined electric and ionic current respectively force anions and the cations in the PIW through the anion exchange membrane 8 and the cation exchange membrane 9 into the saline water. Thus the ions decrease in concentration in the PIW while ions increase in concentration in the saline water. In an alternative embodiment (not shown), a drive cell, such as the drive cell disclosed in WO 2010/115287 or WO 2009/155683 may be used for application of a voltage across the chambers.

When the PIW is highly concentrated ions will flow from the more concentrated PIW to the less concentrated saline water without the need for application of the electric potential 60 thus reducing operating costs. Once the ionic concentration of the PIW has dropped to the same concentration or below the ionic concentration of the saline water, the electric potential 60 can be applied if further desalination of the PIW is required. Sensors may be present in the saline water circuit and/or the waste water circuit (not shown) to detect the concentration of the saline water and/or the PIW to determine when the ionic concentration of the PIW is at or below the ionic concentration of the saline water and a signal sent to a control system to actuate application of the electric potential across the EDR stack 2.

On each end of the EDR stack 2 are electrolyte chambers, where electrolyte chamber 5 is on the anode side and electrolyte chamber 4 is on the cathode side in the forward polarity mode. An electrolyte solution is contained in electrolyte tank 50 and pumped by electrolyte pump 51 through electrolyte distribution conduit 52 into electrolyte chambers 4 and 5 in parallel. The electrolyte solution flows back into electrolyte tank 50 in a closed loop process. In an alternative embodiment (not shown) a series closed loop circuit may be used where the electrolyte solution flows in one direction through electrolyte chamber 5 and in the opposite direction through electrolyte chamber 4. Exemplary electrolytes may include, but are not limited to, sodium sulfate, potassium nitrate, or others known to those skilled in the art.

Figure 3:
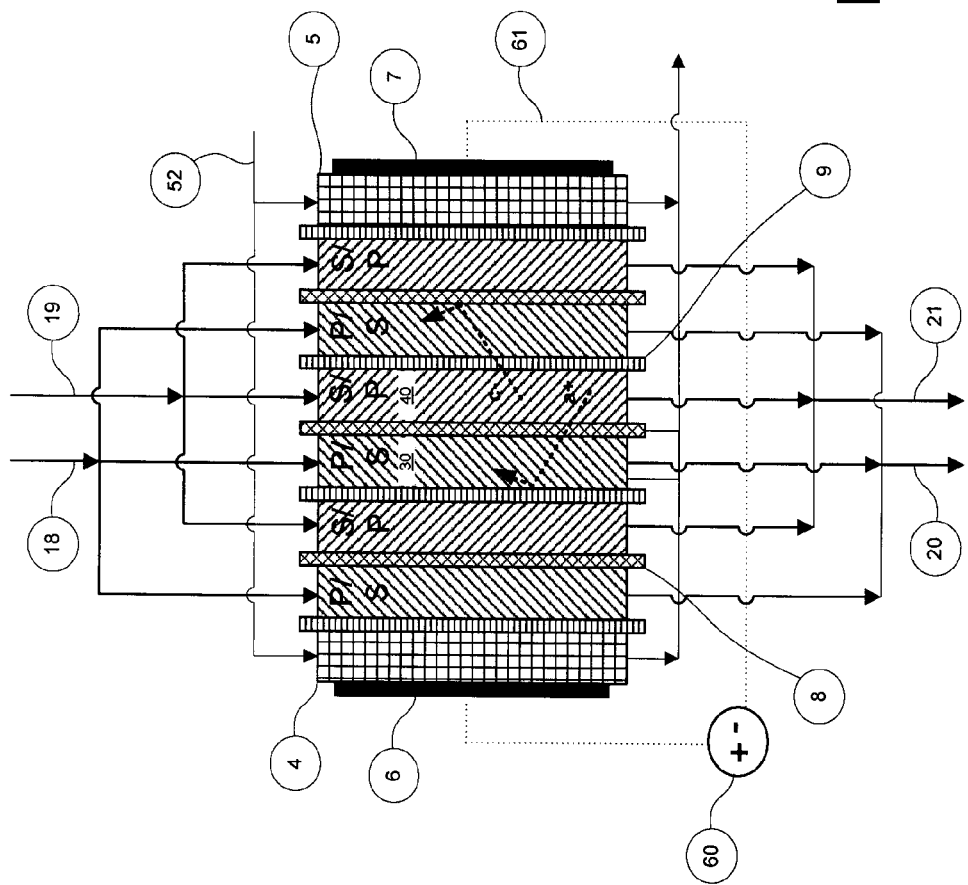
FIG. 3 is a schematic view of the EDR stack of FIG. 1 operating in reverse polarity.

As scaling constituents are present in the PIW, for example, calcium carbonate and calcium sulfates, the ion exchange membranes will accumulate sealants on their surfaces resulting in a decreased desalination efficiency of the system. Scale build up on the ion exchange membranes is indicated by an increase in resistance in electric current 61. Once the resistance has reached a level indicative of scaling on the ion exchange membranes, as determined by those skilled in the art of EDR operation, the stack polarity is switched to operate in reverse mode as shown in FIG. 3. The polarity of the electric potential 60 is reversed resulting in anode/cathode electrode 7 becoming the cathode and cathode/anode electrode 6 becoming the anode. At the same time the hydraulic reversal procedure described with reference to Table 1 is initiated such that the PIW and saline water chambers are swapped. In reverse polarity configuration the PIW flows through S-P inlet conduit 19 into S-P chambers 40 and exits via S-P conduit 21; and saline water flows through P-S inlet conduit 18 into P-S chambers 30 and exits via P-S outlet conduit 20. The counter-flow of ions through the ion exchange membranes 8, 9 in the reverse mode effectively removes scale build up from the forward operation mode. For a highly concentrated PIW where application of the electric potential 60 is not required, reversal mode is initiated by following the hydraulic reversal procedure described with reference to Table 1 such that the PIW and saline water chambers are swapped to reverse the flow of ions through the membranes from the highly concentrated PIW to the less concentrated saline water. The EDR stack 2 operates cyclically between the forward and reverse mode to continuously remove scale build up on the ion exchange membranes 8, 9.

In an alternative embodiment (not shown) the process may use alternative means for switching the flow of solutions through S-P chambers 40 and P-S chambers 30 to the reversal valve arrays 14, 22 as would be known to a person of skill in the art, for example the gaskets described in WO 2010/115287 (incorporated herein by reference). Furthermore, alternative embodiments (not shown) may use an ED stack without reversal technology and the stack may be cleaned on a regular basis, for example using the cleaning system described herein, to minimise build up of sealants on the ion exchange membranes.

In further alternative embodiments (not shown) the WSRP 1 may include multiple stacks 2 with an electrode positioned at each end of each stack. Each stack is connected to the manifolding of the PIW and saline water circuits, thereby beneficially reducing manifolding requirements whilst increasing product output. The multiple stack arrangement may comprise a modular apparatus as disclosed in WO 2012/019282 (incorporated herein by reference).

The embodiments disclosed herein are directed at desalinating contaminated waste water from an industrial process, however in alternative embodiments, the WSRP may be used for desalinating any contaminated saltwater.

Alternative embodiments described herein are directed at a method and plant to desalinate a salt solution and produce a concentrated discharge solution using a multi-chamber electrodialysis stack. More specifically, the electrodialysis stack is internally staged to reduce the concentration factor across any single membrane and increase the maximum concentration difference across a single stack. Reducing the concentration factor across ion exchange membranes in the electrodialysis stack beneficially reduces concentration gradient polarization resulting in increased current limit density while also improving current efficiency. The internally staged stack enables a higher concentration difference in a more compact stack arrangement than would be possible with external staging.

Figure 4:
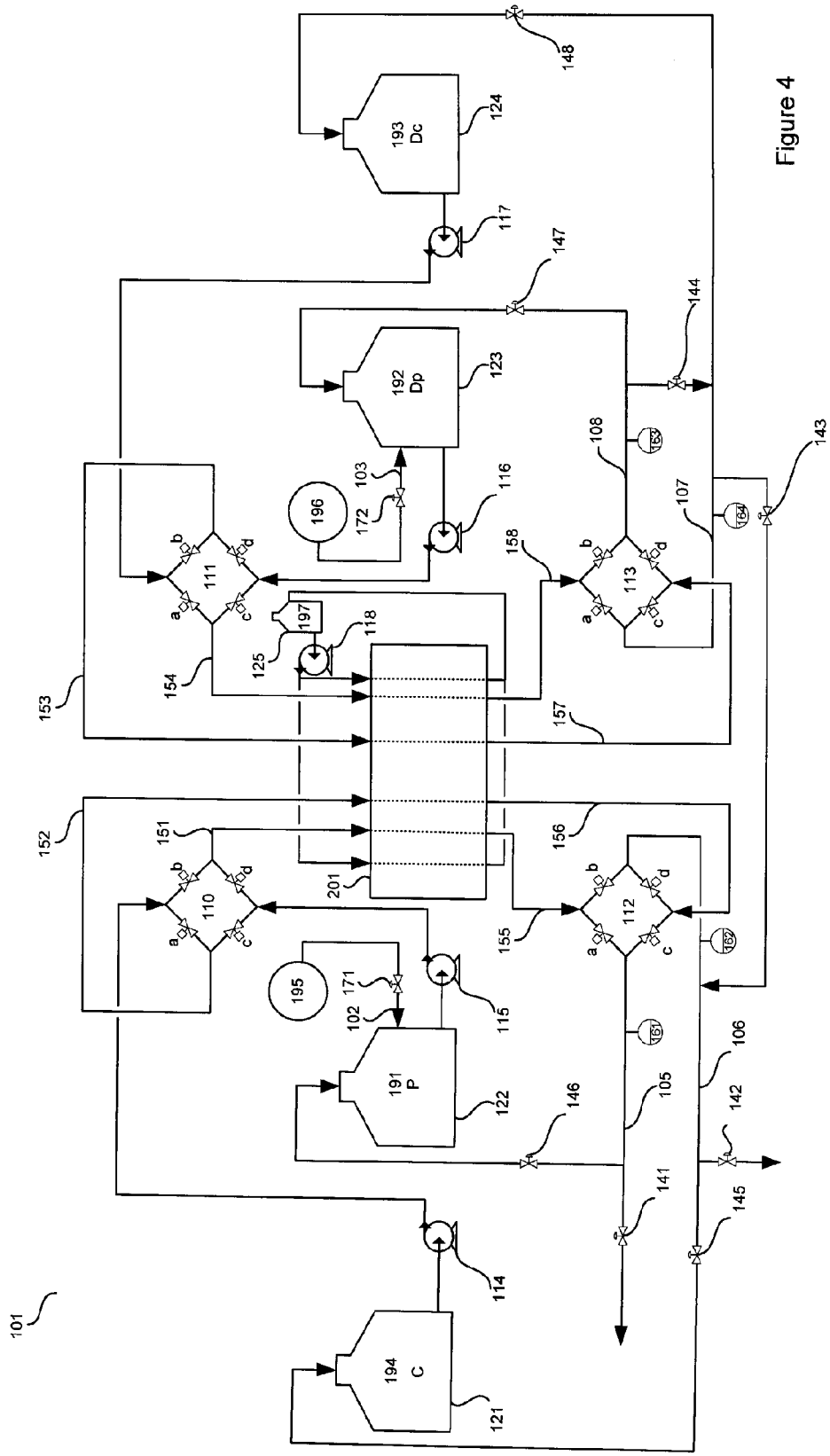
FIG. 4 is a schematic view of an internally staged multiple chamber electrodialysis reversal (MC-EDR) plant including a MC-EDR stack according to an embodiment.

Referring to FIG. 4, there is shown an internally staged multiple chamber electrodialysis reversal (MC-EDR) plant 101 with four saltwater solutions P, Dp, Dc, C passing through MC-EDR stack 201 which can be run in forward or reverse polarity. The product ("P") solution 191 is the lowest concentration saltwater, or desalination product, and P circuit includes manifolding fluidly coupling the MC-EDR stack 201 with product tank 122; diluent_p ("Dp") solution 192 is weakly concentrated solution and Dp circuit includes manifolding fluidly coupling the MC-EDR stack 201 with diluent_p tank 123; diluent_c ("Dc") solution 193 is medium concentrated solution and Dc circuit includes manifolding fluidly coupling the MC-EDR stack 201 with diluent_c tank 124; and concentrate ("C") solution 194 is highly concentrated solution and C circuit includes manifolding fluidly coupling the MC-EDR stack 201 with concentrate tank 121. The MC-EDR stack 201 is configured in such a way that product solution 191 flowing through stack 201 decreases in ion concentration by transfer of ions through ion exchange membranes from product solution 191 through diluent_p solution 192 and diluent_c solution 193 to the concentrate solution 194. The net result is that the product solution 191 is desalinated and the concentrate solution 194 is concentrated.

Upstream saltwater source 195 feeds into product tank 122 through product inlet 102 and product inlet control valve 171 after passing through an optional pre-treatment stage (not shown). Exemplar pre-treatment may include, but is not limited to, physical filters (such as microfiltration or ultrafiltration), dissolved air filtration, coagulation and sedimentation, media filtration or other methods known to those skilled in the art. Product solution 191 is stored in product tank 122, which may include an optional heating element (not shown) to increase the temperature of the solution and thereby beneficially increase MC-EDR system efficiency through increased conductivity internal to the MC-EDR stack 201. Product pump 115 pumps product solution 191 from product tank 122 to P-C inlet valve reversal array 110. The P-C inlet valve reversal array 110 includes four reversal valves 110a, 110b, 110c, 110d which can be opened or closed to direct flow of product solution 191 and concentrate solution 194 either to P-C inlet conduit 151 or C-P inlet conduit 152 depending on whether the MC-EDR stack 201 is operating in forward or reverse polarity configuration. Table 2 below provides the reversal valve positions for each polarity configuration.

TABLE 2

Reversal Valve Positions for MC-EDR Plant 101

| Reversal Valve Number | MC-EDR Forward Polarity | MC-EDR Reverse Flush | MC-EDR Reverse Polarity | MC-EDR Forward Flush |
|---|---|---|---|---|
| 110a | Open | Closed | Closed | Open |
| 110b | Closed | Open | Open | Closed |
| 110c | Closed | Open | Open | Closed |
| 110d | Open | Closed | Closed | Open |
| 111a | Closed | Open | Open | Closed |
| 111b | Open | Closed | Closed | Open |
| 111c | Open | Closed | Closed | Open |
| 111d | Closed | Open | Open | Closed |
| 112a | Open | Closed | Closed | Closed |
| 112b | Closed | Open | Open | Open |
| 112c | Closed | Closed | Open | Closed |
| 112d | Open | Open | Closed | Open |
| 113a | Closed | Open | Open | Open |
| 113b | Open | Closed | Closed | Closed |
| 113c | Open | Open | Closed | Open |
| 113d | Closed | Closed | Open | Closed |

In the forward polarity configuration, product solution 191 passes through open reversal valve 110d and enters MC-EDR stack 201 via P-C inlet conduit 151. The product solution 191 passes through the MC-EDR stack 201 and exits at a lower ion concentration through P-C outlet conduit 155. Output product solution then enters P-C outlet valve reversal array 112 and passes through open reversal valve 112a and into product conduit 105.

Product concentration sensor 161, which may be a conductivity sensor, detects the ion concentration level in output product solution leaving P-C outlet reversal valve array 112. Product exit control valve 141 and product return control valve 146 can be modulated to either return output product solution to product tank 122 or remove output product solution from the process. For example, if the ion concentration of output product solution measured by product concentration sensor 161 is below a specified value, product exit control valve 141 opens to allow discharge of output product solution from the process. As a result, the level in product tank 122 will drop. Product inlet control valve 171 will modulate and open to allow addition of source saltwater 195, which will result in more product to be desalinated, an increase in the ion concentration of product solution 191 in product tank 122, and an increase in output ion concentration measured by product concentration sensor 161. If the ion concentration of output product solution is above a specified value, product exit control valve 141 closes while the product return control valve 146 opens to allow return of output product solution back to the product tank 122 for further desalination in order to meet the desired output product ion concentration.

Upstream saltwater source 196 feeds into diluent_p tank 123 through diluent_p inlet 103 and diluents inlet control valve 172 after passing through an optional pre-treatment stage (not shown). Diluent_p tank 123 may include an optional heating element (not shown) to increase the temperature of the solution and thereby beneficially increase MC-EDR system efficiency through increased conductivity internal to the MC-EDR stack 201. Upstream saltwater source 196 may be the same source as upstream saltwater source 195, or it may be a different source. Diluent_p pump 116 pumps diluent_p solution 192 from diluent_p tank 123 to Dp-Dc inlet reversal valve array 111. In the forward polarity configuration, diluent_p solution 192 passes through open reversal valve 111c and into MC-EDR stack 201 via through Dp-Dc inlet conduit 154. Output diluent_p solution exits MC-EDR stack 201 at an increased ion concentration through Dp-Dc outlet conduit 158 into Dp-Dc outlet valve reversal array 113. Output diluent_p solution passes through open reversal valve 113b into diluent_p conduit 108 where diluent_p concentration sensor 163 detects the ion concentration of output diluent_p solution exiting the Dp-Dc outlet valve reversal array 113. If the measured ion concentration of output diluents solution is above a specified value, diluent_p exit control valve 144 may be opened slightly and diluent_p return control valve 147 may be closed slightly to allow output diluent_p solution to be transferred to the Dc circuit. As a result, the level in diluent_p tank 123 will drop and the diluent_p inlet control valve 172 will modulate to allow addition of source saltwater 196. If the measured ion concentration of output diluent_p solution is below a specified value, diluent_p exit control valve 144 is closed and diluents return control valve 147 opened so that output diluents solution is returned to diluent_p tank 123 until the desired ion concentration is reached.

The diluent_c ("Dc") solution 193 is stored in diluent_c tank 124, which may include an optional heating element (not shown) to increase the temperature of the solution, thereby beneficially increasing MC-EDR system efficiency through increased conductivity internal to MC-EDR stack 201. Solution enters the Dc circuit through diluent_p exit control valve 144 as described above. Diluent_c pump 117 pumps diluent_c solution 193 to Dp-Dc inlet reversal valve array 111. In the forward polarity configuration diluent_c solution 193 passes through open reversal valve 111b and into MC-EDR stack 201 through Dc-Dp inlet conduit 153. Output diluent_c solution exits MC-EDR stack 201 at a higher ion concentration and travels through Dc-Dp outlet conduit 157 to Dp-Dc outlet reversal valve array 113. Output diluent_c solution passes through open reversal valve 113c into diluent_c conduit 107 where concentration sensor 164 detects the ion concentration of output diluent_c solution exiting Dp-Dc outlet reversal valve array 113. If the measured ion concentration of output diluent_c solution in diluent_c conduit 107 is above a specified concentration, diluent_c exit control valve 143 may be opened slightly and diluent_c return control valve 148 may be opened slightly to allow output diluent_c solution to enter the C circuit. If the measured concentration of output diluent_c solution is below a specified concentration, diluent_c exit control valve 143 is closed and diluent_c return control valve 148 is opened to allow output diluent_c solution to return to diluent_c tank 124 for further concentration.

Concentrate ("C") solution 194 is stored in concentrate tank 121, which may include an optional heating element (not shown) to increase the temperature of the solution, thereby beneficially increasing MC-EDR system efficiency through increased conductivity internal to MC-EDR stack 201. Solution enters the C circuit from the Dc circuit when diluent_c exit control valve 143 is opened. Concentrate solution 194 is pumped from concentrate tank 121 by concentrate pump 114 to P-C inlet valve reversal array 110. In the forward polarity configuration concentrate solution 194 passes through open reversal valve 110a and into MC-EDR stack 201 through C-P inlet conduit 152. Output concentrate solution leaves MC-EDR stack 201 at a higher ion concentration via C-P outlet conduit 156 and enters P-C outlet reversal valve array 112. Output concentrate solution passes through open reversal valve 112d into concentrate conduit 106 where concentration sensor 162 measures the ion concentration of output concentrate solution exiting P-C outlet reversal valve array 112. If the measured ion concentration of output concentrate solution in concentrate conduit 106 is above a specified concentration, concentrate exit control valve 142 is opened to allow output concentrate solution to exit the system. If the measured ion concentration of output concentrate solution in concentrate conduit 106 is below a specified concentration, then concentrate exit control valve 142 is closed and concentrate return control valve 145 is opened to return output concentrate solution to concentrate tank 121 to be further concentrated.

A level sensor in diluent_c tank 124 (not shown) measures the level of diluent_c solution 193 in diluent_c tank 124. Exemplar level sensors may include float switches, pressure sensors, ultrasonic level sensors or other appropriate sensors known to those skilled in the art. When a low level set point is reached, diluent_p exit control valve 144 is opened slightly and diluent_p return control valve 147 is closed slightly to allow solution transfer from the Dp circuit to the Dc circuit. A level sensor in concentrate tank 121 (not shown) measures the level of concentrate solution 194 in concentrate tank 121. When a low level set point is reached, diluent_c exit control valve 143 is opened slightly and diluent_c return control valve 148 is closed slightly to allow solution transfer from the Dc circuit to the C circuit.

If, in theory, saltwater make-up water is added to the C circuit rather than the Dp circuit (not shown) steady state operation may be achieved where no saltwater is transferred into or out of the Dp circuit and Dc circuit as only ions are transferred from product solution 191 through the ion exchange membranes to the diluent_p solution 192, and then again through ion exchange membranes to the diluent_c solution 193. In practice however, some water is transferred through the ion exchange membranes either due to osmotic, electro-osmotic, or leakage effects. As a result, it is beneficial to include the diluent_p exit control valve 144 and diluent_c exit control valve 143 to allow control of solution levels. In addition, it is beneficial to add the saltwater source solution to the lower concentration circuits such that a low concentration factor across each circuit may be maintained and concentration polarization and current efficiency losses are minimized. The above described control system provides utility to maintain low concentration factors across each circuit, maintain circuit concentrations, maintain tank levels, and ultimately operate an efficient system that can produce a high concentration discharge in a non-attended (automated) manner.

Electrolyte 197 is stored in electrolyte tank 125 to complete the electrical circuit within the MC-EDR stack 201. The electrolyte 197 is circulated in a closed loop by electrolyte pump 118. A closed loop parallel circuit is illustrated in FIG. 4, where electrolyte 197 flows along both ends of the MC-EDR stack 201 in the same direction as all the saltwater solutions 191, 192, 193, 194; however, a person of skill in the art would understood that a closed loop series circuit is also possible, where electrolyte 197 flows in the same direction as the saltwater solutions 191, 192, 193, 194 on one side of the MC-EDR stack 201 and in the opposite direction to saltwater solution flow on the other side of the MC-EDR stack 201. Exemplary electrolytes may include sodium sulfate, potassium nitrate, or others known to those skilled in the art.

Figure 5:
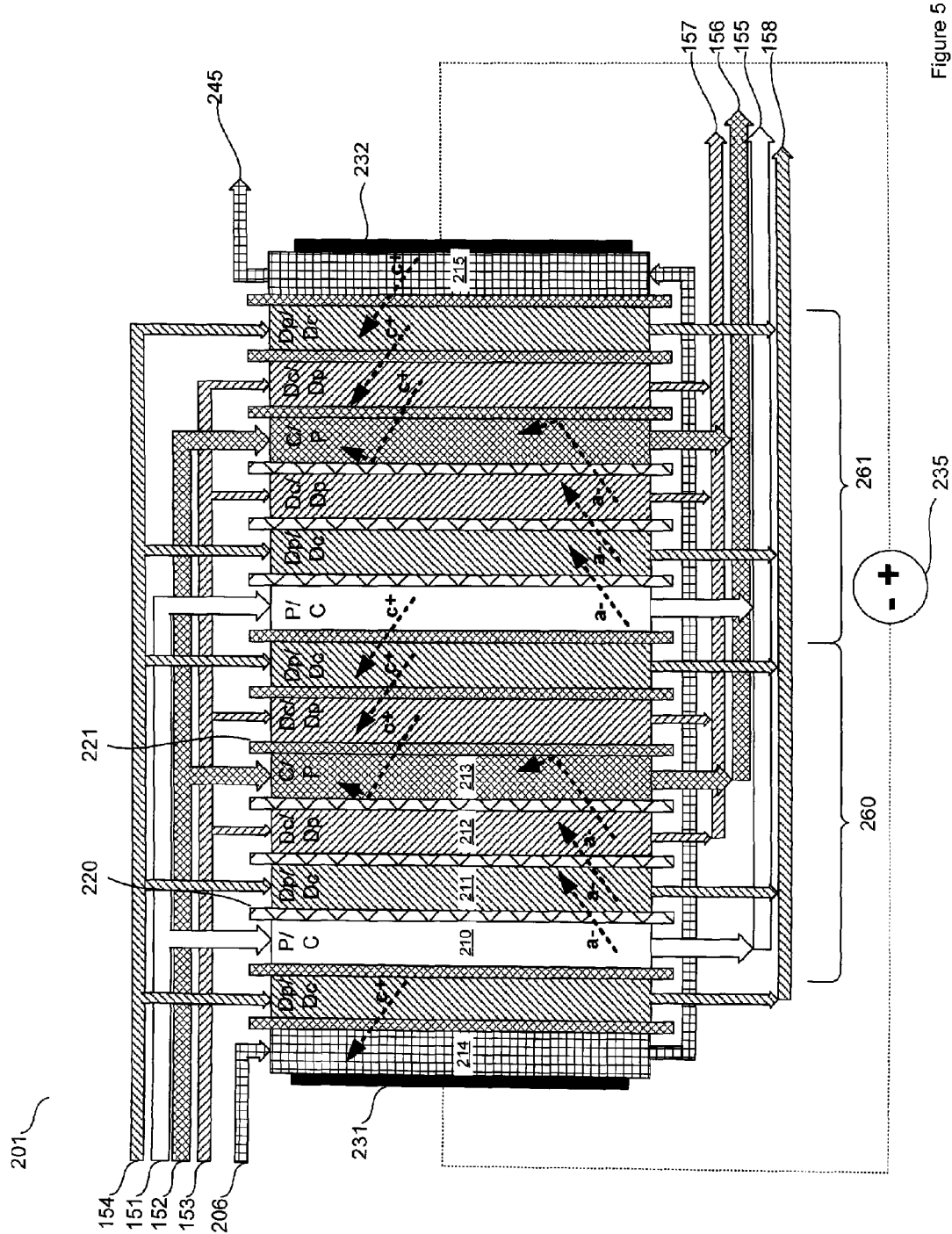
FIG. 5 is a schematic view of the MC-EDR stack of FIG. 4 operating in forward polarity.

FIG. 5 shows the MC-EDR stack 201 operating in forward polarity. Product solution 191 flows into P/C chambers 210 through P-C inlet conduit 151 and exits via P-C outlet conduit 155. Diluent_p solution 192 flows into Dp/Dc chambers 211 through Dp-Dc inlet conduit 154 and exits via Dp-Dc outlet conduit 158. Diluent_c solution 193 flows into Dc/Dp chambers 212 through Dc-Dp inlet conduit 153 and exits via Dc-Dp outlet conduit 157. Concentrate solution 194 flows into C/P chambers 213 through C-P inlet conduit 152 and exits via C-P outlet conduit 156. P/C chambers 210, Dp/Dc chamber 211, Dc/Dp chamber 212, and C/P chamber 213 are separated by ion exchange membranes. There are two types of ion exchange membranes in the MC-EDR stack 201 arranged in a unique sequence: (1) anion exchange membrane 220 which transfer negative ions (anions) and reject positive ions (cations); and (2) cation exchange membrane 221 which transfer cations and reject anions. Exemplar anion exchange membranes include Neosepta AM-1, AFN, AMX; Ralex AMH-PES; Fumasep FAD; and Selemion DVS, APS membranes. Exemplary cation exchange membranes include Neosepta CMX, CM-1; Ralex CMH-PES; Fumasep FKE, FKD; and Selemion CMV membranes.

In known EDR stacks, such as the stack described in WO 2010/115287, anion and cation exchange membranes alternate throughout the stack so that each chamber has a cation exchange membrane on one side and an anion exchange membrane on the opposite side of the chamber. In this arrangement cations and anions only transfer from one chamber into an adjacent chamber and not across multiple chambers. In the MC-EDR stack 201 shown in FIG. 5, one side of P/C chamber 210 has three adjacently aligned cation exchange membranes 221 and the other side of P/C chamber 210 has three adjacently aligned anion exchange membranes 220. This results in each of the Dc/Dp chambers 211 and the Dc/Dp chambers 212 having a cation exchange membrane 221 on both sides of the chamber or an anion exchange membrane 220 on both sides of the chamber, whereas the P/C chambers 210 and the C/P chambers 213 each have a cation exchange membrane 221 on one side and an anion exchange membrane 220 on the opposite side of the chamber. This allows transfer of anions and cations across multiple chambers from the P/C chambers 210 to the C/P chambers 213 as is described in more detail below.

On each end of the MC-EDR stack 201 are electrolyte chambers: electrolyte chamber 214 on the cathode side; and electrolyte chamber 215 on the anode side. Electrolyte solution 197 is stored in electrolyte tank 125 and pumped by electrolyte pump 118 through electrolyte inlet conduit 206 into electrolyte chamber 214 and exits electrolyte chamber 215 through electrolyte exit conduit 245 in a closed loop. The closed loop electrolyte circuit illustrated in FIG. 5 is a series arraignment; however, a parallel closed loop circuit is also possible as shown in FIG. 4.

A direct current power source 235 is applied to the MC-EDR stack 201 to provide a DC voltage and current at the cathode/anode electrode 231 and anode/cathode electrode 232. Changing the polarity of the DC power supply changes whether each electrode is operating as a cathode or anode. Reduction and oxidation of reactions of the electrolyte occur at the cathode and anode respectively, converting the DC electrical current into an ionic current. In the illustrated forward polarity configuration shown in FIG. 5, cathode/anode electrode 231 operates as the cathode, and anode/cathode electrode 232 acts as the anode. Exemplar applied voltages may range from 0.5V to 2.5V per chamber pair in order to drive ions across ion exchange membranes, while avoiding problems associated with water splitting at higher voltages. Those skilled in the art will be able to measure the current limit density of a particular MC-EDR stack 201 under its operating concentrations and temperatures, and then set the applied voltage to operate at the most economic current limit density on a basis of combined capital and operating costs. In an alternative embodiment (not shown), a drive cell, such as the drive cell disclosed in WO 2010/115287 or WO 2009/155683 may be used for application of a voltage across the chambers.

The combined DC voltage and ionic current force ions across the ion exchange membranes in the arrangement shown in FIG. 5 as follows:
  cations and anions are transferred from the P/C chamber 210 to the Dp/Dc chambers 211 on either side of the P/C chamber 210 effecting desalination of product solution 191; and
  cations and anions are transferred from the Dp/Dc chambers 211 to the Dc/Dp chambers 212, then from the Dc/Dp chambers 212 to the C/P chamber 213.

The net effect is transfer of anions from the P/C chamber 210 across the Dp/Dc and Dc/Dp chambers 211, 212 to the C/P chamber 213 and transfer of cations from the P/C chamber 210 across the Dp/Dc and Dc/Dp chambers 211, 212 to the C/P chamber 213. This arrangement prevents a build-up of ions in the Dp circuit and Dc circuit and beneficially enables a lower concentration factor across each membrane than would be possible in a two chamber EDR where ions are transferred directly from the P/C chamber 210 to the C/P chamber 213.

FIG. 5 consists of two complete MC-EDR cells: cell 260 and cell 261. Each cell 260 and cell 261 consists of one P/C chamber 210, two Dp/Dc chambers 211, two Dc/Dp chambers 212, and one C/P chamber 213. Alternative embodiments (not shown) have more than two MC-EDR cells together within a single stack in order to reduce the overall footprint and increase production. It is desirable not to have a P/C chamber 210 or C/P chamber 213 placed beside an electrolyte chamber 214, 215. An extra Dp/Dc chamber 211 or Dc/Dp chamber 212 may be placed on either side of cell 261 or cell 262 to avoid placing a P/C chamber 210 or C/P chamber 213 next to an electrolyte cell.

As scaling constituents are present in the feed solutions, e.g., calcium carbonate and calcium sulfates, the MC-EDR ion exchange membranes will accumulate sealants on their surfaces resulting in a decreased desalination efficiency of the system. Scale build up on the ion exchange membranes is indicated by an increase in resistance, which can be measured as either decreased current in constant voltage operating mode or increased voltage in constant current operating mode. Once the resistance has reached a level indicative of scaling on the ion exchange membranes, the stack will be switched to operate in the reverse mode as depicted in FIG. 6.

Figure 6:
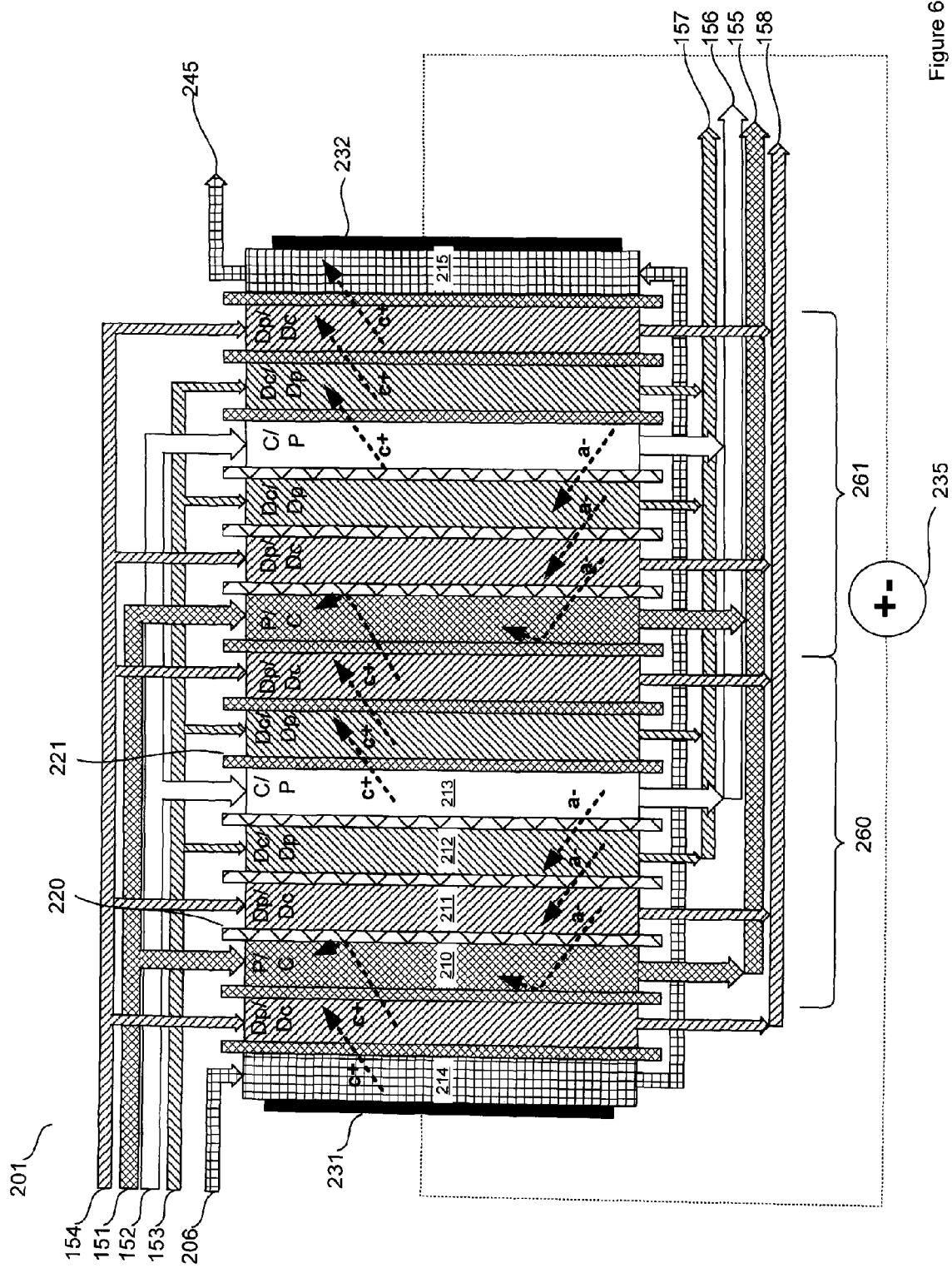
FIG. 6 is a schematic view of the MC-EDR stack of FIG. 4 operating in reverse polarity.

Referring now to FIG. 6 there is shown the MC-EDR stack 201 in reverse polarity wherein the direct current power source 235 polarity is reversed resulting in cathode/anode electrode 231 becoming the anode, and anode/cathode electrode 232 becoming the cathode. The polarity of the voltage applied to the stack and the direction of the ionic current are reversed, thereby resulting in a change in ion transfer direction through each membrane, thereby desalinating the ion exchange membranes.

In order to maintain production of desalinated water when ion transfer has changed direction, the saltwater internal to each chamber must also be changed for the reverse polarity configuration. Concentrate solution 194 is pumped from concentrate tank 121 through open reversal valve 110b and into P/C chambers 210 through P-C inlet conduit 151. Output concentrate solution exits P/C chambers 210 via P-C outlet conduit 155 and passes through open reversal valve 112b into concentrate conduit 106. Product solution 191 is pumped from product tank 122 through open reversal valve 110c and into C/P chambers 213 through C-P inlet conduit 152. Output product solution exits C/P chambers 213 via C-P outlet conduit 156 and passes through open reversal valve 112c into product conduit 105. Diluent_p solution 192 is pumped from diluent_p tank 123 through open reversal valve 111d and into Dc/Dp chambers 212 through Dc-Dp inlet conduit 153. Output diluent_p solution exits Dc/Dp chambers 212 via Dc-Dp outlet conduit 157 and passes through open reversal valve 113d into diluent_p conduit 108. Diluent_c solution 193 is pumped from diluent_c tank 124 through open reversal valve 111a and into Dp/Dc chambers 211 through Dp/Dc inlet conduit 154. Output diluent_c solution exits Dp/Dc chambers 211 via Dp/Dc outlet conduit 158 and passes through open reversal valve 113a into diluent_c conduit 107. Flow direction is not reversed in the disclosed embodiment; however, it is possible to reverse flow in reverse polarity operation to back flush the MC-EDR 201 stack for enhanced sealant removal.

The combined DC voltage and ionic current force ions across the ion exchange membranes in the arrangement shown in FIG. 6 as follows:
cations and anions are transferred from the C/P chamber 213 to the Dc/Dp chambers 212 on either side of C/P chamber 213 effecting desalination of product solution 191; and
cations and anions are transferred from the Dc/Dp chambers 212 to the Dp/Dc chambers 211, then from the Dp/Dc chambers 211 to the P/C chamber 210.

The net effect is transfer of anions from the C/P chamber 213 across the Dc/Dp chambers 212 and the Dp/Dc chambers 211 to the P/C chamber 210 and transfer of cations from the C/P chamber 213 across the Dc/Dp chambers 212 and the Dp/Dc chambers 211 to the P/C chamber 210.

Directly after the polarity is switched to operate in the reverse polarity configuration, there will be a short period where concentrate solution 194 from operation in the forward polarity configuration remains in the pipework which is now associated with the P circuit. In order to prevent the concentrate solution 194 from entering the product tank 122, the reversal valves of P-C outlet reversal valve array 112 operate a MC-EDR reverse flush mode for a period of time, for example 1 minute, before switching to MC-EDR reverse polarity mode. As shown in Table 2, in MC-EDR reverse flush mode reversal valve 112c remains closed and reversal valve 112d remains open to direct a slug of mixed concentrate and product solution to the concentrate conduit 106. After a period of time all remaining concentrate solution 194 should have been flushed from the system and the reversal valves can now switch to the MC-EDR reverse polarity mode. Conversely, when the polarity switches from reverse configuration to forward configuration the reversal valves of P-C outlet reversal valve array 112 operate in MC-EDR forward flush mode for a period of time, for example 1 minute, before switching to MC-EDR forward polarity mode. In MC-EDR forward flush mode reversal valve 112a remains closed and reversal valve 112b remains open to direct a slug of mixed concentrate and product solution to the concentrate conduit 106.

In an alternative embodiment, a conductivity sensor (not shown) in P-C outlet conduit 155 and C-P outlet conduit 156 may be used to detect the conductivity of the solution exiting the MC-EDR stack 201 and the reversal valves of P-C outlet reversal valve array 112 may be switched to operate in either MC-EDR forward polarity or MC-EDR reverse polarity once a threshold low salinity conductivity is detected indicating that the P circuit has been sufficiently flushed of concentrate solution 194.

The reversal valves of Dp-Dc outlet reversal valve array 113 may also operate a MC-EDR reverse flush mode and MC-EDR forward flush mode as indicated in Table 2, however the concentration difference between the diluent_p solution 192 and the diluent_c solution 193 may be low enough to negate the need to employ the MC-EDR reverse flush mode and MC-EDR forward flush mode for the Dp-Dc outlet reversal valve array 113.

Figure 7:
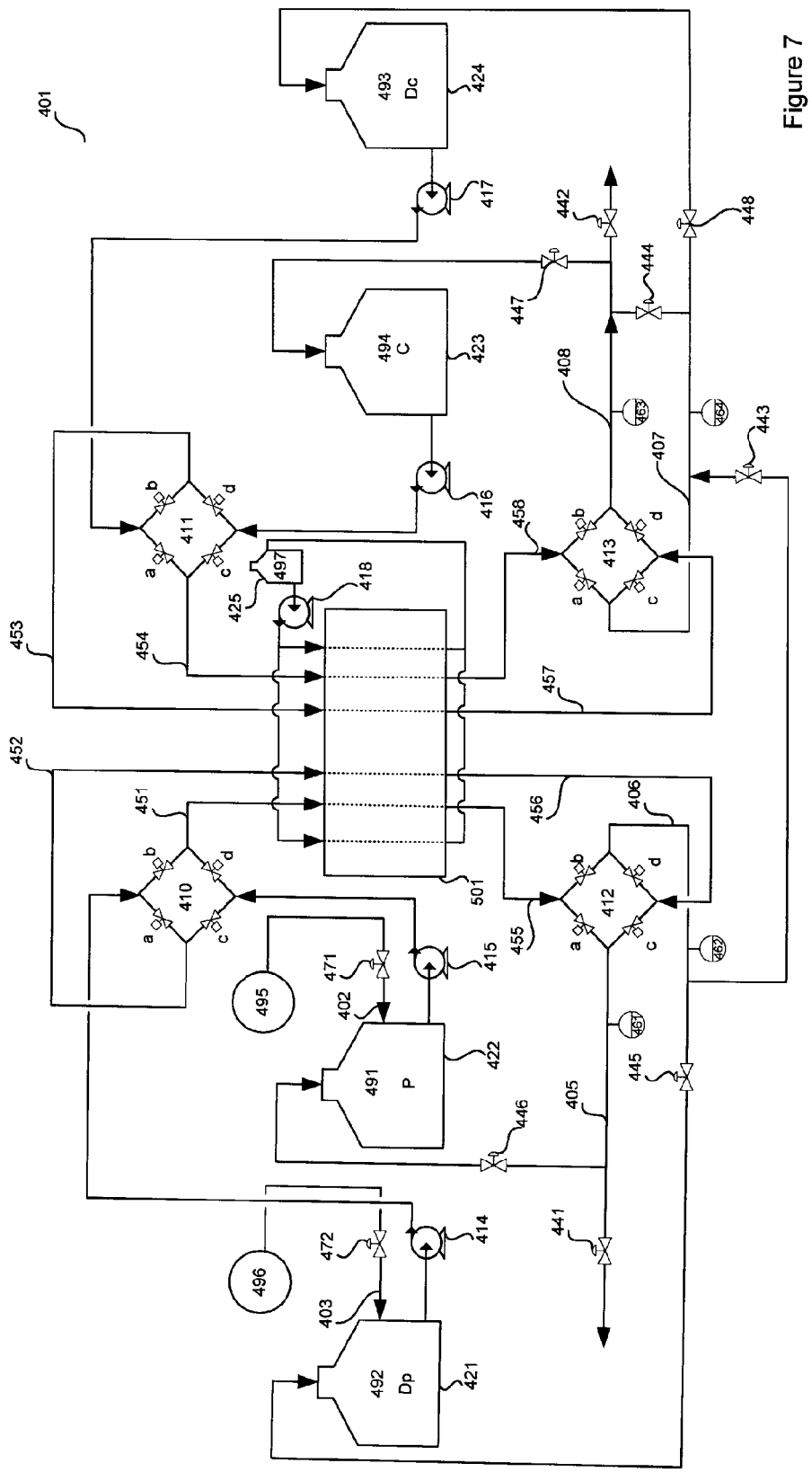
FIG. 7 is a schematic view of an internally staged multiple chamber electrodialysis reversal (MC-EDR) plant including an MC-EDR stack according to an alternative embodiment.
Figure 8:
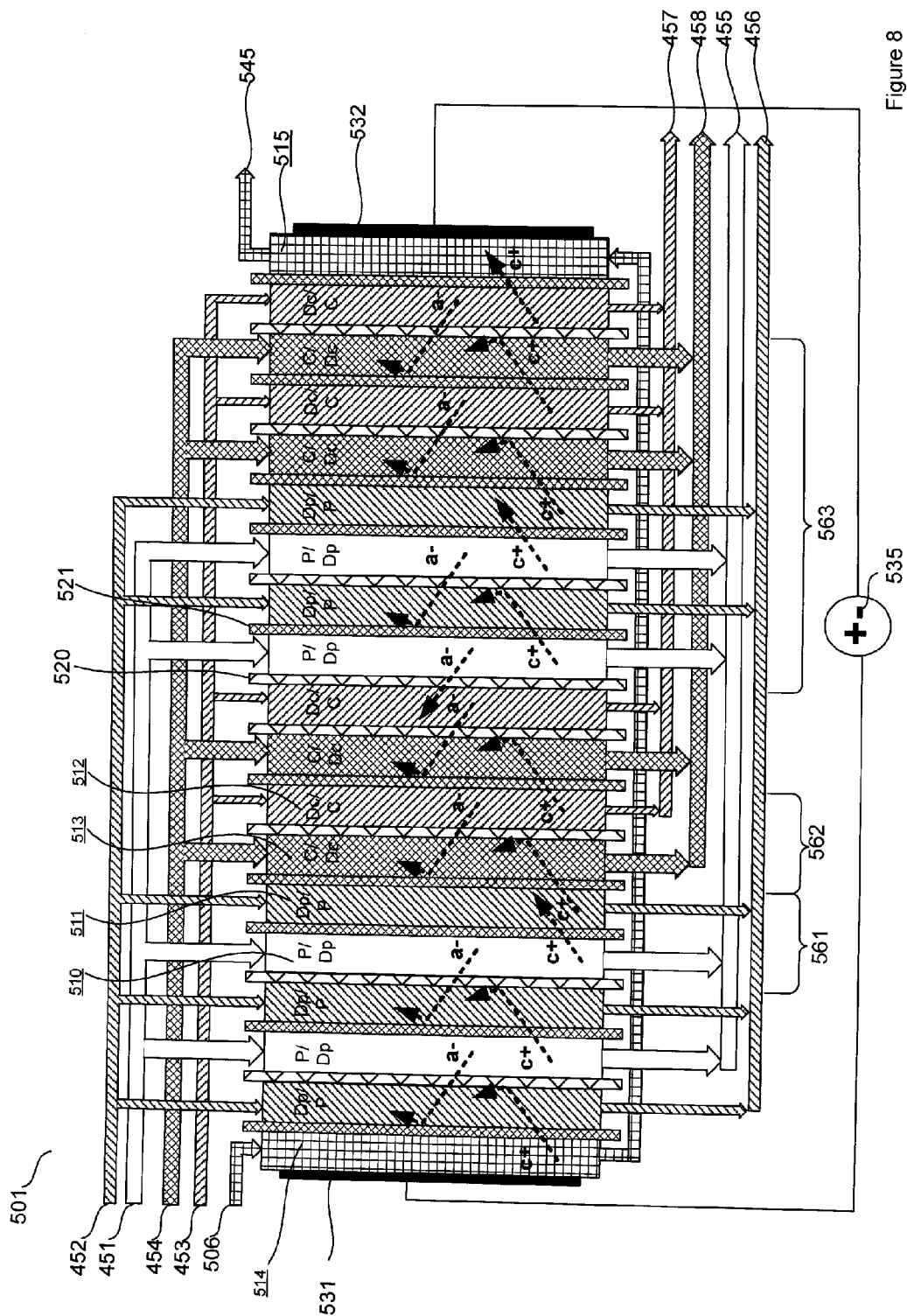
FIG. 8 is a schematic view of the MC-EDR stack of FIG. 7 operating in forward polarity.
Figure 9:
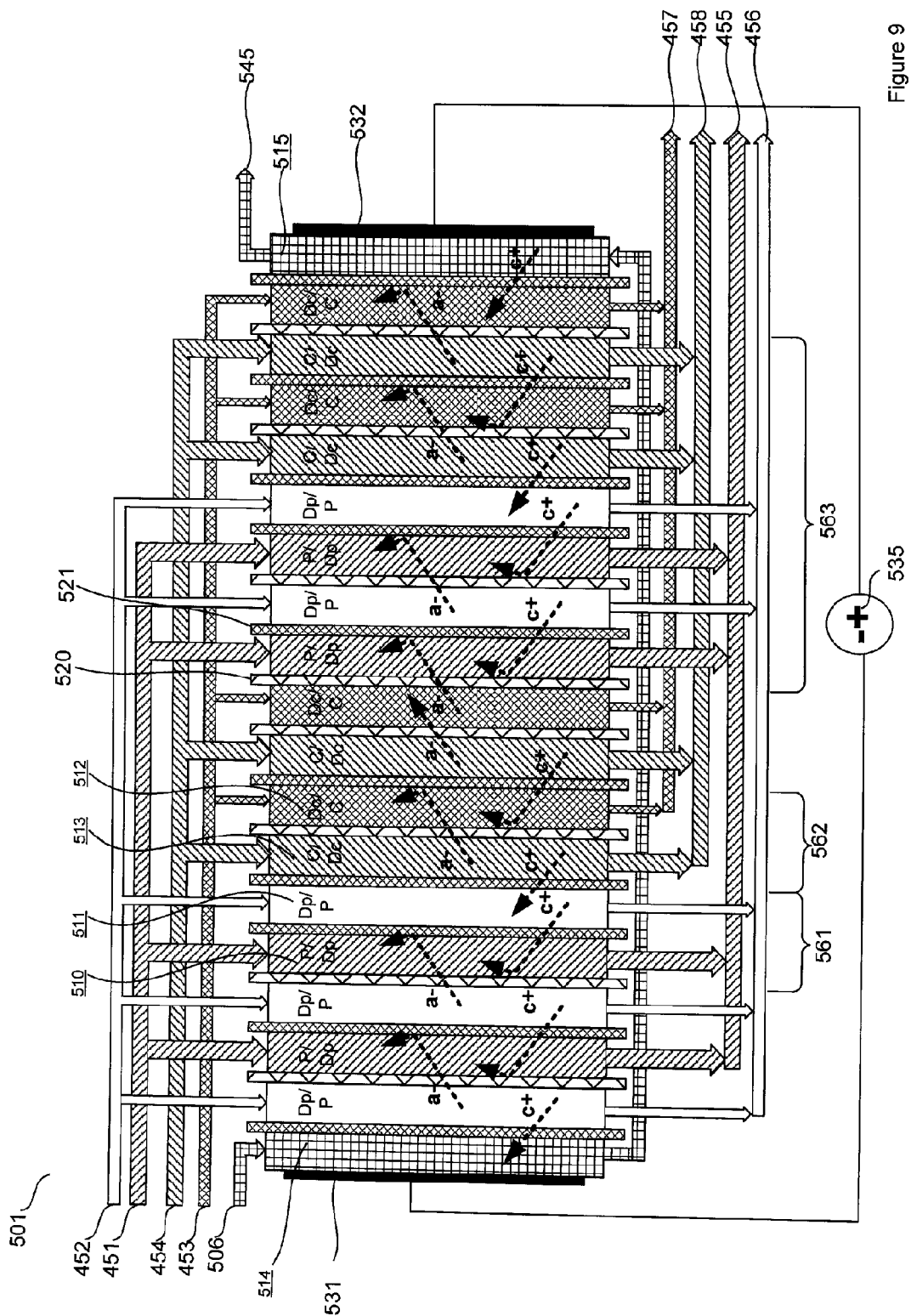
FIG. 9 is a schematic view of the MC-EDR stack of FIG. 7 operating in reverse polarity.

FIGS. 7 through 9 show an alternative embodiment of an internally staged multiple chamber electrodialysis reversal (MC-EDR) plant 401. The primary difference with the MC-EDR plant 101 and MC-EDR plant 401 relates to the internal configuration of the MC-EDR stack 201 and 501 respectively. Specifically, in MC-EDR stack 201 Dp/Dc chambers 211 and Dc/Dp chambers 212 are bounded on both sides by either an anion or cation exchange membrane. In the MC-EDR stack 501 most of the chambers are bounded by an anion exchange membrane on one side and a cation exchange membrane on the other side, however some of the chambers have an anion exchange membrane on both sides of the chamber or a cation exchange membrane on both sides of the chamber. When MC-EDR stack 501 is operated in reverse polarity, its efficiency is slightly diminished relative to MC-EDR stack 201 since one of the product chambers is next to a diluent_c chamber resulting in a higher concentration factor across the chambers and that one product chamber does not desalinate but instead acts as an ion transfer chamber, however the effect is almost negligible. Further details are described below.

Referring to FIG. 7, upstream saltwater source 495 feeds into product tank 422 through product inlet 402 and product inlet control valve 471 after passing through an optional pre-treatment stage (not shown). Exemplar pre-treatment may include, but is not limited to, physical filters, such as microfiltration or ultrafiltration, or dissolved air filtration, coagulation and sedimentation, or media filtration or other methods known to those skilled in the art. Product solution 491 is stored in product tank 422, which may include an optional heating element (not shown) to increase the temperature of the solution and beneficially increase MC-EDR system efficiency through increased conductivity internal to MC-EDR stack 501. Product pump 415 pumps product solution 491 from product tank 422 to P-Dp inlet valve reversal array 410. In the forward polarity configuration product solution 491 passes through open reversal valve 410d (see Table 3) and enters MC-EDR stack 501 via P-Dp inlet conduit 451. Output product solution exits MC-EDR stack 501 at a lower ion concentration through P-Dp outlet conduit 455 and passes into P-Dp outlet valve reversal array 412. In the forward polarity configuration, product solution passes through open reversal valve 412a (see Table 3) into product conduit 405.

TABLE 3

Reversal Valve Positions for MC-EDR plant 401

| Reversal Valve Number | MC-EDR Forward Polarity | MC-EDR Reverse Polarity |
|---|---|---|
| 410a | Open | Closed |
| 410b | Closed | Open |
| 410c | Closed | Open |
| 410d | Open | Closed |
| 411a | Closed | Open |
| 411b | Open | Closed |
| 411c | Open | Closed |
| 411d | Closed | Open |
| 412a | Open | Closed |
| 412b | Closed | Open |
| 412c | Closed | Open |
| 412d | Open | Closed |
| 413a | Closed | Open |

TABLE 3-continued

Reversal Valve Positions for MC-EDR plant 401

| Reversal Valve Number | MC-EDR Forward Polarity | MC-EDR Reverse Polarity |
|---|---|---|
| 413b | Open | Closed |
| 413c | Open | Closed |
| 413d | Closed | Open |

Product concentration sensor 461 detects the ion concentration level in output product solution leaving P-Dp outlet reversal valve array 412. Exemplar concentration sensors 461-464 may include, but are not limited to, conductivity sensors. Product exit control valve 441 and product return control valve 446 can be modulated to either return output product solution to product tank 422 or remove output product solution from the process. If the ion concentration of output product solution is below a specified value measured by product concentration sensor 461, product exit control valve 441 opens to allow discharge of output product solution. As a result, the level in product tank 422 will drop. Product tank level control valve 471 will modulate and open to allow addition of source saltwater 495, which will allow for more product to be desalinated, will increase the concentration of product solution 491 in product tank 422, and increase output concentration measured by product concentration sensor 461. If the ion concentration of output product solution is above a specified value, product exit control valve 441 closes while the product return control valve 446 opens to allow return of output product solution to the product tank 422 for further desalination in order to meet the desired outlet specified ion concentration.

Upstream saltwater source 496 enters diluent_p tank 421 via diluent_p inlet conduit 403 and diluent_p inlet control valve 472, after passing through an optional pre-treatment process (not shown). Diluent_p tank 421 may include an optional heating element (not shown) to increase the temperature of the solution to beneficially increase MC-EDR system efficiency through increased conductivity internal to MC-EDR stack 501. Upstream saltwater source 496 may be the same source as upstream saltwater source 495, or it may be a different source. Diluent_p pump 414 pumps diluent_p solution 492 from diluent_p tank 421 to P-Dp inlet reversal valve array 410. In the forward polarity configuration, diluent_p solution 492 passes through open reversal valve 410a and into MC-EDR stack 501 via Dp-P inlet conduit 452. Output diluent_p solution exits MC-EDR stack 501 at an increased ion concentration through Dp-P outlet conduit 456 into P-Dp outlet valve reversal array 412. Output diluent_p solution passes through open reversal valve 412d into diluent_p conduit 406 where diluent_p concentration sensor 462 detects the ion concentration of output diluent_p solution exiting the P-Dp outlet valve reversal array 412. If the measured ion concentration of output diluent_p solution is above a specified value, diluent_p exit control valve 443 may be opened slightly and diluent_p return control valve 445 may be closed slightly to allow output diluent_p solution to be transferred to the Dc circuit. As a result, the level in diluent_p tank 421 will drop and the diluent_p inlet control valve 472 will modulate to allow addition of source saltwater 496. If the measured ion concentration of output diluent_p solution is below a specified value, diluent_p exit control valve 443 is closed and diluent_p return control valve 445 is opened so that output diluent_p solution is returned to diluent_p tank 421 until the desired ion concentration is reached.

Diluent_c solution 493 is stored in diluent_c tank 424, which may include an optional heating element (not shown) to increase the temperature of the solution, thereby beneficially increasing MC-EDR system efficiency through increased conductivity internal to MC-EDR stack 501. Solution enters the Dc circuit through diluent_p exit control valve 443 as described above. Diluent_c pump 417 pumps diluent_c solution 493 to Dc-C inlet reversal valve array 411. In the forward polarity configuration diluent_c solution 493 passes through open reversal valve 411b and into MC-EDR stack 501 through Dc-C inlet conduit 453. Output diluent_c solution exits MC-EDR stack 501 at a higher ion concentration and travels through Dc-C outlet conduit 457 to Dc-C outlet reversal valve array 413. Output diluent_c solution passes through open reversal valve 413c into diluent_c conduit 407 where concentration sensor 464 detects the ion concentration of output diluent_c solution exiting Dc-C outlet reversal valve array 413. If the measured ion concentration of output diluent_c solution in diluent_c conduit 407 is above a specified concentration, diluent_c exit control valve 444 may be opened slightly and diluent_c return control valve 448 may be closed slightly to allow output diluent_c solution to enter the C circuit. If the measured concentration of output diluent_c solution is below a specified concentration, diluent_c exit control valve 444 is closed and diluent_c return control valve 448 is opened to allow output diluent_c solution to return to diluent_c tank 424 for further concentration.

Concentrate solution 494 is stored in concentrate tank 423, which may include an optional heating element (not shown) to increase the temperature of the solution, thereby beneficially increasing MC-EDR system efficiency through increased conductivity internal to MC-EDR stack 501. Solution enters the C circuit from the Dc circuit when diluent_c exit control valve 444 is opened. Concentrate solution 494 is pumped from concentrate tank 423 by concentrate pump 416 to Dc-C inlet reversal valve array 411. In the forward polarity configuration concentrate solution 494 passes through open reversal valve 411c and into MC-EDR stack 501 through C-Dc inlet conduit 454. Output concentrate solution leaves MC-EDR stack 501 at a higher ion concentration via C-Dc outlet conduit 458 and enters Dc-C outlet reversal valve array 413. Output concentrate solution passes through open reversal valve 413b into concentrate conduit 408 where concentration sensor 463 measures the ion concentration of output concentrate solution exiting Dc-C outlet reversal valve array 413. If the measured ion concentration of output concentrate solution in concentrate conduit 408 is above a specified concentration, concentrate exit control valve 442 is opened to allow output concentrate solution to exit the system. If the measured ion concentration of output concentrate solution in concentrate conduit 408 is below a specified concentration, then concentrate exit control valve 442 is closed and concentrate return control valve 447 is opened to return output concentrate solution to concentrate tank 423 to be further concentrated.

A level sensor in diluent_c tank 424 (not shown) measures the level of diluent_c solution 493 in diluent_c tank 424. Exemplar level sensors may include float switches, pressure sensors, ultrasonic level sensors or other appropriate sensors known to those skilled in the art. When a low level set point is reached, diluent_p exit control valve 443 is opened slightly and diluent_p return control valve 445 is closed slightly to allow solution transfer from the Dp circuit to the Dc circuit. A level sensor in concentrate tank 423 (not shown) measures the level of concentrate solution 494 in concentrate tank 423. When a low level set point is reached, diluent_c exit control valve 444 is opened slightly and diluent_c return control valve 448 is closed slightly to allow solution transfer from the Dc circuit to the C circuit.

Electrolyte 497 is stored in electrolyte tank 425 to complete the electrical circuit within the MC-EDR stack 501. The electrolyte 497 is circulated in a closed loop by electrolyte pump 418. A closed loop parallel circuit is illustrated in FIG. 7, where electrolyte 497 flows along both ends of the MC-EDR stack 501 in the same direction as all the saltwater solutions 491, 492, 493, 494; however, a person of skill in the art would understood that a closed loop series circuit is also possible, where electrolyte 497 flows in the same direction as the saltwater solutions 491, 492, 493, 494 on one side of the MC-EDR stack 501 and in the opposite direction to saltwater solution flow on the other side of the MC-EDR stack 501. Exemplary electrolytes may include sodium sulfate, potassium nitrate, or others known to those skilled in the art.

FIG. 8 shows the MC-EDR stack 501 of FIG. 7 operating in forward polarity, where the product solution 491 flows into P/Dp chambers 510 through P-Dp inlet conduit 451 and exits via P-DP outlet conduit 455; diluent_p solution 492 flows into Dp/P chambers 511 through Dp-P inlet conduit 452 and exits via Dp-P outlet conduit 456; diluent_c solution 493 flows into Dc/C chambers 512 through Dc-C inlet conduit 453 and exits via Dc-C outlet conduit 457; and concentrate solution 494 flows into C/Dc chambers 513 through C-Dc inlet conduit 454 and exits via C/Dc outlet conduit 458. P/Dp chambers 510, Dp/P chamber 511, Dc/C chamber 512, and C/Dc chamber 513 are separated by anion exchange membranes 520 and cation exchange membrane 521 arranged in a specific sequence with adjacently aligned anion exchange membranes and adjacently aligned cation exchange membranes to respectively allow transfer of anions and cations across multiple chambers as described below in more detail. Exemplar anion exchange membranes include Neosepta AM-1, AFN, AMX; Ralex AMH-PES; Fumasep FAD; and Selemion DVS, APS membranes. Exemplary cation exchange membranes include Neosepta CMX, CM-1; Ralex CMH-PES; Fumasep FKE, FKD; and Selemion CMV membranes.

On each end of the MC-EDR stack 501 are electrolyte chambers, where electrolyte chamber 515 is on the cathode side, and electrolyte chamber 514 is on the anode side. Electrolyte solution 497 stored in electrolyte tank 425 is pumped by electrolyte pump 418 through electrolyte inlet conduit 506 into electrolyte chamber 514, through electrolyte chamber 515 and exits via electrolyte exit conduit 545 in a closed loop. The closed loop electrolyte circuit illustrated in FIG. 8 is a series arraignment; however, a person of skill in the art would understand that a parallel closed loop circuit is also possible as shown in FIG. 7.

A direct current power source 535 is applied to the MC-EDR stack 501 to provide a DC voltage and current at the anode/cathode electrode 531 and cathode/anode electrode 532. Changing the polarity of the DC power supply changes whether each electrode is operating as a cathode or anode. Reduction and oxidation of reactions of the electrolyte occur at the cathode and anode respectively, converting the DC electrical current into an ionic current. In the illustrated forward polarity configuration of FIG. 8, anode/cathode electrode 531 operates as the anode, and cathode/anode electrode 532 acts as the cathode. Exemplar applied voltages may range from 0.5V to 2.5V per chamber pair in order to drive ions across ion exchange membranes, while avoiding problems associated with water splitting at higher voltages. Those skilled in the art will measure the current limit density of a particular MC-EDR stack 501 under its operating concentrations and temperatures, and then set the applied voltage to operate at the most economic current limit density on a basis of combined capital and operating costs. In an alternative embodiment (not shown), a drive cell, such as the drive cell disclosed in WO 2010/115287 or WO 2009/155683 may be used for application of a voltage across the chambers.

The combined DC voltage and ionic current force ions across the ion exchange membranes in the arrangement shown in FIG. 8 as follows:

anions and cations are transferred from the P/Dp chambers 510 to the Dp/P chambers 511, and anions are transferred from the P/Dp chamber 510 to the Dc/C chamber 512 effecting desalination of product solution 491;

cations are transferred from the Dp/P chambers 511 to the C/Dc chambers 513, and cations and anions are transfers from the Dc/C chambers 512 to the C/Dc chambers 513.

This arrangement prevents a build-up of ions in the Dp circuit and Dc circuit and beneficially enables a lower concentration factor across each membrane than would be possible in a two chamber EDR where ions are transferred directly from the product solution 491 to concentrate solution 494.

FIG. 8 shows two complete MC-EDR cells 563, each consisting of two P/Dp cells 561 and two C/Dc cells 562. It is possible to arrange more P/Dp cells 561 and C/Dc cells 562 within a single MC-EDR cell 563 as well as more MC-EDR cells 563 within a single stack.

Referring now to FIG. 9, which shows MC-EDR stack 501 in reverse polarity wherein the ions are transferred through the ion exchange membranes in a direction opposite to the direction in the forward polarity configuration shown in FIG. 8 to descale the ion exchange membranes. The direct current power source 535 polarity is reversed resulting in anode/cathode electrode 531 becoming the cathode, and cathode/anode electrode 532 becoming the anode.

In order to maintain production of desalinated water when ion transfer has changed direction, the saltwater internal to each chamber must also be changed. In the reverse polarity configuration shown in FIG. 9, concentrate solution 494 enters Dc/C chambers 512 via Dc/C inlet conduit 453 and exits via Dc/C outlet conduit 457; product solution 491 enters Dp/P chambers 511 via Dp/P inlet conduit 452 and exits via Dp/P outlet conduit 456; diluent_p solution 492 enters P/Dp chambers 510 via P/Dp inlet conduit 451 and exits via P/Dp exit conduit 455; and diluent_c solution 493 enters C/Dc chambers 513 via C/Dc inlet conduit 454 and exits via C/Dc exit conduit 458. Flow direction is not reversed in the disclosed embodiment; however, it is possible to reverse flow in reverse polarity operation to back flush the MC-EDR stack 501 for enhanced sealant removal.

The combined DC voltage and ionic current force ions across the ion exchange membranes in the arrangement shown in FIG. 9 as follows:

anions and cations are transferred from the Dp/P chambers 511 to the P/Dp chambers 510, effecting desalination of product solution 491; and cations and anions are transfers from the C/Dc chambers 513 to the Dc/C chambers 512.

In reverse polarity operation the end chambers along each MC-EDR cell 563 may not be completely desalinated due to cation transfer into the product solution 491 stream. Beneficially multiple P/Dp cells 561 and C/Dc cells 562 may be combined in a single MC-EDR cell 563 to reduce desalination potential along cell boundaries.

The above embodiments describe four chamber MC-EDR stacks 201, 501 and plant arrangement 101, 401. In an alternative embodiment (not shown) a four chamber MC-EDR stack could be configured with diluent_p and diluent_c chambers fed from a common and single diluent tank and circuit. For example, diluent_p tanks and process pipework can be removed and diluent_c tank and process pipework used to feed the diluent_p chambers and diluent_c chambers in the MC-EDR stack. This will beneficially reduce balance of plant hardware and costs. In alternative embodiments (not shown) the MC-EDR stack and process plant may be expanded to include additional saltwater circuits and stack chambers, for example six, or eight, each at an increasing concentration thus reducing the concentration factor across any single membrane.

In alternative embodiments (not shown) the MC-EDR plant 101, 401 may use alternative means as would be known to a person of skill in the art for switching the flow of solutions through the chambers of the MC-EDR stack 201, 501 rather than the reversal valve arrays described herein, for example the gaskets described in WO 2010/115287. Furthermore, alternative embodiments (not shown) may use a multi-chamber ED (MC-ED) stack without reversal technology and the stack may be cleaned on a regular basis, for example using the cleaning system described herein, to minimise build up of sealants on the ion exchange membranes.

In further alternative embodiments (not shown) the MC-EDR plant 101, 401 may include multiple stacks 201, 501 with an electrode positioned at either end of each stack. Each stack is connected to the manifolding of the P, Dp, Dc and C circuits, thereby beneficially reducing manifolding requirements whilst increasing product output. The multiple stacks may be compressively coupled and may comprise a modular apparatus as disclosed in WO 2012/019282 (incorporated herein by reference).

The MC-EDR system described herein may be used for processes that benefit from EDR, for example the two stage desalination process described below.

Alternative embodiments described herein are generally directed at a two stage desalination plant and method of operating the plant that achieves the benefits of increased recovery on hard saltwater without the need for chemical input. The plant consists of a first stage electrodialysis (ED) system followed by a second stage desalination system. Exemplar second stage desalination systems include, but are not limited to, reverse osmosis (RO), multistage flash (MSF), multiple effect (MED) and membrane distillation (MD). Recovery from these second stage desalination systems is generally limited by scaling ions such as calcium, magnesium, or sulfates. The first stage ED system uses ion exchange membranes that have a high transference for divalent ions commonly associated with inorganic scaling such as calcium, magnesium, and sulfates. The result is that the first stage ED will preferentially transport said scaling ions from the feed water of the second stage desalination systems to its concentrated reject. This enables the second stage desalination system to operate at a higher recovery and produce more desalinated product water.

Electrolyte chambers of an ED stack can be bound with anion exchange membranes to prevent scaling cations passing into the electrolyte chambers when for example sodium chloride is used as an electrolyte, however it is less practical to use sodium chloride which is dangerous to handle since chlorine gas can be produced. Other exemplar electrolytes include aqueous sodium sulfate or sodium nitrate, with aqueous sodium sulfate being the most common ED electrolyte due to its low toxicity. However, since a cation exchange membrane is positioned next to the electrolyte chamber in conventional ED units that use sodium sulfate, cations can enter the electrolyte chamber. As a result, calcium and other scaling cations can enter the electrolyte chambers. If the pH of the electrolyte is basic, calcium sulfate can form and detrimentally precipitate thus fouling the electrodes or adjacent membranes. Electrolyte pH may fluctuate and become basic during operation. Traditionally, ED operators have to acidified their electrolyte to prevent calcium sulfate precipitation, and then eventually replace the electrolyte to prevent calcium accumulation.

In an embodiment disclosed herein an ED stack includes an extra set of chambers, referred to as "rinse" chambers, over and above the two chambers of conventional EDR or ED stacks, or the multiple chambers of the MC-EDR or MC-ED disclosed herein. These "rinse" chambers prevent scaling cations, such as calcium and magnesium, from passing into the electrolyte, thereby beneficially reducing the risk of precipitation and scaling in the electrolyte chambers.

Figure 10:
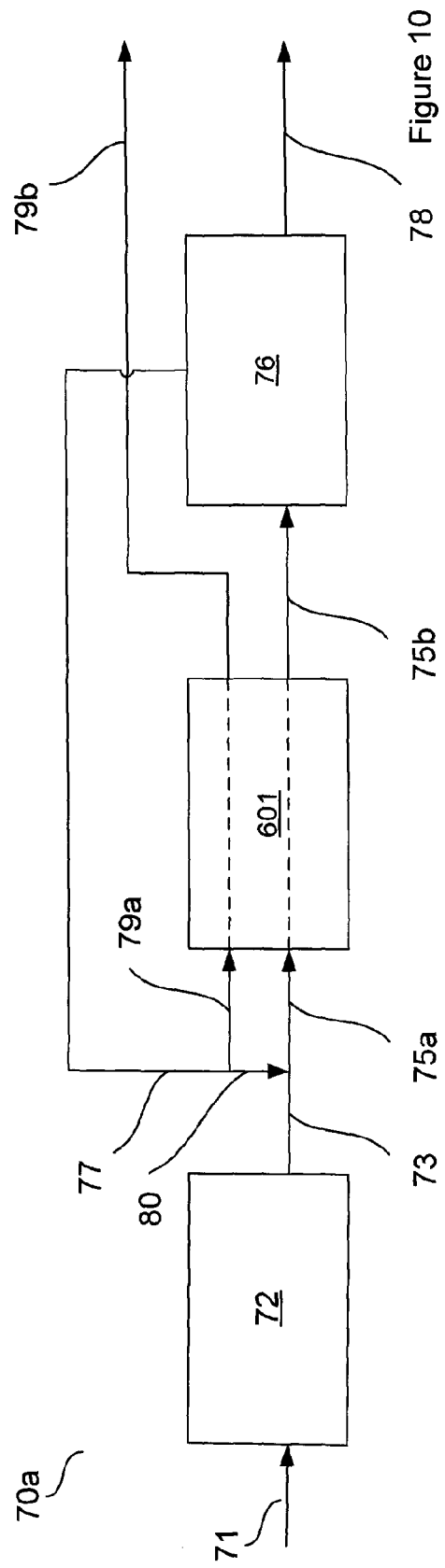
FIG. 10 is a schematic view of a two stage desalination plant according to an embodiment.

Referring to FIG. 10 there is shown a two stage desalination plant 70a. Feed saltwater 71 to be desalinated passes through pre-treatment system 72, which removes exemplar suspended solids and organics. Exemplar pre-treatment systems may include, but are not limited to, a combination of coagulation, clarification, flotation, media filtration, ultraviolet, electro-coagulation, microfiltration and/or ultrafiltration. Pre-treated saltwater 73 passes to a electrodyalisis reversal-rinse (EDR-R) stack 601. The pre-treated saltwater 73 is optionally mixed with concentrate recirculation 80 to become EDR-R product feed 75a. EDR-R product feed 75a is partially desalinated in EDR-R stack 601. Operation of the EDR-R stack 601 will be described in greater detail below with reference to FIGS. 12 and 13.

EDR-R product output 75b, which has a reduced salinity relative to EDR-R product feed 75a, is passed to a second stage desalination system 76. Exemplar second stage desalination system 76 could include, but are not limited to, RO, MED, MSF, and/or MD. The second stage desalination system 76 produces desalinated product 78 and desalination system concentrate 77. Second stage desalination system concentrate 77 becomes EDR-R concentrate feed 79a and concentrate recirculation 80. EDR-R concentrate feed 79a and EDR-R product feed 75a are passed through EDR-R stack 601, where they are separated by ion exchange membranes that allow ionic communication but not fluid communication.

The EDR-R stack 601 produces EDR-R concentrated output 79b, which is higher in salinity and preferably higher in hard scaling ions than the EDR-R concentrate feed 79a. The beneficial result is that hard scaling ions are substantially removed from the EDR-R product output 75b, which becomes the second stage desalination system feed, enabling higher recovery operation of the second stage desalination system 76. In essence, hard scaling ions are bypassed around the second stage desalination system 76. The EDR-R concentrated output 79b is discharged from the two stage desalination plant 70a. The overall result is beneficially higher plant recovery, lower volume waste discharge, and reduced risk of scaling mass or heat transfer surfaces in the second stage desalination system 76 than would otherwise be possible without the presence of the EDR-R stack 601.

Figure 11:
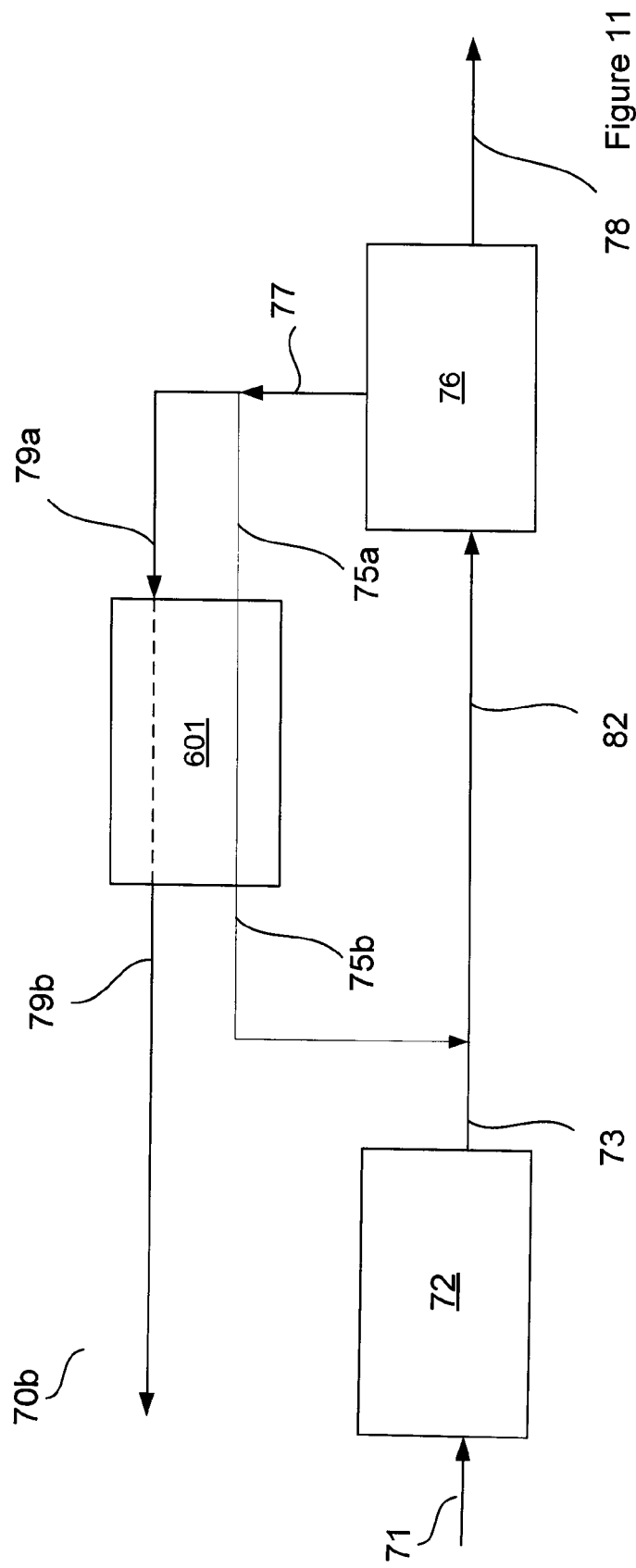
FIG. 11 is a schematic view of a two stage desalination plant according to an alternative embodiment.

FIG. 11 shows another embodiment of the two stage desalination plant 70b, which is similar to the plant 70a shown FIG. 10 and has like parts designated with like reference numerals. Plant 70b differs from plant 70a in that both the EDR-R product feed 75a and concentrate feed 79a come from the desalination system concentrate 77. The EDR-R product output 75b is recycled to the front end of the second stage desalination system 76 by mixing with the pre-treated saltwater 73 to produce second stage desalination system feed 82. The EDR-R stack 601 reduces the salinity and removes scaling ions from the second stage desalination system concentrate 77, which after mixing with pre-treated saltwater 73 can result in reduced salinity and scaling potential of the second stage desalination plant feed 82. This embodiment also enables higher recovery on scaling saltwater sources.

Whilst the two stage desalination plant 70a, 70b has been described utilizing an EDR-R stack 601, in alternative embodiments a conventional ED or EDR stack or an internally staged MC-ED, MC-EDR or MC-EDR-R stack as described herein may be employed. The MC-ED, MC-EDR and MC-EDR-R stacks enables operation at a higher concentration between the product feed and concentrate feed, thereby enabling a higher plant recovery over a two chamber ED, EDR or EDR-R system.

Figure 12:
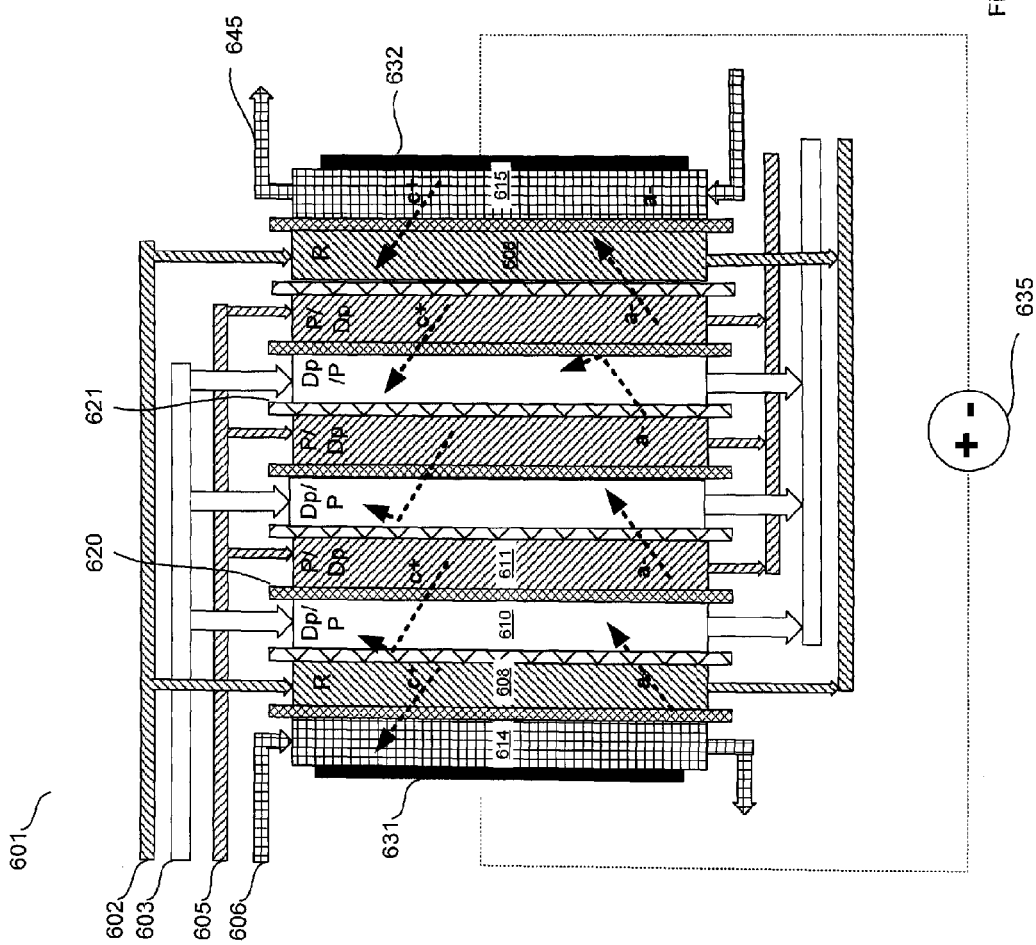
FIG. 12 is a schematic view of an electrodialysis reversal-rinse (EDR-R) unit according to an embodiment operating in forward polarity.
Figure 13:
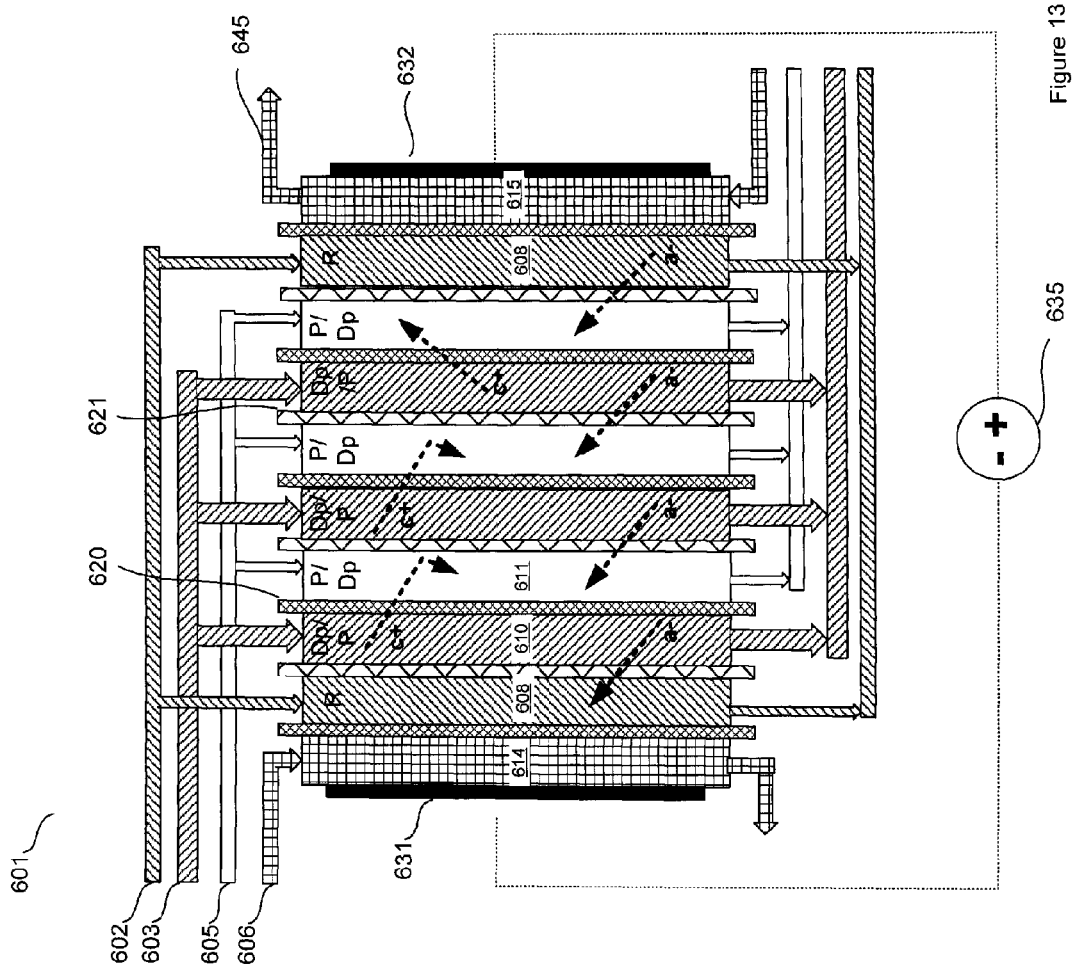
FIG. 13 is a schematic view of the EDR-R unit of FIG. 12 operating in reverse polarity.

Referring now to FIGS. 12 and 13, there is shown an EDR-R stack 601 operating in forward polarity and reverse polarity respectively, which may be beneficial for operation on hard waters. The EDR-R stack 601 may be built from gasket spacers, cation exchange membranes 620 and anion exchange membranes 621 pressed between end plates with electrodes at either end. Construction of exemplar EDR stacks is described in detail in Canadian Patent Publication 2,748,567 (which is incorporated herein by reference).

EDR-R stack 601 transfers salt ions out of the EDR-R product feed and into the EDR-R concentrate feed under the application of a galvanic potential, for example a voltage or under the action of concentration difference energy as described in Canadian Patent 2,649,873 (which is incorporated herein by reference). Ion exchange membranes that have a high transference for scaling salt ions such as calcium, magnesium and sulfates may be preferred on water sources high in said constituents. The increased transference results from a combination of the ions' stronger charge, for example two plus rather than one plus, and still relatively small molecular weight making them more mobile for electrochemical movement within a membrane structure.

In the forward polarity operation shown in FIG. 12, product feed ("P") flows into the EDR-R stack 601 through P-Dp conduit 605 and into P/Dp chambers 611.

Concentrate feed ("Dp") flows into the EDR-R stack 601 through Dp-P conduit 603 and into Dp/P chambers 610. P/Dp chambers 611, and Dp/P chamber 610 are separated by alternating cation exchange membranes 620 and anion exchange membranes 621, hereinafter collectively referred to as ion exchange membranes, which respectively transfer cations and anions and are relatively impermeable to water. Exemplar anion exchange membranes include Neosepta AM-1, AFN, AMX; Ralex AMH-PES; Fumasep FAD; and Selemion DVS, APS. Exemplar cation exchange membranes include Neosepta CMX, CM-1; Ralex CMH-PES; Fumasep FKE, FKD; and Selemion CMV.

On each end of the EDR-R stack 601 are electrolyte chambers with electrolyte chamber 615 on the same side as anode/cathode electrode 632, and electrolyte chamber 614 on the same side as cathode/anode electrode 631. Electrolyte solution is pumped through electrolyte inlet conduit 606 into electrolyte chamber 614 and exits electrolyte chamber 615 through electrolyte exit conduit 645, and may be recycled in a closed loop. The electrolyte circuit illustrated in FIG. 12 is a series arrangement; however, a parallel circuit is also possible.

A direct current power source 635 is applied to the EDR-R stack 601 to provide a DC voltage at the electrodes 631 and 632. Changing the polarity of the DC power supply changes whether each electrode is operating as a cathode or anode. Reduction and oxidation of reactions of the electrolyte occur at the cathode and anode respectively, converting the DC electrical current into an ionic current. In the forward polarity configuration of FIG. 12, cathode/anode electrode 631 acts as the cathode, and anode/cathode electrode 632 acts as the anode. Cations and anions are transferred from the P/Dp chambers 611 to the Dp/P chambers 610 effecting desalination of the product feed to produce reduced salinity product output and concentration of the concentrate feed to produce increased salinity concentrate output. In an alternative embodiment (not shown), a drive cell, such as the drive cell disclosed in WO 2010/115287 or WO 2009/155683 may be used for application of a voltage across the chambers.

Exemplar applied voltages may range from 0.5V to 2.5V per chamber pair in order to drive ions across the ion exchange membranes, while avoiding problems associated with water splitting at higher voltages. Those skilled in the art will be able to determine the current limit density of a particular EDR-R stack 601 under its operating concentrations and temperatures, and then set the applied voltage to operate at the most economic current limit density on a basis of combined capital and operating costs.

EDR-R stack 601 includes rinse solution chambers 608 which "guard" the electrolyte chambers 214, 215 from pollution with divalent scaling ions such as calcium or magnesium. Rinse solution is supplied via conduit 602 and may consist of conductive but non-scaling aqueous salts such as sodium chloride. A rinse solution chamber 608 is positioned next to each of the electrolyte chambers 214, 215 and the two rinse solution chambers 608 are both bound by an anion exchange membrane 621 on the side furthest from the electrode. This arrangement prevents cations, such as calcium and magnesium, from entering the rinse solution chamber 208 from adjacent P/Dp chambers 611 and/or Dp/P chambers 610. The fact that the rinse solution chambers 608 remain free of calcium and magnesium prevents their passage from the rinse solution chambers 608 to the electrolyte chambers through the cation exchange membranes 620 that bound the electrolyte chambers 614, 615. The rinse solution chambers 608 beneficially remove the need for electrolyte acidification while also increasing reliability over conventional EDR stacks through reduced calcium sulfate precipitation risk.

Precipitation and ion exchange membrane scaling risk is still a concern for P/Dp chambers 611 and/or Dp/P chambers 610. Since constituents may be present in the feed solutions (e.g. calcium carbonate and calcium sulphate) the ion exchange membranes accumulate sealants on their surfaces resulting in a decreased desalination efficiency of the system. Scale buildup on the ion exchange membranes is indicated by an increase in resistance, which can be measured as either decreased current in constant voltage operating mode or increased voltage in constant current operating mode. Once the resistance has reached a level indicative of scaling on the ion exchange membranes, the EDR-R stack 601 will be operated in the reverse polarity mode as depicted in FIG. 13.

Referring now to FIG. 13, which show an EDR-R stack 601 in reverse polarity mode wherein The polarity of direct current power source 635 is reversed resulting in anode/cathode electrode 632 becoming the cathode, and cathode/anode electrode 631 becoming the anode. The result is such that the polarity of the voltage applied to the stack and the direction of the ionic current are reversed, thereby resulting in a change in ion transfer direction through each membrane, thereby descaling the ion exchange membranes.

In order to maintain production of desalinated water when ion transfer has changed direction, the saltwater internal to the P/Dp chambers 611 and the Dp/P chambers 610 must also be changed. In the reverse polarity configuration shown in FIG. 13, product feed and concentrated feed enter and exit through opposite conduits, more specifically through Dp-P conduit 603 and P-Dp conduit 605 respectively. Flow direction is not reversed in the disclosed embodiment; however, it is possible to reverse flow in reverse polarity operation to back flush the EDR-R stack 601 for enhanced sealant removal.

In alternative embodiments the rinse chambers may be added to an MC-EDR stack as described herein, or the rinse chambers may be added to ED or MC-ED stacks which do not operate in reversal mode.

In further alternative embodiments (not shown) multiple ED-R, EDR-R, MC-ED-R, MC-EDR-R stacks may be combined with an electrode, electrolyte chamber and rinse chamber positioned at either end of each stack. The multiple stacks may be compressively coupled and may comprise a modular apparatus as disclosed in WO 2012/019282 (incorporated herein by reference).

Alternative embodiments described herein are directed at a EDR cleaning system which enables longer term reliable operation of an EDR stack by sensing the on-set of scaling and removing deposits before they become detrimental. The cleaning system beneficially reduces operator intervention, saves downtime, and reduced freshwater and chemical inputs. It is well known to reverse the polarity of an EDR stack in order to de-scale membranes, with reversal frequency based on timers. Chemical clean in place is also used on a set frequency to remove and scale product build-up. The cleaning system described herein adds sensors, algorithms and control systems to sense when electrochemical cleaning is required in addition to a flush sequence that removes deposits before they irreversibly foul the stack to prevent detrimental hydraulic resistance increase. The cleaning system senses and calculate electrochemical and hydraulic resistance by applying algorithms, and processes actions in order to remove scaling and fouling products when resistance has reached a certain level. In order to prevent detrimental accumulation of precipitation products, a "shut down flush" may occur at every shut down to flush saline water out of the stack and prevent precipitation during stand time.

Membrane electrochemical resistance is the difference between stack resistance and solution resistance. An increase in electrochemical resistance indicates the need for either:
1. Ionic reversal to de-scale membranes; or
2. Chemical clean-in-place—which is initiated after a number of repeated ionic reversals without resistance improvement.

Hydraulic resistance is detected by measuring pressure and flow rate. The control system can determine normal "unblocked" operating regime and then sense when blockage commences requiring the need for one of the following hydraulic cleaning regimes:
1. Slug Wash: inject a "slug" of freshwater in an attempt to remove fouling products
2. Stack Wash: full stack wash in closed loop with a wash tank over an extended period of time—initiated at increased hydraulic resistance or after repeated slug washes without resistance improvement
3. Stack Chemical Clean: full stack chemically enhanced clean-in-place in the event of severe electrochemical fouling of membranes and/or repeated stack washes proving unsuccessful at reducing hydraulic resistance Referring to FIG. 14 there is shown the MC-EDR plant 101 of FIG. 4 with additional cleaning system. Like parts are referenced with the same reference numerals and the MC-EDR plant 101 operates as described above with reference to FIG. 4 with the addition of the cleaning system and parts associated with the cleaning system which are described below.

The following electrochemical resistance sensors are included, or could be incorporated into variable DC power supply 235:
Stack Operating Voltage Transducer 133
Stack Operating Current Transducer 135

In addition, the hydraulic resistance sensors given in Table 4 may be included in the plant manifolding.

TABLE 4

Hydraulic Resistance Sensors for Cleaning System of MC-EDR Plant 101

| Sensors | Hydraulic Circuit | | | |
| --- | --- | --- | --- | --- |
| | P—Product | Dp—Diluent P | Dc—Diluent C | C—Concentrate |
| Pressure Transducer | 130 ("Pp") | 160 ("Pdp") | 167 ("Pdc") | 137 ("Pc") |
| Flow Transducer | 131 ("Fp") | 165 ("Fdp") | 168 ("Fdc") | 138 ("Fc") |
| Conductivity Transducer | 132 ("Cp") | 166 ("Cdp") | 169 ("Cdc") | 139 ("Cc") |

The requirement for cleaning is sensed as increase in one or both of electrochemical and hydraulic resistance.

Electrochemical resistance of membranes may be estimated as follows:
1. Calculate stack net resistance ("Rstack") as the ratio of stack operating voltage measured by voltage transducer 133 and stack operating current measured by current transducer 135.
2. Estimate solution net resistance ("Rsoln") internal to the stack chambers. Solution resistance is the inverse of conductivity per unit thickness of the solution. The electrolyte chamber resistance is excluded for reasons of simplicity, and although not required can be added. Rsoln is calculated as follows:

$$Rsoln = (P \text{ stack chamber thickness} * \text{number of } P \text{ chambers})/Cp +$$
$$(Dp \text{ stack chamber thickness} * \text{number of } DP \text{ chambers})/Cdp +$$
$$(Dc \text{ stack chamber thickness} * \text{number of } Dc \text{ chambers})/Cdc +$$
$$(C \text{ stack chamber thickness} * \text{number of } C \text{ chambers})/Cc$$

3. Estimate net membrane resistance ("Rmem") using the equation:

$$Rmem = Rstack - Rsoln.$$

Electrochemical resistance of a stack can first be characterized after construction through initial operation to determine normal net membrane resistance ("Rmem"). The user can set a "Ionic Current Reversal Threshold" in the control system such that when Rmem exceeds a set value, for example 1.25*Rmem, the control system will activate ionic current reversal in accordance with the valve actuation scheme of Table 2 while also reversing the polarity of variable DC power supply 235 as hereinbefore described with reference to FIGS. 4-6. Ionic current reversal changes the direction of salt ion transport through the ion exchange membranes internal to the stack. This will de-scale the membranes as is known by those skilled in the art of EDR. The operator can also establish a "Stack Chemical Clean" set point, with trigger points, for example, but not limited to:

1. 1.5*Rmem; and/or
2. Two Ionic Current Reversals are completed within a specified time "Tmin_rev" indicating that reversal frequency has increased and a "Stack Chemical Clean" is required.

Figure 15:
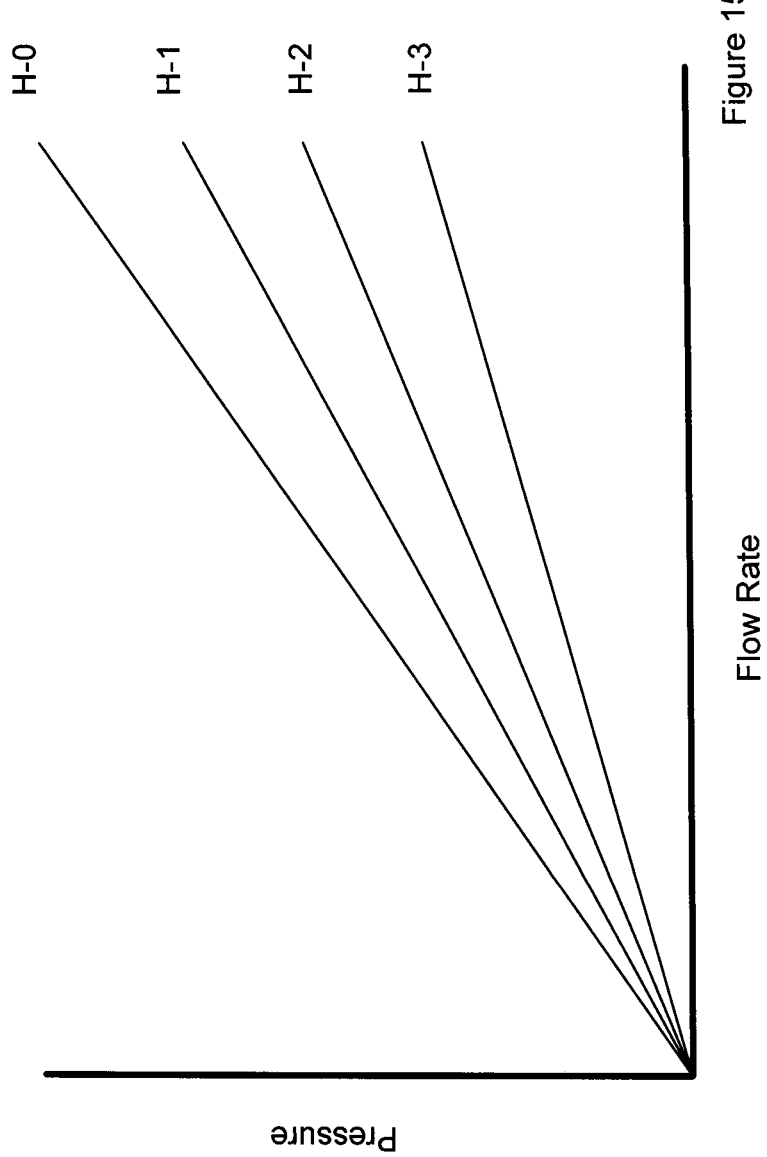
FIG. 15 is a graph showing pressure-flow relationships measured by sensors in the MC-EDR plant of FIG. 14.

Hydraulic resistance is estimated for each circuit by determining the pressure-flow relationship as measured by pressure transducer sensors 130 ("Pp"), 160 ("Pdp"), 167 ("Pdc"), 137 ("Pc") and flow transducer sensors 131 ("Fp"), 165 ("Fdp"), 168 ("Fdc"), 138 ("Fc"). FIG. 15 shows an exemplar pressure-flow relationship with four curves as follows:

H-0: baseline operation without inhibited hydraulic resistance due to scaling and fouling products internal to the pipework and stack. Baseline pressure and flow curve is established at start-up and during re-commissioning after system changes by varying the hydraulic circuit pressure and measuring the flow rate in order to produce a flow-pressure baseline curve.

H-1: hydraulic resistance due to the on-set of scaling and fouling products forming internal to the pipework and stack. Flow rates are less than H-0 flow rates for the same pressure. A typical H-1 curve "set point" might have flow rates=0.85*H-0 curve.

H-2: increased hydraulic resistance due to the build-up of scaling and fouling products forming internal to the pipework and stack. Flow rates are less than H-1 flow rates for the same pressure. A typical H-1 curve "set point" might have flow rates=0.75*H-1 curve.

H-3: excessive hydraulic resistance due to the build-up of scaling and fouling products forming internal to the pipework and stack. Flow rates are less than H-2 flow rates for the same pressure. A typical H-1 curve "set point" might have flow rates=0.65*H-2 curve.

The exemplar curves of FIG. 15 can be applied to any and all of the hydraulic circuits: P, Dp, Dc, and C. Table 5 shows the cleaning action that can be taken for the different pressure-flow curves.

TABLE 5

Cleaning Action Activation

| Action | Activate When |
| --- | --- |
| (0) Shut Down Flush | Plant 101 is shut down |
| (1) Slug Wash | Measured pressure-flow performance is below H-1 |
| (2) Stack Wash | i. Measured pressure-flow performance is below H-2; and/or<br>ii. Two Slug Washes are completed within a specified time "Tmin_slug" indicating that Slug Washes are losing effectiveness and a stack wash is required |
| (3) Stack Chemical Clean | i. Measured pressure-flow performance is below H-3; and /or<br>ii. Two Stack Washes are completed within a specified time "Tmin_stack" indicating that Stack Washes are losing effectiveness and a Stack Chemical Clean is required; and/or<br>iii. Two Ionic Current Reversals are completed within a specified time "Tmin_rev" indicating that reversal frequency has increased and a "Stack Chemical Clean" is required (as described above) |

Figure 14:
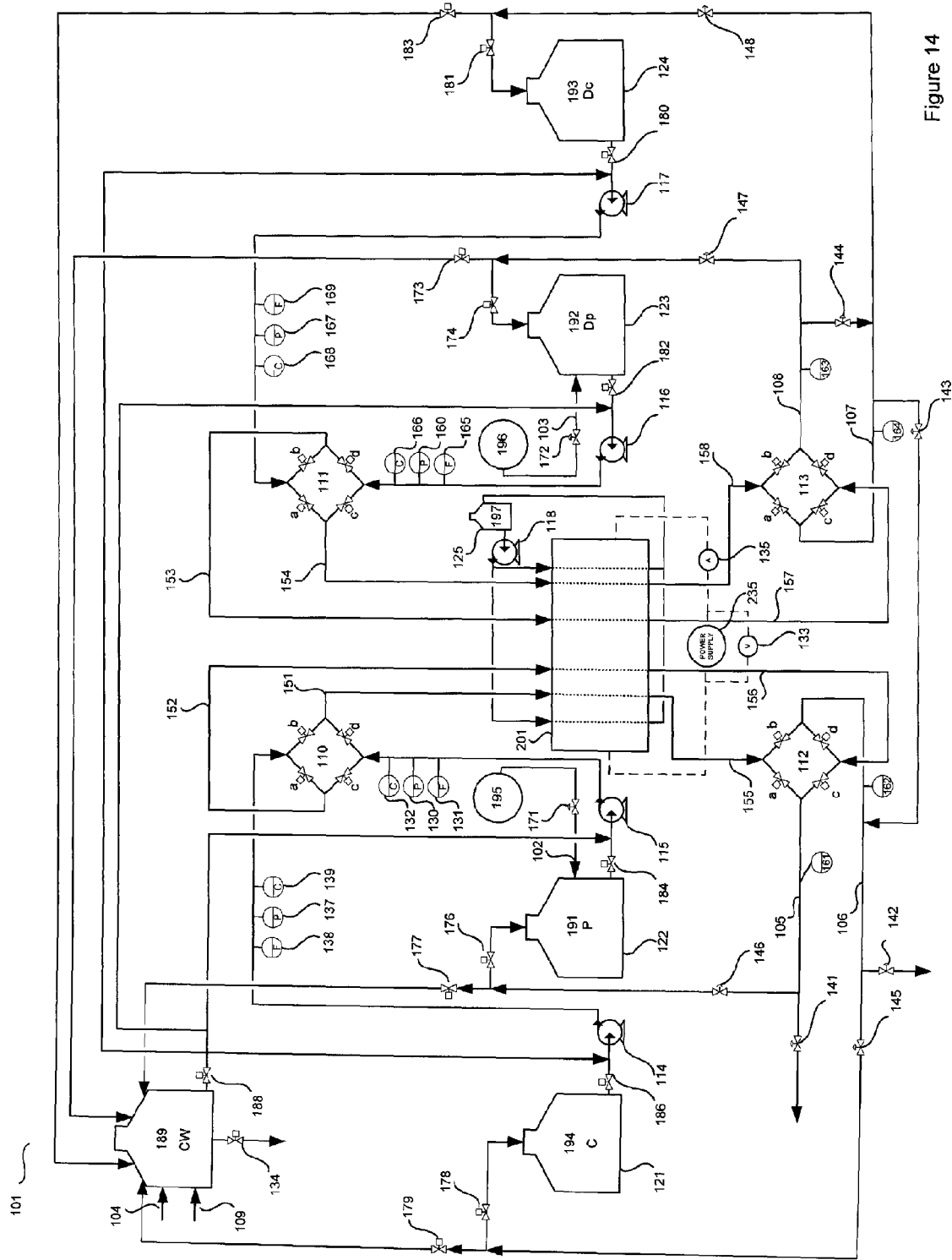
FIG. 14 is a schematic view of the MC-EDR plant of FIG. 4 with additional cleaning system according to an embodiment.

Referring to FIG. 14, cleaning water tank 189 holds freshwater added through water inlet 104 and chemicals added through chemical inlet 109. Freshwater may be used for: (0) Shut Down Flush, (1) Slug Wash, and (2) Stack Wash. The operator can set a freshwater fill level for automated fill of tank 189 based on initial commissioning runs to ensure the tank fill level provides sufficient volume for the actions given below in Table 6, as each action requires a different tank fill level. For example, (0) Shut Down Flush requires sufficient volume for all hydraulic circuits, except electrolyte, however, (1) Slug Wash and (2) Stack Wash can be completed on a single hydraulic circuit at a time, thereby requiring less freshwater volume.

TABLE 6

Operation of Cleaning System for MC-EDR Plant 101

| | Valves of Hydraulic Circuit | | | |
| --- | --- | --- | --- | --- |
| Action | P—Product | Dp—Diluent P | Dc—Diluent C | C—Concentrate |
| Normal Operation | 188-closed<br>184-open<br>177-closed<br>176-open | 188-closed<br>182-open<br>173-closed<br>174-open | 188-closed<br>180-open<br>183-closed<br>181-open | 188-closed<br>186-open<br>179-closed<br>178-open |
| (0) Shut Down Flush Pumps 114, 115, 116, 117 running P/S 235 OFF | 188-open<br>184-close<br>177-open<br>176-close<br>Delay: ~0.5 min (user set point)<br>184-open<br>188-close<br>176-open<br>177-close | 188-open<br>182-close<br>173-open<br>174-close<br>Delay: ~0.5 min (user set point)<br>182-open<br>188-close<br>174-open<br>173-close | 188-open<br>180-close<br>183-open<br>181-close<br>Delay: ~0.5 min (user set point)<br>180-open<br>188-close<br>181-open<br>183-close | 188-open<br>186-close<br>179-open<br>178-close<br>Delay: ~0.5 min (user set point)<br>186-open<br>188-close<br>178-open<br>179-close |
| | Shut down system<br>Drain tank 189 via valve 134 | | | |
| (1) Slug Wash Pumps 114, 115, 116, 117 running | 188-open<br>184-close<br>Delay: ~2 sec<br>184-open<br>188-close | 188-open<br>182-close<br>Delay: ~2 sec<br>182-open<br>188-close | 188-open<br>180-close<br>Delay: ~2 sec<br>180-open<br>188-close | 188-open<br>186-close<br>Delay: ~2 sec<br>186-open<br>188-close |
| (2) Stack Wash Pumps 114, 115, 116, 117 running P/S 235 OFF | 188-open<br>184-close<br>177-open<br>176-close<br>Delay: ~10 min (user set point)<br>184-open<br>188-close<br>176-open<br>177-close | 188-open<br>182-close<br>173-open<br>174-close<br>Delay: ~10 min (user set point)<br>182-open<br>188-close<br>174-open<br>173-close | 188-open<br>180-close<br>183-open<br>181-close<br>Delay: ~10 min (user set point)<br>180-open<br>188-close<br>181-open<br>183-close | 188-open<br>186-close<br>179-open<br>178-close<br>Delay: ~10 min (user set point)<br>186-open<br>188-close<br>178-open<br>179-close |
| | Return to Normal Operation<br>Drain tank 189 via valve 134 | | | |

Prior to a Stack Chemical Clean, a Shut Down Flush should be initiated. For the Stack Chemical Clean a chemically enriched water of exemplar 0.5 molar citric acid or 0.5 molar hydrochloric acid is obtained through automatic chemical dispensing pumps at chemical inlet 109, water addition at water inlet 104, and mixing (not shown) in tank 189. The Stack Chemical Clean control sequence is the same as the Shut Down Flush described above, with the pumps 114, 115, 116, 117 starting at the commencement of the user set Chemical Clean Time Delay and stopping at the end of the Chemical Clean Time Delay. After which plant 101 operation can revert to normal. In the event that the Stack Chemical Clean does not return performance to the base line, the operator can be notified to investigate further.

Set points may need to be re-tuned by operators from time to time in order to re-establish performance, and off-performance set points that are used to initiate each of the above described cleaning actions.

The foregoing description of a system and method for cleaning a MC-EDR plant has been presented for purposes of illustration and description and is not intended to be exhaustive or limit the invention to the precise form disclosed; many modifications and variations are possible in light of the above teaching. For example, the cleaning system may utilize all or only some of the cleaning actions described or may incorporate additional cleaning actions of benefit to the plant. In alternative embodiments (not shown) the cleaning system may be applied to a conventional two chamber ED or EDR system or to the MC-ED, ED-R, MC-ED-R, EDR-R or MC-EDR-R systems of the described embodiments.

Alternative embodiments described herein are directed at a salt extraction method and plant to remove salt from saltwater, producing freshwater or freshwater vapour and solid salt or a highly concentrated salt solution. As such, salts are removed from the water balance. Saltwater is input to a first electrodyalisis stage, where salt is transferred from the input saltwater through ion exchange membranes under the application of galvanic potential into a concentrated salt solution approaching but not exceeding saturation of the lower solubility ionic constituents present. The resulting concentrated salt solution is passed into a second stage solution concentrating desalination system. The second stage solution concentrating desalination system may be a zero liquid discharge system as known in the art which concentrates the concentrated salt solution to produce solid salt/highly concentrated salt solution and freshwater when a dehumidifier is present, or solid salt/highly concentrated salt solution and freshwater vapour which is released to the atmosphere.

The first and second stage may be thermally integrated, such that heat extracted from the second stage cooling salt solidification process is upgraded and used to maintain optimal solubility temperature of the first stage process. Excess heat from the second stage desalination process, for example heat of compression, may be employed to pre-heat input saltwater and maximize solubility of ion constituents in the first stage. Controls enable maximization of first stage concentrated solution concentration coupled with de-scaling and cleaning.

Figure 16:
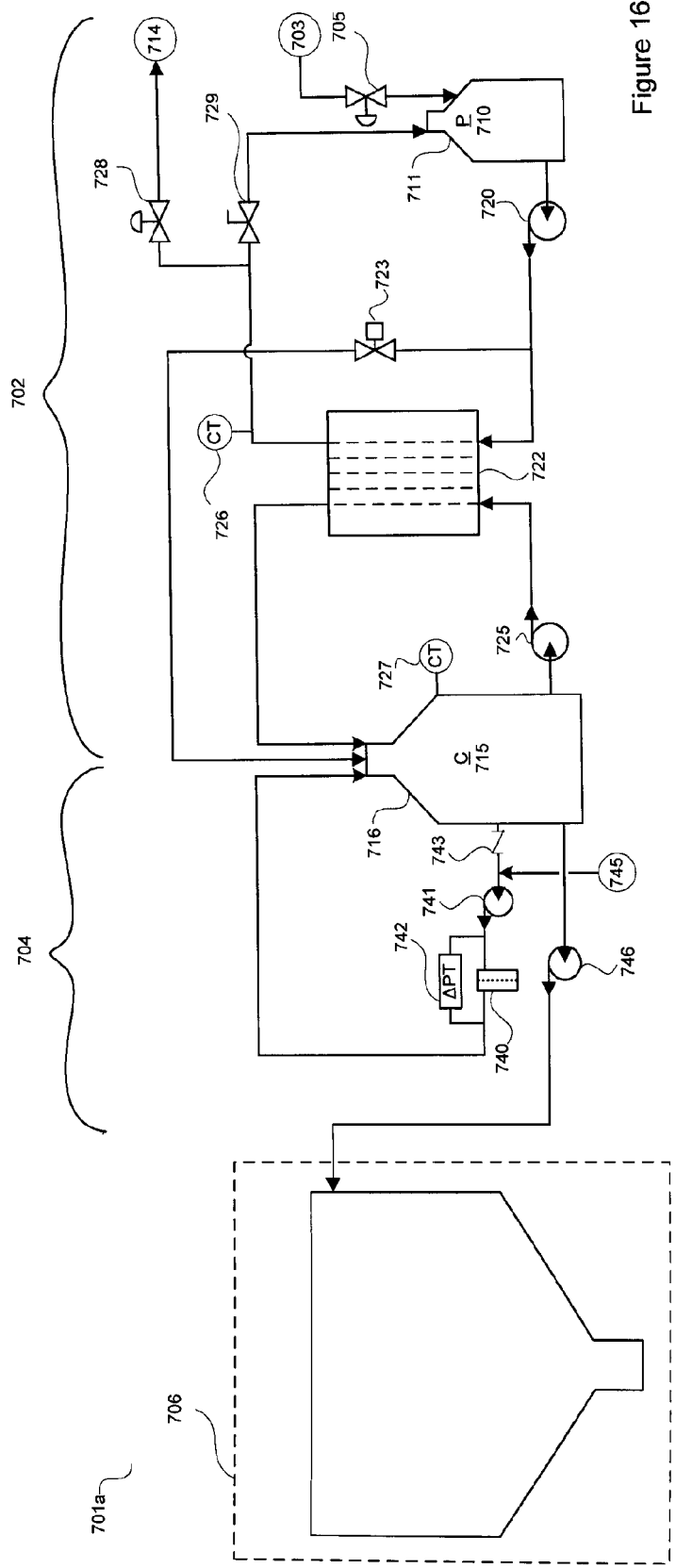
FIG. 16 is a schematic view of a two stage salt extraction plant including a first electrodialysis (ED) stage and second stage solution concentrating desalination system according to an embodiment.

Referring to FIG. 16 there is shown a two stage salt extraction plant 701a, including a first electrodialysis (ED) stage 702 and second solution concentrating desalination stage 706. Input saltwater 703, is optionally pre-heated, and fed into product tank 711 containing product solution 710 that is to be desalinated. Product solution 710 is pumped from product tank 711 through ED stack 722 by product pump 720. Concentrate pump 725 draws concentrate solution 715 from concentrate tank 716 and circulates the concentrate solution 715 through the ED stack 722. Product solution 710 is desalinated in ED stack 722 by electrochemical or concentration gradient energy means to produce reduced salinity product output. ED stack 722 contains solution channels separated by ion exchange membranes. Under the application of electric or chemical energy gradient potential ions pass through the ion exchange membranes from the product solution 710 to the concentrate solution 715 to produce an increased salinity concentrate output.

Conductivity of the product output exiting the ED stack is measured with product conductivity sensor 726. If the salt concentration of the product output is below a set threshold, often related to permitted discharge limits, then outlet flow control valve 728 is opened to modulate release of product output from the system at product output discharge 714. Throttling valve 729 can be used to ensure product output back pressure is sufficient to leave the system. If the salt concentration of the product output is above the set threshold, then outlet flow control valve 728 is closed and throttling control valve 729 opened to return product output to the product tank 711 for further desalination. Conductivity sensor 726 may include additional sensors (not shown) and exemplar techniques including inductively coupled plasma mass spectrometry, to measure the concentration of specific constituents of concern, for example heavy metals. Each water source and discharge requirements may be unique; therefore the product conductivity sensor 726 or its alternative sensor may be calibrated based on site specific requirements to calibrate conductivity to a measure related to constituents of concern.

A product to concentrate transfer valve 723 can be actuated to fill concentrate tank 716 as its volume is depleted. Some osmotic effect may occur as a result of suction of water from the product solution 710 into the concentrate solution 715 through the ion exchange membranes, due to the concentration gradient. Osmotic effects may reduce the amount of product solution 710 that needs to be transfer through valve 723 to the concentrate tank 716.

Construction of exemplar ED stacks is disclosed in Canadian Patent Application 2,748,567. The stack may be operated in electrodialysis reversal (EDR) mode on highly scaling waters, and include self cleaning mechanisms as describe herein with reference to FIGS. 14 and 18-20 and/or a rinse hydraulic circuit adjacent the electrode chambers as described herein with reference to FIGS. 12, 13 and 18-20. For high concentration change operation an internally staged MC-ED or MC-EDR and process as described herein with reference to FIGS. 4-9, 14 and 18-20 may be employed.

It is beneficial to maximize the first ED stage 702 output concentration of the concentrate. This minimizes the capacity of the second solution concentrating desalination stage 706. A crystallization sensor system 704 may be included to measure the onset of crystallization in order to maximize concentrate output concentration before it is transferred to the second solution concentrating desalination stage 706. The crystallization sensor system 704 operates under the principle of causing crystallization in a known location and measuring its onset. This is achieved by circulating the concentrate solution 715, through a strainer 740 under action of pump 741, and measuring differential pressure with pressure transducer 742. Strainer 740 may be constructed of a slightly finer media representation than flow channels of the ion exchange membranes present in ED stack 722, such that crystallization occurs in the strainer 740 before crystallization in ED stack 722. As salt forms in the media of strainer 740, the pressure drop across the strainer increases. This pressure drop is measured by pressure transducer 742, which may be calibrated by the operator to set the "crystallization onset differential pressure". In the event of crystallization in strainer 740, a freshwater flush 745 may be employed, such as a flush similar to the flush described above with reference to FIGS. 14 and 15. Check valve 743 may be included to ensure the flush is in the correct direction. Additionally or alternatively, conductivity sensor 727 may be included in concentrate tank 716 to measure the conductivity of the concentrate solution 715 and actuate movement of concentrate solution 715 from the concentrate tank 716 to the second solution concentrating desalination stage 706 before the concentrate solution 715 crystallizes in the concentrate tank 716.

Once crystallization onset differential pressure is reached and/or the conductivity sensor 727 detects a set threshold concentration in tank 716, concentrate solution 715 is transferred by pump 746 to the second solution concentrating desalination stage 706. The level of concentrate solution 715 in concentrate tank 716 will subsequently decrease which is detected by a level sensor (not shown) in concentrate tank 716. This triggers a control system to open transfer valve 723 to transfer product solution 710 to the concentrate tank 716. As a result the level of product solution 710 in product tank 711 decreases which is detected by a level sensor (not shown) in product tank 711. This triggers the control system to open saltwater inlet valve 705 to re-fill product tank 711 with input saltwater 703. The solution transfer sequence described above is based on tank level controls, but an alternative embodiment (not shown) can use flow meters and flow control valves or other means in order to reduce tank volume requirements.

In an alternative embodiment, the first ED stage can be thermally coupled to the second solution concentrating desalination stage with the second stage optionally controlling the temperature of the first ED stage and maximizing the solubility of the concentrate solution. For example, the solubility of calcium sulfate peaks at 30 deg C, and decreases with both increases and decreases in temperature. The ED stage temperature can be controlled to maximize solubility of the constituents of concern without exceeding temperature limits of the ED system.

Figure 17:
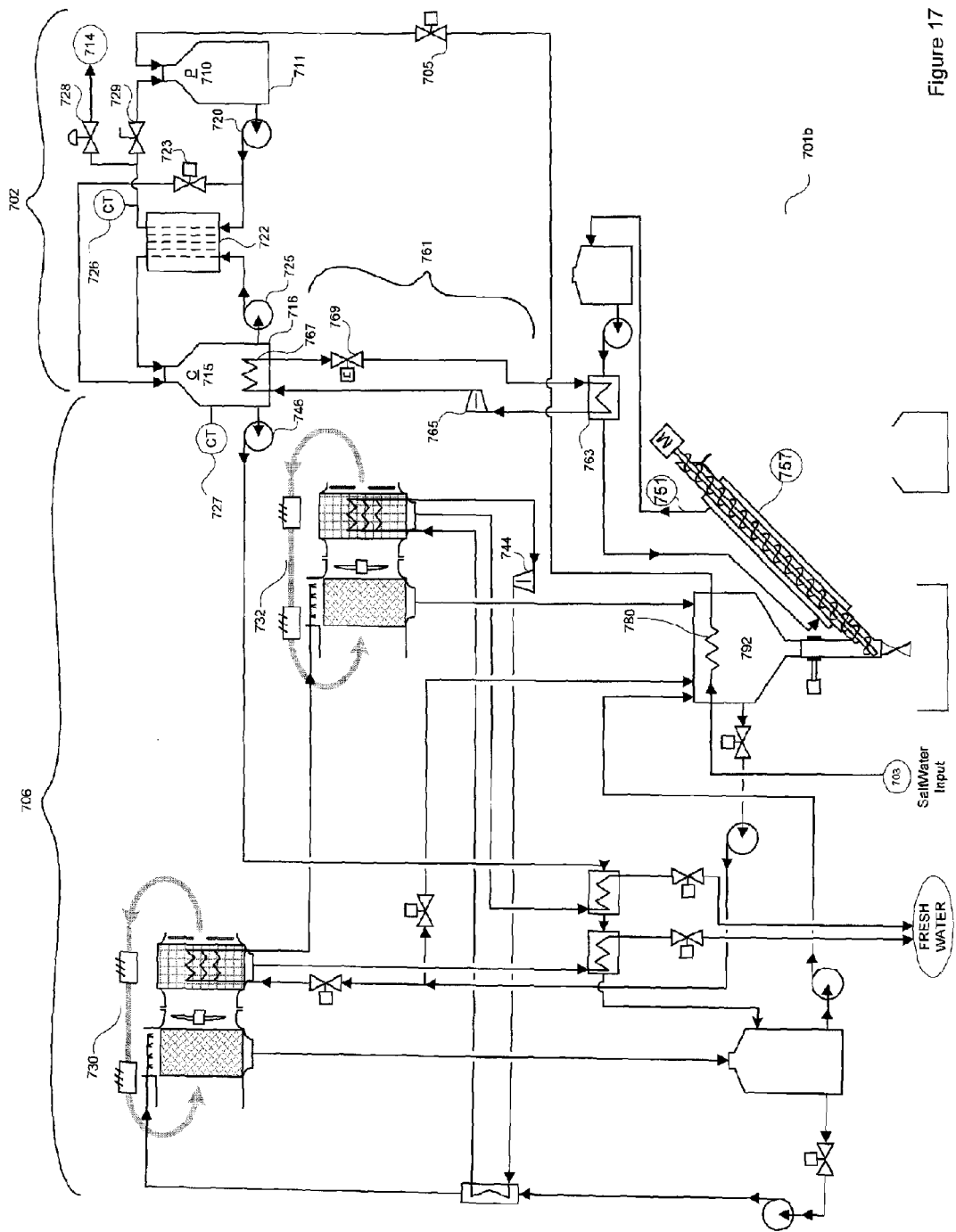
FIG. 17 is the two stage salt extraction plant of FIG. 16 with thermally integrated multiple effect heat pump driven solution concentrating desalination system.

Referring to FIG. 17, there is shown a thermally coupled two stage salt extraction plant 701*b*. Two stage salt extraction plant 701*b* is similar to plant 701*a* with like parts indicated with like reference numerals, however, in plant 701*b* the solution concentrating desalination stage 706 is a multiple effect heat pump driven solution concentrating system as described in International Patent Application PCT/CA2012/00495 (incorporated herein by reference). In alternative embodiments (not shown) other solution concentrating desalination systems may be employed in the two stage plant, such as mechanical vapour compression driven crystallizers. If a compression driven solution concentrating desalination stage process is used, which is fully insulated, and saltwater is input at the operating temperature, the heat of compression will accumulate and raise the operating temperature. As a result, the heat of compression must be released from the system. This represents useful waste heat. The heat pump driven plant depicted in FIG. 17 produces waste heat power equivalent to the power of compression which is used by the heat pump compressor 744.

As shown in FIG. 17 solution concentrating desalination stage 706 uses multiple air humidification-dehumidification (HDH) effects which include a first HDH effect saltwater concentrating circuit containing first effect humidifier-dehumidifier 730 and a second HDH effect saltwater concentrating circuit containing second effect humidifier-dehumidifier 732. A heat exchanger 780 is used to pre-heat input saltwater 703 and remove heat from the solution concentrating desalination stage 706. Optionally, the heat exchanger 780 may be placed in the second HDH effect tank 792 as shown in FIG. 17. In an alternative embodiment (not shown) second HDH effect saltwater may be circulated through a heat exchanger in thermal communication with the input saltwater 703 so that heat is transferred from the second HDH effect saltwater to the input saltwater 703. The net result is that input saltwater 703 is heated using waste heat from the second stage solution concentrating desalination system 706 to beneficially increase its temperature and increase the solubility of constituents to be removed from the input saltwater 703. The ED stack 722 also acts like a heat exchanger with heat transfer through the membranes. Therefore, heating the input saltwater 703 that enters product tank 711 will also result in a temperature increase of the concentrate solution 715 with heat being transferred from the product solution 710 to the concentrate solution 715 through the membranes.

The second solution concentrating desalination stage 706 may optionally include a cooled salt auger 757 for salt removal as described in International Patent Application PCT/CA2012/00495. Salt auger 757 may employ an external auger coolant 751 to cool the auger 757 and increase precipitation of salt in the auger 757. Heat is removed from the resulting heated auger coolant 751 by refrigeration circuit 761 so that cooled inlet auger coolant can be re-circulated and re-used. Heat from auger coolant 751 is extracted by heat exchanger 763 and transferred to a refrigerant in the refrigeration circuit 761. The refrigerant evaporates at a temperature lower than the temperature of the cooled inlet auger coolant plus an additional margin to allow for heat transfer resistance. Refrigeration compressor 765 compresses the resulting refrigerant gas and the compressed refrigerant gas passes through a condensing heat exchanger 767 in the concentrate tank 716 of first ED stage 702. The refrigeration compressor 765 compresses the refrigerant gas to a sufficient pressure that will enable condensation of the refrigerant in condensing heat exchanger 767 at a temperature greater than the temperature of the concentrate solution 715 in the concentrate tank 716. This results in condensation of the refrigerant internal to the condensing heat exchanger 767, transferring the refrigerant's latent heat of condensation to maintain the temperature of the concentrate solution 715 at a set temperature, for example 30 deg C. Condensed liquid refrigerant passes through an expansion device 769 which lowers the pressure of the condensed liquid refrigerant allowing low pressure refrigerant to enter the heat exchanger 763. Refrigeration circuit 761 enables temperature control of the concentrate solution 715 in concentrate tank 716, which beneficially reduces the risk of precipitation in the tank 716 and maximizes concentration of solution in the first ED stage 702, while also cooling the auger 757 to increase precipitation of salt in the salt removal system.

Alternative embodiments (not shown) use any combination of heat exchangers to transfer heat from the second solution concentrating desalination stage 706 to the input saltwater 703 and/or the concentrate solution 715 of the first ED stage 702.

Figure 18:
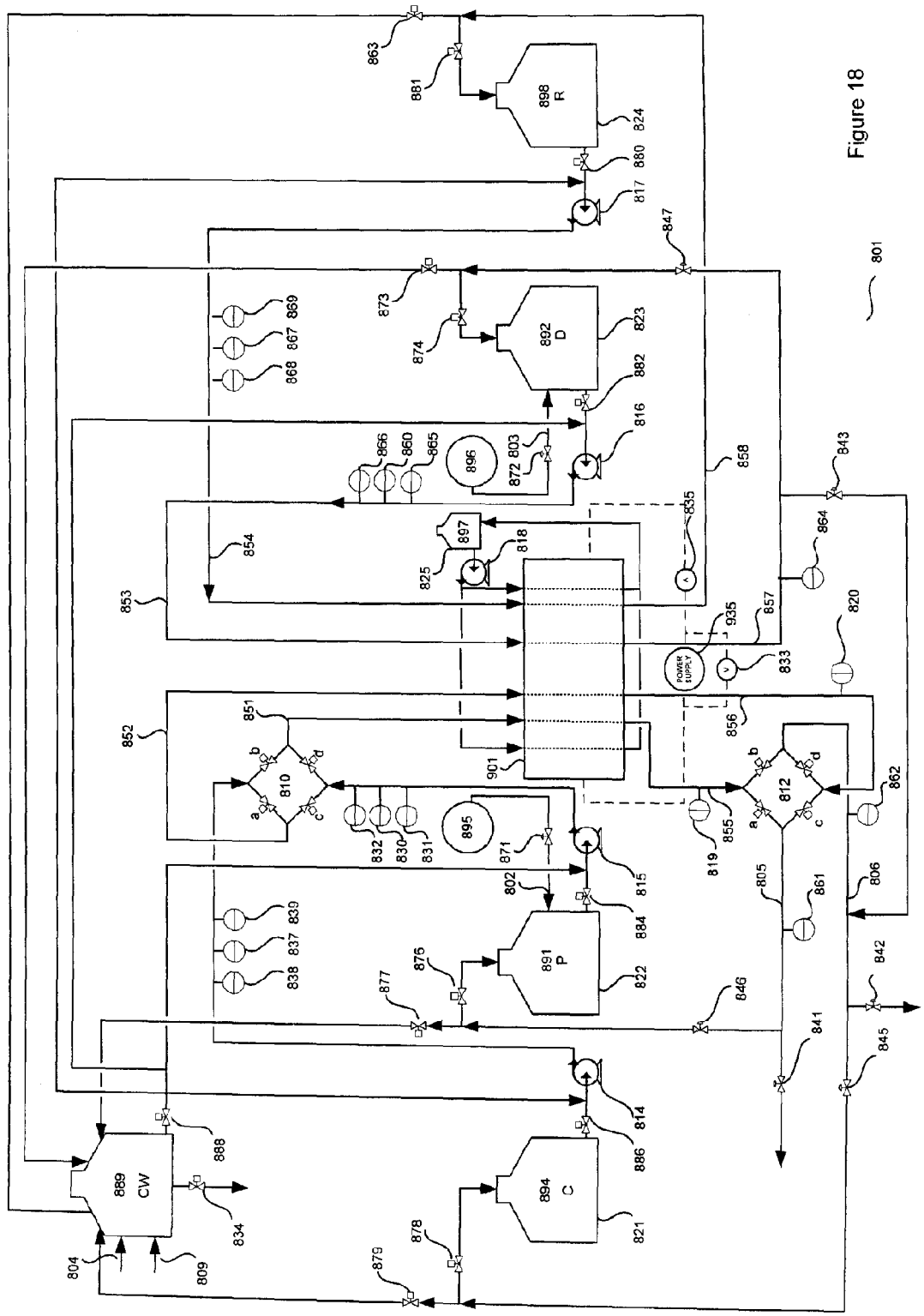
FIG. 18 is a schematic view of an internally staged multiple chamber electrodialysis reversal-rinse (MC-EDR-R) plant including a MC-EDR-R stack and cleaning system according to an alternative embodiment.

An alternative embodiment is directed at an internally staged multiple chamber electrodialysis reversal-rinse (MC-EDR-R) plant with cleaning system. Referring to FIG. 18, there is shown MC-EDR-R plant 801 with three saltwater solutions P, D, C and a rinse ("R") solution passing through MC-EDR-R stack 901 which can be run in forward or reverse polarity. The product ("P") solution 891 is the lowest concentration saltwater, or desalination product, and P circuit includes manifolding fluidly coupling MC-EDR-R stack 901 with product tank 822; diluent ("D") solution 892 is an intermediate concentrated solution and D circuit includes manifolding fluidly coupling MC-EDR-R stack 901 with diluent tank 823; concentrate ("C") solution 894 is a concentrated solution and C circuit includes manifolding fluidly coupling MC-EDR-R stack 901 with concentrate tank 821; and rinse ("R") solution 898 which may consist of conductive but non-scaling aqueous salts such as sodium chloride and R circuit includes manifolding fluidly coupling MC-EDR-R stack 901 with rinse tank 824. The MC-EDR-R stack 901 is configured in such a way that product solution 891 decreases in ion concentration by transferring its ions across ion exchange membranes through diluent solution 892 to the concentrate solution 894. The result is that the product solution 891 is desalinated and the concentrate solution 894 is concentrated.

Upstream saltwater source 895 supplies product tank 822 via product inlet 802 after passing through an optional pre-treatment stage (not shown), and product source control valve 871. Exemplar pre-treatment may include, but is not limited to, physical filters (such as microfiltration or ultrafiltration), dissolved air filtration, coagulation and sedimentation, media filtration or other methods known to those skilled in the art. Product solution 891 is stored in product tank 822, which may include an optional heating element (not shown) to increase the temperature of the solution and thereby beneficially increase MC-EDR-R system efficiency through increased conductivity internal to the MC-EDR-R stack 901. Product pump 815 pumps product solution 891 from product tank 822 through open product inlet valve 884 to P-C inlet valve reversal array 810. Table 7 below provides the reversal valve positions for forward and reverse polarity configuration.

TABLE 7

Reversal Valve Positions for MC-EDR-R plant 801

| Reversal Valve Number | MC-EDR-R Forward Polarity | MC-EDR-R Reverse Flush | MC-EDR-R Reverse Polarity | MC-EDR-R Forward Flush |
|---|---|---|---|---|
| 810a | Open | Closed | Closed | Open |
| 810b | Closed | Open | Open | Closed |
| 810c | Closed | Open | Open | Closed |
| 810d | Open | Closed | Closed | Open |
| 812a | Open | Closed | Closed | Closed |
| 812b | Closed | Open | Open | Open |
| 812c | Closed | Closed | Open | Closed |
| 812d | Open | Open | Closed | Open |

In the forward polarity configuration, product solution 891 passes through open reversal valve 810*d* and enters MC-EDR-R stack 901 via P-C inlet conduit 851. The product solution 891 passes through the MC-EDR-R stack 901 and exits at a lower ion concentration through P-C outlet conduit 855. Output product solution then enters P-C outlet valve reversal array 812 and passes through open reversal valve 812*a* and into product conduit 805.

Product concentration sensor 861, which may be a conductivity sensor, detects the ion concentration level in output product solution leaving P-C outlet reversal valve array 812. Product exit control valve 841 and product return control valve 846 can be modulated to either return output product solution to product tank 822 or remove output product solution from the process. For example, if the ion concentration of output product solution measured by product concentration sensor 861 is below a specified value, product exit control valve 841 opens to allow discharge of output product solution from the process. As a result, the level in product tank 822 will drop. Product tank level control valve 871 will modulate and open to allow addition of source saltwater 895, which will result in more product entering product bulk tank 822 to be desalinated, an increase in the ion concentration of product solution 891 in product tank 822, and an increase in output product solution ion concentration measured by product concentration sensor 861. If the ion concentration of output product solution is above a specified value, product exit control valve 841 closes while the product return control valves 846 and 876 open to return output product solution back to the product tank 822 for further desalination in order to meet the desired output specified ion concentration.

Upstream saltwater source 896 supplies diluent tank 823 via diluent inlet conduit 803 and diluent source control valve 872, after passing through an optional pre-treatment process (not shown). Diluent tank 823 may include an optional heating element (not shown) to increase the temperature of the solution and thereby beneficially increase MC-EDR-R system efficiency through increased conductivity internal to the MC-EDR-R stack 901. Upstream saltwater source 896 may be the same source as upstream saltwater source 895, or it may be a different source. Diluent pump 816 pumps diluent solution 892 from diluent tank 823 through open diluent inlet valve 882 and diluent inlet conduit 853 into MC-EDR-R stack 901. Output diluent solution exits MC-EDR-R stack 901 at an increased ion concentration through diluent outlet conduit 857 where concentration sensor 864 detects the ion concentration of output diluent solution in diluent outlet conduit 857. If the measured ion concentration of output diluent solution is above a specified concentration, diluent exit control valve 843 may be opened slightly and diluent return control valve 847 may be closed slightly to allow output diluent solution to enter the C circuit. If the measured concentration of output diluent solution is below a specified concentration, diluent exit control valve 843 is closed and diluent return control valves 847, 874 opened to allow output diluent solution to return to diluent tank 823 for further concentration.

Concentrate solution 894 is stored in concentrate tank 821, which may include an optional heating element (not shown) to increase the temperature of the solution, thereby beneficially increasing MC-EDR-R system efficiency through increased conductivity internal to MC-EDR-R stack 901. Solution enters the C circuit from the D circuit when diluent exit control valve 843 is opened. Concentrate solution 894 is pumped from concentrate tank 821 by concentrate pump 814 through open concentrate inlet valve to P-C inlet reversal valve array 810. In the forward polarity configuration concentrate solution 894 passes through open reversal valve 810*a* and into MC-EDR-R stack 901 through C-P inlet conduit 852. Output concentrate solution leaves MC-EDR-R stack 901 at a higher ion concentration via C-P outlet conduit 856 and enters P-C outlet reversal valve array 812. Output concentrate solution passes through open reversal valve 812*d* into concentrate conduit 806 where concentration sensor 862 measures the ion concentration of output concentrate solution exiting P-C outlet reversal valve array 812. If the measured ion concentration of output concentrate solution in concentrate conduit 806 is above a specified concentration, concentrate exit control valve 842 is opened to allow output concentrate solution to exit the system. If the measured ion concentration of output concentrate solution in concentrate conduit 806 is below a specified concentration, then concentrate exit control valve 842 is closed and concentrate return control valves 845 and 878 are opened to return output concentrate solution to concentrate tank 821 to be further concentrated.

A level sensor in concentrate tank 821 (not shown) measures the level of concentrate solution 894 in concentrate tank 821. When a low level set point is reached, diluent exit control valve 843 is opened slightly and diluent return control valve 847 is closed slightly to allow diluent solution transfer from the D circuit to the C circuit.

If, in theory, saltwater make-up is added to the C circuit rather than the D circuit (not shown) steady state operation may be achieved where no saltwater is transferred into or out of the D circuit as only ions are transferred from product solution 891 through the ion exchange membranes internal to MC-EDR-R stack 901 to the diluent solution 892, and then again through ion exchange membranes internal to MC-EDR-R stack 901 to the concentrate solution 894. In practice however, some water is transferred through the ion exchange membranes either due to osmotic, electro-osmotic, or leakage effects. As a result, it is beneficial to include the diluent exit control valve 843. In addition, it is beneficial to add the saltwater source solution to the lower concentration P and D circuits such that a low concentration factor across each circuit may be maintained and concentration polarization and current efficiency losses are minimized. The above described control system provides utility to maintain low concentration factors across each circuit, maintain circuit concentrations, maintain tank levels, and ultimately operate an efficient system that can produce a high concentration discharge in a non-attended (automated) manner.

In an alternative embodiment (not shown) saltwater make-up may be added to the C circuit from the P circuit by closing reversal valves 812a, 812c and opening reversal valves 812b, 812d so that output product solution exiting P-C outlet reversal valve array 812 flows into concentrate outlet conduit 806 along with the output concentrate solution. Check valves (not shown) may be positioned after reversal valves 812b, 812d to prevent back flow of product P into C circuit or vice versa. This embodiment may be beneficial when the MC-EDR-R plant 801 is combined with a second stage desalination system as described above with reference to FIGS. 16 and 17.

In a further alternative embodiment saltwater make up may be added directly to the C circuit from saltwater source 895 or 896. A conduit (not shown) may fluidly connect the saltwater source 895 or 896 to concentrate tank 821. A saltwater inlet valve (not shown) may be included to control input of saltwater make up into concentrate tank 821.

Rinse tank 824 holds rinse solution 898 which may consist of conductive but non-scaling aqueous salts such as sodium chloride. Rinse tank 824 may include an optional heating element (not shown) to increase the temperature of the rinse solution and thereby beneficially increase MC-EDR-R system efficiency through increased conductivity internal to the MC-EDR-R stack 901. Rinse pump 817 pumps rinse solution 898 from rinse tank 824 through open rinse inlet valve 880 and rinse inlet conduit 854 into MC-EDR-R stack 901. Rinse solution 898 exits MC-EDR-R stack 901 through rinse outlet conduit 858 and passes back to rinse tank 824 via open rinse return control valve 881.

Figure 19:
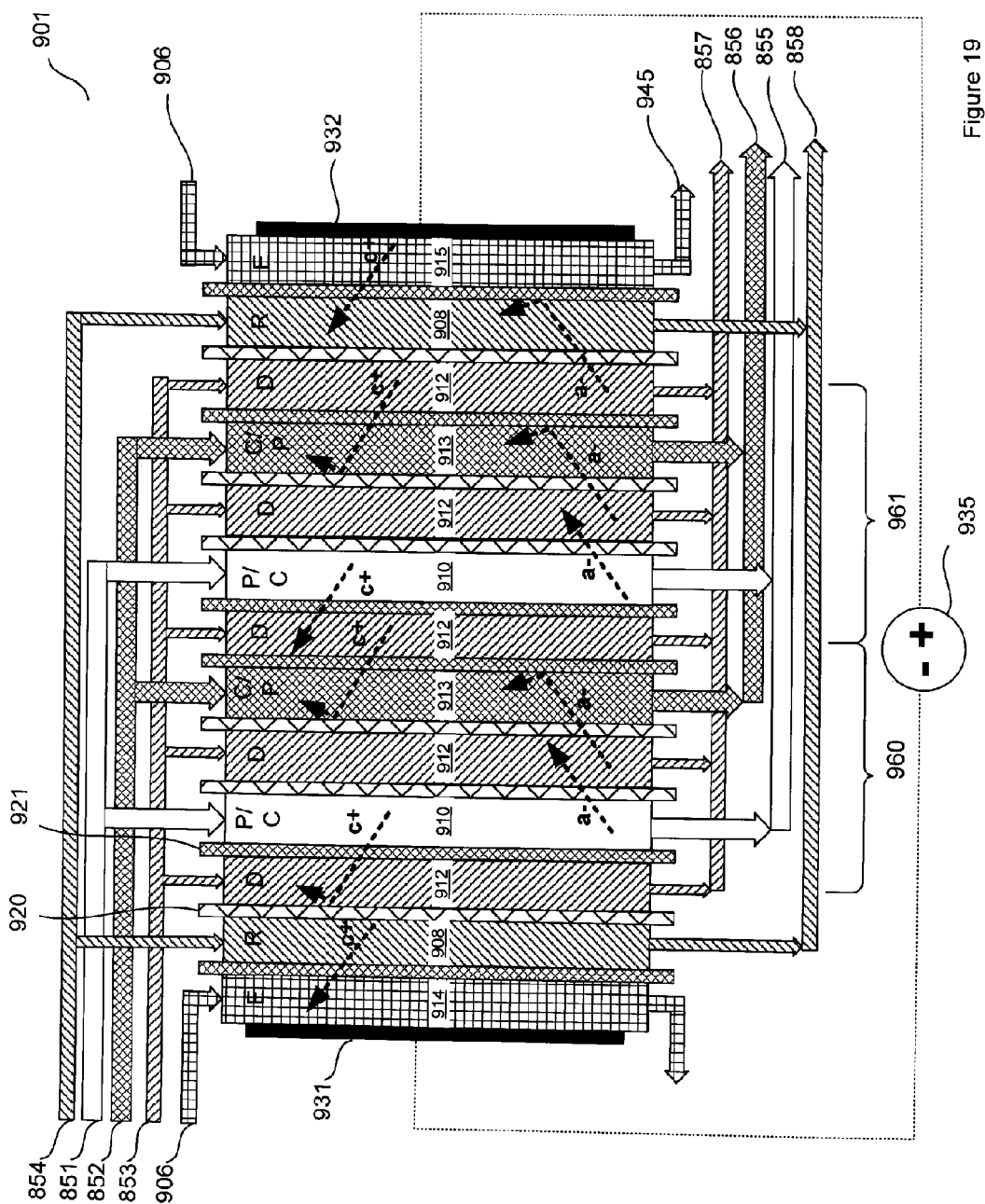
FIG. 19 is a schematic view of the MC-EDR-R stack of FIG. 18 operating in forward polarity.

FIG. 19 shows the MC-EDR-R stack 901 operating in forward polarity. Product solution 891 flows into P/C chambers 910 through P-C inlet conduit 851 and exits via P-C outlet conduit 855. Diluent solution 892 flows into D chambers 912 through D inlet conduit 853 and exits via D outlet conduit 857. Rinse solution 898 flows into R chambers 908 through R inlet conduit 854 and exits via R outlet conduit 858. Concentrate solution 894 flows into C/P chambers 913 through C-P inlet conduit 852 and exits via C-P outlet conduit 856

A direct current power source 935 is applied to the MC-EDR-R stack 901 to provide a DC voltage and current at the cathode/anode electrode 931 and anode/cathode electrode 932. Changing the polarity of the DC power supply changes whether each electrode is operating as a cathode or anode. Reduction and oxidation of reactions of the electrolyte occur at the cathode and anode respectively, converting the DC electrical current into an ionic current. In the illustrated forward polarity configuration shown in FIG. 19, cathode/anode electrode 931 operates as a cathode and anode/cathode electrode 932 acts as the anode. Exemplar applied voltages may range from 0.5V to 2.5V per chamber pair in order to drive ions across ion exchange membranes, while avoiding problems associated with water splitting at higher voltages. Those skilled in the art will be able to measure the current limit density of a particular MC-EDR-R stack 901 under its operating concentrations and temperatures, and then set the applied voltage to operate at the most economic current limit density on a basis of combined capital and operating costs. In an alternative embodiment (not shown), a drive cell, such as the drive cell disclosed in WO 2010/115287 or WO 2009/155683 may be used for application of a voltage across the chambers.

The MC-EDR-R stack 901 consists of two complete MC-EDR-R cells: cell 960 and cell 961. Each cell 960 and cell 961 consists of one P/C chamber 910, two D chambers 912, and one C/P chamber 913. In alternative embodiments (not shown) there may be more or less cells arranged together within a single stack, with more cells beneficially reducing the overall footprint and increasing production. It is desirable not to have a P/C chamber 910 or C/P chamber 913 placed beside a rinse chamber 908. An extra D chamber 912 may be placed on either side of cell 960 or cell 961 to avoid placing a P/C chamber 910 or C/P chamber 913 next to a rinse chamber 908. On each end of the MC-EDR-R stack 901 are electrolyte chambers with electrolyte chamber 914 next to cathode/anode electrode 931 and electrolyte chamber 915 next to anode/cathode electrode 932 Electrolyte solution 897 is stored in electrolyte tank 825 and pumped by electrolyte pump 818 through electrolyte inlet conduit 906 into electrolyte chambers 914, 915 and exits electrolyte chamber 914, 915 through electrolyte exit conduit 945 in a closed loop. The closed loop electrolyte circuit illustrated in FIG. 19 is a parallel arraignment where electrolyte solution travels in the same direction as the saltwater solutions 891, 892, 894 and rinse solution 898; however, a series closed loop circuit is also possible as shown in FIG. 5.

On one side of each C/P chamber 913 are two adjacently aligned cation exchange membranes 921 and on the other side of each C/P chamber 913 are two adjacently aligned anion exchange membranes 920. This results in each D chamber 912 positioned between a P/C chamber 910 and a C/P chamber 913 having a cation exchange membrane 921 on both sides or an anion exchange membrane 920 on both sides of the D chamber 912, whereas the P/C chambers 910 and the C/P chambers 913 each have a cation exchange membrane 921 on one side and an anion exchange membrane 920 on the opposite side of the chamber. This arrangement of adjacently aligned anion and cation exchange membranes allows transfer of anions and cations respectively across multiple chambers from the P/C chamber 910 to the D chamber 912, then to the C/P chamber 913 as is described in more detail below.

A rinse solution chamber 908 is positioned next to each of electrolyte chambers 914, 915 and the two rinse solution chambers 908 are both bound by an anion exchange membrane 920 on the side furthest from the electrode. This arrangement prevents cations, such as calcium and magnesium, from entering the rinse solution chamber 908 from adjacent D chambers 912. The fact that the rinse solution chambers 908 remain free of calcium and magnesium prevents their passage from the rinse solution chambers 908 to the electrolyte chambers 914, 915 through the cation exchange membranes 921 that bound the electrolyte chambers 914, 915. The rinse solution chambers 908 beneficially remove the need for electrolyte acidification while also increasing reliability over conventional EDR stacks through reduced calcium sulfate precipitation risk.

The combined DC voltage and ionic current force ions across the ion exchange membranes in the forward polarity configuration shown in FIG. 19 as follows:

cations and anions are transferred from the P/C chamber 910 to the D chambers 912 on either side of the P/C chamber 910 effecting desalination of product solution 891; and cations and anions are transferred from the D chambers 912 to the C/P chamber 913 concentrating concentrate solution 894.

The net effect is transfer of anions from the P/C chambers 910 across the D chambers 912 to the C/P chambers 913 and transfer of cations from the P/C chambers 910 across the D chambers 912 to the C/P chambers 913. This arrangement prevents a build-up of ions in the D circuit and beneficially enables a lower concentration factor across each membrane than would be possible in a two chamber EDR where ions are transferred directly from the P/C chamber 910 to the C/P chamber 913.

As scaling constituents are present in the feed solutions, e.g., calcium carbonate and calcium sulfates, the MC-EDR-R ion exchange membranes will accumulate sealants on their surfaces resulting in a decreased desalination efficiency of the system. Scale build up on the ion exchange membranes are indicated by an increase in resistance, which can be measured as either decreased current in constant voltage operating mode or increased voltage in constant current operating mode. Once the resistance has reached a level indicative of scaling on the ion exchange membranes, the stack will then be operated in the reverse mode as depicted in FIG. 20.

Figure 20:
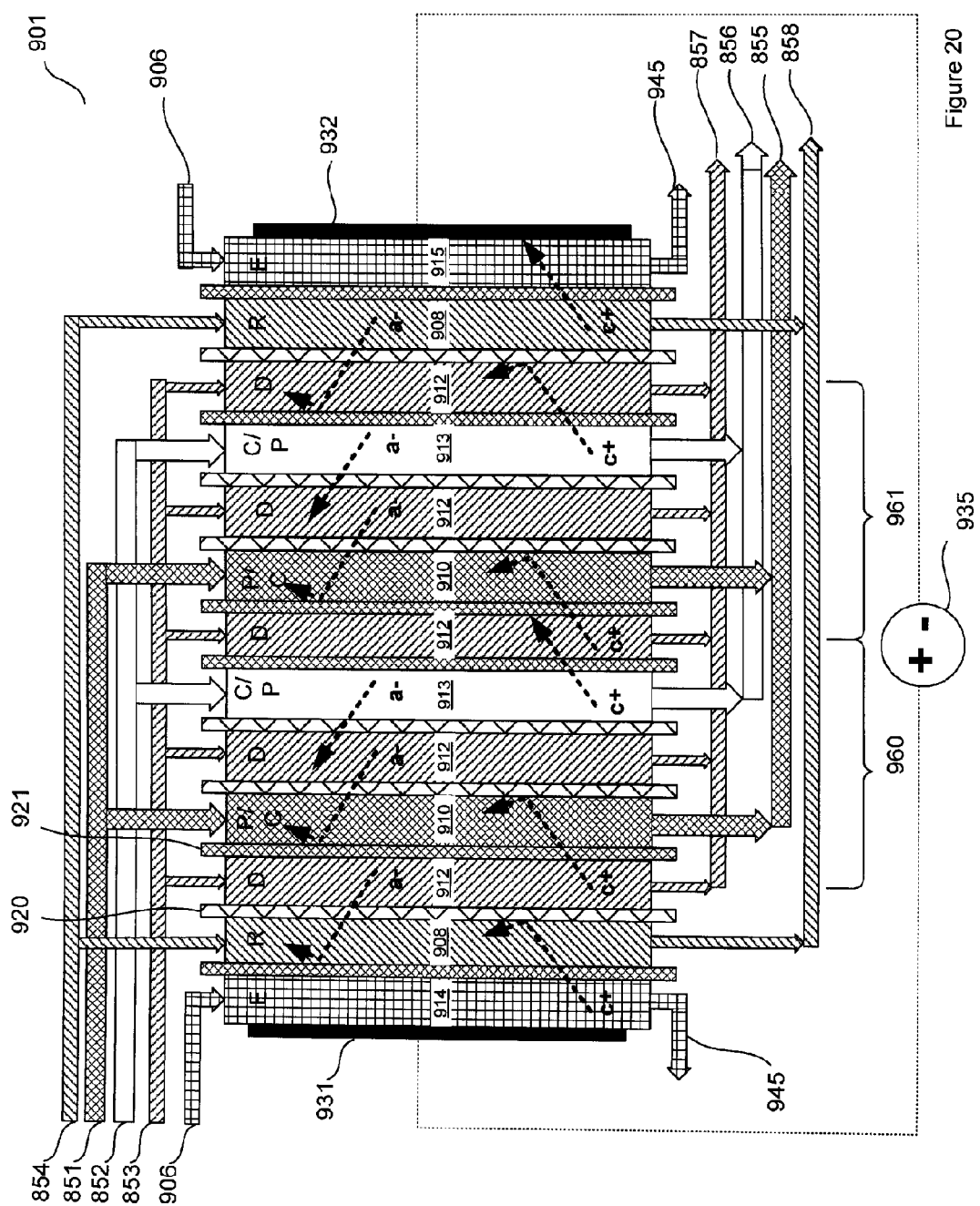
FIG. 20 is a schematic view of the MC-EDR-R stack of FIG. 18 operating in reverse polarity.

Referring now to FIG. 20 there is shown the MC-EDR-R stack 901 in reverse polarity where the ions are transferred through the ion exchange membranes in a direction opposite to the forward polarity direction shown in FIG. 19, thereby descaling the ion exchange membranes. The polarity of the direct current power source 935 is reversed resulting in cathode/anode electrode 931 becoming the anode and anode/cathode electrode 932 becoming the cathode.

In order to maintain production of desalinated water when ion transfer has changed direction, the saltwater internal to P/C chambers 910 and C/P chambers 913 must also be changed for the reverse polarity configuration. Concentrate solution 894 is pumped from concentrate tank 821 through open reversal valve 810b and into P/C chambers 910 through P-C inlet conduit 851. Output concentrate solution exits P/C chambers 910 via P-C outlet conduit 855 and passes through open reversal valve 812b into concentrate conduit 806. Product solution 891 is pumped from product tank 822 through open reversal valve 810c and into C/P chambers 913 through C-P inlet conduit 852. Output product solution exits C/P chambers 913 via C-P outlet conduit 856 and passes through open reversal valve 812c into product conduit 805. Diluent solution 892 and rinse solution 898 pass through diluent chambers 912 and rinse chambers 208 respectively as occurred in the forward polarity configuration described above with reference to FIG. 19. Flow direction is not reversed in the disclosed embodiment; however, it is possible to reverse flow in reverse polarity operation to back flush the MC-EDR-R 901 stack for enhanced sealant removal.

The combined DC voltage and ionic current force ions across the ion exchange membranes in the reverse polarity configuration shown in FIG. 20 as follows:

cations and anions are transferred from the C/P chamber 913 to the D chambers 912 on either side of C/P chamber 913 effecting desalination of product solution 891; and cations and anions are transferred from the D chambers 912 to the P/C chamber 910 concentrating concentrate solution 894.

The net effect is transfer of anions from the C/P chamber 913 across the D chambers 912 to the P/C chamber 910 and transfer of cations from the C/P chamber 913 across the D chambers 912 to the P/C chamber 910.

Directly after the polarity is switched to operate in the reverse polarity configuration, there will be a short period where concentrate solution 894 from operation in the forward polarity configuration remains in the pipework which is now associated with the P circuit. In order to prevent the concentrate solution 894 from entering the product tank 822, the reversal valves of P-C outlet reversal valve array 812 operate a MC-EDR-R reverse flush mode for a period of time, for example 1 minute, before switching to MC-EDR-R reverse polarity mode. As shown in Table 7 in MC-EDR-R reverse flush mode, reversal valve 812c remains closed and reversal valve 812d remains open to direct a slug of mixed concentrate and product solution to the concentrate conduit 806. After a period of time all remaining concentrate solution 894 should have been flushed from the system and the reversal valves can now switch to the MC-EDR reverse polarity mode. Conversely, when the polarity switches from reverse configuration to forward configuration the reversal valves of P-C outlet reversal valve array 812 operate in MC-EDR-R forward flush mode for a period of time, for example 1 minute, before switching to MC-EDR-R forward polarity mode. In MC-EDR-R forward flush mode, reversal valve 812a remains closed and reversal valve 812b remains open to direct a slug of mixed concentrate and product solution to the concentrate conduit 806. Alternatively, or additionally, P-C conductivity sensor 819 in P-C outlet conduit 855 and a C-P conductivity sensor 820 in C-P outlet conduit 856 may be used to detect the conductivity of the solution exiting the MC-EDR-R stack 901 and the reversal valves of P-C outlet reversal valve array 812 may be switched to operate in either MC-EDR-R forward polarity or MC-EDR-R reverse polarity once a threshold low salinity conductivity, for example within 25% of normal operating conductivity, is detected indicating that the P circuit has been sufficiently flushed of concentrate solution 894.

The MC-EDR-R plant 801 of FIG. 18 includes a cleaning system as described above with reference to FIGS. 14 and 15. The cleaning system utilizes stack operating voltage transducer 833 and stack operating current transducer 835, as well as the hydraulic resistance sensors given in Table 8 to sense and calculate electrochemical and hydraulic resistance by applying the algorithms and process actions described above with reference to FIGS. 14 and 15 in order to remove scaling and fouling products when resistance has reached a certain level.

TABLE 8

Hydraulic Resistance Sensors for Cleaning System of MC-EDR-R Plant 801

| Sensors | Hydraulic Circuit | | | |
| --- | --- | --- | --- | --- |
| | P—Product | D—Diluent | R—Rinse | C—Concentrate |
| Pressure Transducer | 830 ("Pp") | 860 ("Pd") | 867 ("Pr") | 837 ("Pc") |
| Flow Transducer | 831 ("Fp") | 865 ("Fd") | 868 ("Fr") | 838 ("Fc") |
| Conductivity Transducer | 832 ("Cp") | 866 ("Cd") | 869 ("Cr") | 839 ("Cc") |

Cleaning water tank 889 holds freshwater added through water inlet 804 and chemicals added through chemical inlet 809. Freshwater may be used for: (0) Shut Down Flush, (1) Slug Wash, and (2) Stack Wash. The operator can set a freshwater fill level for automated fill of tank 889 based on initial commissioning runs to ensure the tank fill level provides sufficient volume for the actions given below in Table 9, as each action requires a different tank fill level. For example, (0) Shut Down Flush requires sufficient volume for all hydraulic circuits except electrolyte, however, (1) Slug Wash and (2) Stack Wash can be completed on a single hydraulic circuit at a time, thereby requiring less freshwater volume. The cleaning system on the rinse circuit may not be utilized during normal operation, however it may be initiated to enable recovery of performance if the rinse circuit is inadvertently polluted.

TABLE 9

Operation of Cleaning System for MC-EDR-R Plant 801

| | Valves of Hydraulic Circuit | | | |
|---|---|---|---|---|
| Action | P—Product | D—Diluent | R—Rinse | C—Concentrate |
| Normal Operation | 888-closed<br>884-open<br>877-closed<br>876-open | 888-closed<br>882-open<br>873-closed<br>874-open | 888-closed<br>880-open<br>883-closed<br>881-open | 888-closed<br>886-open<br>879-closed<br>878-open |
| (1) Shut Down Flush Pumps 814, 815, 816, 817 running P/S 935 OFF | 888-open<br>884-close<br>877-open<br>876-close<br>Delay: ~0.5 min (user set point)<br>884-open<br>888-close<br>876-open<br>877-close | 888-open<br>882-close<br>873-open<br>874-close<br>Delay: ~0.5 min (user set point)<br>882-open<br>888-close<br>874-open<br>873-close | 888-open<br>880-close<br>883-open<br>881-close<br>Delay: ~0.5 min (user set point)<br>880-open<br>888-close<br>881-open<br>883-close | 888-open<br>886-close<br>879-open<br>878-close<br>Delay: ~0.5 min (user set point)<br>886-open<br>888-close<br>878-open<br>879-close |
| | Shut down system Drain tank 889 via valve 834 | | | |
| (3) Slug Wash Pumps 814, 815, 816, 817 running | 888-open<br>884-close<br>Delay: ~2 sec<br>884-open<br>888-close | 888-open<br>882-close<br>Delay: ~2 sec<br>882-open<br>888-close | 888-open<br>880-close<br>Delay: ~2 sec<br>880-open<br>888-close | 888-open<br>886-close<br>Delay: ~2 sec<br>886-open<br>888-close |
| (4) Stack Wash Pumps 814, 815, 816, 817 running P/S 935 OFF | 888-open<br>884-close<br>877-open<br>876-close<br>Delay: ~10 min (user set point)<br>884-open<br>888-close<br>876-open<br>877-close | 888-open<br>882-close<br>873-open<br>874-close<br>Delay: ~10 min (user set point)<br>882-open<br>888-close<br>874-open<br>873-close | 888-open<br>880-close<br>883-open<br>881-close<br>Delay: ~10 min (user set point)<br>880-open<br>888-close<br>881-open<br>883-close | 888-open<br>886-close<br>879-open<br>878-close<br>Delay: ~10 min (user set point)<br>886-open<br>888-close<br>878-open<br>879-close |
| | Return to Normal Operation Drain tank 889 via valve 834 | | | |

Prior to a Stack Chemical Clean, a Shut Down Flush should be initiated. For the Stack Chemical Clean a chemically enriched water of exemplar 0.5 molar citric acid or 0.5 molar hydrochloric acid is obtained through automatic chemical dispensing pumps at chemical inlet 809, water addition at water inlet 804, and mixing (not shown) in tank 889. The Stack Chemical Clean control sequence is the same as the Shut Down Flush described above, with the pumps 814, 815, 816, 817 starting at the commencement of the user set Chemical Clean Time Delay and stopping at the end of the Chemical Clean Time Delay. After which MC-EDR-R plant 801 operation can revert to normal. In the event that the Stack Chemical Clean does not return performance to the base line, the operator can be notified to investigate further. It is emphasized that set points will need to be re-tuned by operators from time to time in order to re-establish performance, and off-performance set points that are used to initiate each of the above described cleaning actions.

In alternative embodiments (not shown) the MC-EDR-R plant 801 may use alternative means as would be known to a person of skill in the art for switching the flow of solutions through the chambers of the MC-EDR stack rather than the reversal valve arrays described herein, for example the gaskets described in WO 2010/115287. In alternative embodiments (not shown) the MC-EDR-R plant 801 may include multiple stacks 901 with an electrode, electrolyte chamber and rinse chamber positioned at either end of each stack. Each stack may be connected to the manifolding of the P, D, C and R circuits, thereby beneficially reducing manifolding requirements. The multiple stacks may be compressively coupled and may comprise a modular apparatus as disclosed in WO 2012/019282 (incorporated herein by reference).

While particular embodiments have been described in the foregoing, it is to be understood that other embodiments are possible and are intended to be included herein. It will be clear to any person skilled in the art that modification of and adjustments to the foregoing embodiments, not shown, are possible.

The invention claimed is:

1. An apparatus for desalinating saltwater comprising:
    (a) a stack configured to receive saltwater being desalinated, a diluent of a first ionic concentration and a concentrate of a second ionic concentration greater than the first ionic concentrate, the stack comprising an electrodialysis cell comprising:
        (i) a product chamber bounded on one side by a product chamber anion exchange membrane and bounded on another side by a product chamber cation exchange membrane;
        (ii) a concentrate chamber bounded on one side by a concentrate chamber anion exchange membrane and bounded on another side by a concentrate chamber cation exchange membrane;
        (iv) a first diluent chamber between the product chamber and the concentrate chamber; and
        (iv) a second diluent chamber on an opposite side of the product chamber to the first diluent chamber;
        the electrodialysis cell configured with either:
            the product chamber anion exchange membrane and the concentrate chamber anion exchange membrane in alignment either side of the first diluent chamber; or
            the product chamber cation exchange membrane and the concentrate chamber cation exchange membrane in alignment either side of the first diluent chamber;
        whereby under application of a sufficient voltage across the electrodialysis cell cations or anions respectively migrate across the aligned cation exchange membranes or the aligned anion exchange membranes from the product chamber through the first diluent chamber to the concentrate chamber; and
    (b) a manifolding assembly comprising product, concentrate and diluent manifolding fluidly coupled to the product, concentrate and diluent chambers respectively, to convey the saltwater being desalinated to and away from the product chamber, the concentrate to and away from the concentrate chamber, and the diluent to and away from the diluent chambers.

2. The apparatus of claim 1, wherein the electrodialysis cell further comprises a first diluent-concentrate chamber between the first diluent chamber and the concentrate chamber for containing a diluent-concentrate of a third ionic concentration greater than the first ionic concentration but less than the second ionic concentration, the electrodialysis cell configured with either:

(i) a first diluent anion exchange membrane forming a boundary between the first diluent chamber and the first diluent-concentrate chamber, with the product chamber anion exchange membrane and the first diluent anion exchange membrane positioned either side of the first diluent chamber, and the concentrate chamber anion exchange membrane and the first diluent anion exchange membrane positioned either side of the first diluent-concentrate chamber; or (ii) a first diluent cation exchange membrane forming a boundary between the first diluent chamber and the first diluent-concentrate chamber, with the product chamber cation exchange membrane and the first diluent cation exchange membrane positioned either side of the first diluent chamber, and the concentrate chamber cation exchange membrane and the first diluent cation exchange membrane positioned either side of the first diluent-concentrate chamber, whereby under application of the sufficient voltage cations or anions respectively migrate across the aligned cation exchange membranes or the aligned anion exchange membranes from the product chamber through the first diluent chamber and the first diluent-concentrate chamber to the concentrate chamber;

and the manifolding assembly further comprises a diluent-concentrate manifolding fluidly coupled to the first diluent-concentrate chamber to convey the diluent-concentrate to and away from the first diluent-concentrate chamber.

3. The apparatus of claim 2, wherein the electrodialysis cell further comprises a second diluent-concentrate chamber on an opposite side of the second diluent chamber to the product chamber for containing the diluent-concentrate, a second diluent anion exchange membrane or a second diluent cation exchange membrane forming a boundary between the second diluent chamber and the second diluent-concentrate chamber arranged such that either:
(i) the product chamber anion exchange membrane and the second diluent anion exchange membrane are positioned either side of the second diluent chamber; or
(ii) the product chamber cation exchange membrane and the second diluent cation exchange membrane are positioned either side of the second diluent chamber,
and the diluent-concentrate manifolding is fluidly coupled to the second diluent-concentrate chamber to convey the diluent-concentrate to and away from the second diluent-concentrate chamber.

4. The apparatus of claim 3, wherein the stack comprises two or more electrodialysis cells with the concentrate chamber of a first electrodialysis cell in ionic communication with the second diluent-concentrate chamber of a second electrodialysis cell, the two or more electrodialysis cells configured with either:
(i) the second diluent anion exchange membrane of the second electrodialysis cell and the concentrate chamber anion exchange membrane of the first electrodialysis cell positioned either side of the second diluent-concentrate chamber of the second electrodialysis cell; or
(ii) the second diluent cation exchange membrane of the second electrodialysis cell and the concentrate chamber cation exchange membrane of the first electrodialysis cell positioned either side of the second diluent-concentrate chamber of the second electrodialysis cell.

5. The apparatus of claim 1, wherein the stack comprises two or more electrodialysis cells with the concentrate chamber of a first electrodialysis cell in ionic communication with the second diluent chamber of a second electrodialysis cell, the two or more electrodialysis cells configured with either:

(i) the product chamber anion exchange membrane of the second electrodialysis cell and the concentrate chamber anion exchange membrane of the first electrodialysis cell positioned either side of the second diluent chamber of the second electrodialysis cell; or
(ii) the product chamber cation exchange membrane of the second electrodialysis cell and the concentrate chamber cation exchange membrane of the first electrodialysis cell positioned either side of the second diluent chamber of the second electrodialysis cell.

6. The apparatus of claim 1, wherein the stack further comprises:
(a) first and second electrolyte chambers for containing an electrolyte;
(b) first and second stack end cation exchange membranes and first and second stack end anion exchange membranes;
(c) first and second electrodes, the first electrolyte chamber bounded on one side by and in ionic communication with the first stack end cation exchange membrane and on another side by and in electrical communication with the first electrode, the second electrolyte chamber bounded on one side by and in ionic communication with the second stack end cation exchange membrane and on another side by and in electrical communication with the second electrode; and
(d) first and second rinse chambers for containing rinse solution, the first rinse chamber bounded on one side by and in ionic communication with the first stack end anion exchange membrane and on another side by and in ionic communication with the first stack end cation exchange membrane, the second rinse chamber bounded on one side by and in ionic communication with the second stack end anion exchange membrane and on another side by and in ionic communication with the second stack end cation exchange membrane.

7. The apparatus of claim 6, wherein the manifolding assembly further comprises rinse manifolding fluidly coupled to the rinse chambers to convey the rinse solution to and away from the rinse chambers.

8. The apparatus of claim 6, wherein the manifolding assembly further comprises electrolyte manifolding fluidly coupled to the electrolyte chambers to convey the electrolyte to and away from the electrolyte chambers.

9. The apparatus of claim 1, wherein the apparatus is configured to switch between forward and reverse polarity direction, whereby in the forward polarity direction cations or anions respectively migrate across the aligned cation exchange membranes or the aligned anion exchange membranes in one direction, and in the reverse polarity direction cations or anions respectively migrate across the aligned cation exchange membranes or the aligned anion exchange membranes in an opposite direction.

10. An apparatus for desalinating saltwater capable of operating in forward polarity and reverse polarity, the apparatus comprising;
(a) a stack configured to receive saltwater being desalinated, a diluent of a first ionic concentration and a concentrate of a second ionic concentration greater than the first ionic concentration, the stack comprising an electrodialysis cell comprising:
(i) a first and second product/concentrate chamber, each product/concentrate chamber bounded on one side by a product/concentrate chamber anion exchange membrane and bounded on another side by a product/concentrate chamber cation exchange membrane;

(ii) a first and second concentrate/product chamber, each concentrate/product chamber bounded on one side by a concentrate/product chamber anion exchange membrane and bounded on another side by a concentrate/product chamber cation exchange membrane; and (iii) a first, second and third diluent chamber, the electrodialysis cell configured with:

the product/concentrate chamber anion exchange membrane of the first product/concentrate chamber and the concentrate/product chamber anion exchange membrane of the first concentrate/product chamber in alignment either side of the first diluent chamber;

the product/concentrate chamber cation exchange membrane of the first product/concentrate chamber and the concentrate/product chamber cation exchange membrane of the second concentrate/product chamber in alignment either side of the second diluent chamber;

and either:

the product/concentrate chamber anion exchange membrane of the second product/concentrate chamber and the concentrate/product chamber anion exchange membrane of the second concentrate/product chamber in alignment either side of the third diluent chamber; or the product/concentrate chamber cation exchange membrane of the second product/concentrate chamber and the concentrate/product chamber cation exchange membrane of the first concentrate/product chamber in alignment either side of the third diluent chamber, whereby under application of a sufficient voltage across the electrodialysis cell cations and anions respectively migrate across the aligned cation exchange membranes and the aligned anion exchange membranes from the product/concentrate chamber through the diluent chamber to the concentrate/product chamber in forward polarity and from the concentrate/product chamber through the diluent chamber to the product/concentrate chamber in reverse polarity; and (b) a manifolding assembly comprising:

(i) product/concentrate manifolding fluidly coupled to the product/concentrate chambers and configured to convey the saltwater being desalinated to and away from the product/concentrate chambers when the apparatus is operating in forward polarity and the concentrate to and away from the product/concentrate chambers when the apparatus is operating in reverse polarity;

(ii) concentrate/product manifolding fluidly coupled to the concentrate/product chambers and configured to convey the concentrate to and away from the concentrate/product chambers when the apparatus is operating in forward polarity and the saltwater being desalinated to and away from the concentrate/product chambers when the apparatus is operating in reverse polarity; and (iii) diluent manifolding fluidly coupled to the diluent chambers to convey the diluent to and away from the diluent chambers.

11. The apparatus of claim 10, wherein the stack further comprises an additional diluent chamber at each end of the stack.

12. The apparatus of claim 10, wherein the stack is configured to receive a diluent-concentrate of a third ionic concentration greater than the first ionic concentration and less than the second ionic concentration and the diluent chambers are diluent/diluent-concentrate chambers, and wherein the diluent manifolding is a diluent/diluent-concentrate manifolding configured to convey the diluent to and away from the diluent/diluent-concentrate chamber when the apparatus is operating in forward polarity and the diluent-concentrate to and away from the diluent/diluent-concentrate chambers when the apparatus is operating in reverse polarity, the electrodialysis cell further comprises a first, second and third diluent-concentrate/diluent chamber with:

(a) the first diluent-concentrate/diluent chamber between the first diluent/diluent-concentrate chamber and the first concentrate/product chamber and having a first diluent anion exchange membrane forming a boundary between the first diluent/diluent-concentrate chamber and the first diluent-concentrate/diluent chamber;

(b) the second diluent-concentrate/diluent chamber between the second diluent/diluent-concentrate chamber and the second concentrate/product chamber and having a first diluent cation exchange membrane forming a boundary between the second diluent/diluent-concentrate chamber and the second diluent-concentrate/diluent chamber; and (c) either:

(i) the third diluent-concentrate/diluent chamber between the third diluent/diluent-concentrate chamber and the second concentrate/product chamber and having a second diluent anion exchange membrane forming a boundary between the third diluent/diluent-concentrate chamber and the third diluent-concentrate /diluent chamber; or (ii) the third diluent-concentrate/diluent chamber between the third diluent/diluent-concentrate chamber and the first concentrate/product chamber and having a second diluent cation exchange membrane forming a boundary between the third diluent/diluent-concentrate chamber and the third diluent-concentrate /diluent chamber, whereby under application of the sufficient voltage cations and anions respectively migrate across the aligned cation exchange membranes and the aligned anion exchange membranes from the product/concentrate chamber through the diluent/diluent-concentrate chamber and the diluent-concentrate/diluent chamber to the concentrate/product chamber in forward polarity and from the concentrate/product chamber through the diluent-concentrate/diluent chamber and the diluent/diluent-concentrate chamber to the product/concentrate chamber in reverse polarity;

and the manifolding assembly further comprises a diluent-concentrate/diluent manifolding fluidly coupled to the diluent-concentrate/diluent chambers and configured to convey the diluent-concentrate to and away from the diluent-concentrate/diluent chambers when the apparatus is operating in forward polarity and the diluent to and away from the diluent-concentrate/diluent chambers when the apparatus is operating in reverse polarity.

13. The apparatus of claim 10, wherein the stack comprises two or more of the electrodialysis cells.

14. The apparatus of claim 10, wherein the stack further comprises:

(a) first and second electrolyte chambers for containing an electrolyte;

(b) first and second stack end cation exchange membranes and first and second stack end anion exchange membranes;

(c) first and second electrodes, the first electrolyte chamber bounded on one side by and in ionic communication with the first stack end cation exchange membrane and on another side by and in electrical communication with the first electrode, the second electrolyte chamber bounded on one side by and in ionic communication with the second stack end cation exchange membrane and on another side by and in electrical communication with the second electrode; and (d) first and second rinse chambers for containing rinse solution, the first rinse chamber bounded on one side by and in ionic communication with the first stack end anion exchange membrane and on another side by and in ionic communication with the first stack end cation exchange membrane, the second rinse chamber bounded on one side by and in ionic communication with the second stack end anion exchange membrane and on another side by and in ionic communication with the second stack end cation exchange membrane.

15. The apparatus of claim 14, wherein the manifolding assembly further comprises rinse manifolding fluidly coupled to the rinse chambers to convey the rinse solution to and away from the rinse chambers.

16. The apparatus of claim 14, wherein the manifolding assembly further comprises electrolyte manifolding fluidly coupled to the electrolyte chambers to convey the electrolyte to and away from the electrolyte chambers.

17. The apparatus of claim 10, wherein the manifolding assembly comprises a product/concentrate outlet reversal valve array comprising a plurality of valves with a first set of valves in fluid communication with the product/concentrate chambers and a second set of valves in fluid communication with the concentrate/product chambers, one of the first set of valves and one of the second set of valves in fluid communication with a product outlet conduit, and another of the first set of valves and another of the second set of valves in fluid communication with a concentrate outlet conduit, the plurality of valves being actuable to operate in a reverse flush or forward flush mode whereby the valves in fluid communication with the product outlet conduit are closed and the valves in fluid communication with the concentrate outlet are opened such that a product and concentrate mixture exiting the product/concentrate chambers and the concentrate/product chambers following a switch between forward and reverse polarity is directed away from the product outlet conduit and into the concentrate outlet conduit.

* * * * *